US010993257B2

(12) United States Patent
Rahman et al.

(10) Patent No.: US 10,993,257 B2
(45) Date of Patent: Apr. 27, 2021

(54) PARTIAL PORT HYBRID CSI FEEDBACK FOR MIMO WIRELESS COMMUNICATION SYSTEMS

(71) Applicant: Samsung Electronics Co., Ltd., Suwon-si (KR)

(72) Inventors: Md. Saifur Rahman, Plano, TX (US); Eko Onggosanusi, Coppell, TX (US); Young-Han Nam, Plano, TX (US); Yang Li, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/663,292

(22) Filed: Oct. 24, 2019

(65) Prior Publication Data

US 2020/0059956 A1 Feb. 20, 2020

Related U.S. Application Data

(63) Continuation of application No. 16/186,258, filed on Nov. 9, 2018, now Pat. No. 10,536,969, which is a (Continued)

(51) Int. Cl.
*H04B 7/0413* (2017.01)
*H04W 74/00* (2009.01)
(Continued)

(52) U.S. Cl.
CPC .......... *H04W 74/004* (2013.01); *H04B 7/043* (2013.01); *H04B 7/0417* (2013.01); (Continued)

(58) Field of Classification Search
CPC ..... H04W 4/021; H04W 4/023; H04W 4/025; H04W 16/14; H04W 14/18; H04W 16/28; (Continued)

(56) References Cited

U.S. PATENT DOCUMENTS

2013/0336214 A1* 12/2013 Sayana ................. H04B 7/024
370/328
2014/0086285 A1* 3/2014 Yang .................... H04B 7/0691
375/219

(Continued)

*Primary Examiner* — Fred A Casca

(57) ABSTRACT

The method comprises receiving periodic CSI feedback configuration information including a periodicity value and an offset value corresponding to a first CSI report, and at least one periodicity value and at least one offset value corresponding to a second CSI report, measuring a first CSI reference signal (CSI-RS) and a second CSI-RS configured for a periodic CSI reporting based on at least two different enhanced MIMO types (eMIMO-Types), generating the first CSI report and the second CSI report for the first eMIMO-Type and the second eMIMO-Type, respectively, determining a periodic reporting interval for each of the first CSI report and the second CSI report, and reporting the first and second CSI reports based on the determined periodic reporting intervals using a physical uplink control channel (PUCCH) format 2 or a PUCCH format 3 or a combination of the PUCCH format 2 and the PUCCH format 3.

20 Claims, 28 Drawing Sheets

2100

Hybrid pre-coder: $p = \begin{bmatrix} p_{NP} & 0 & \cdots & 0 \\ 0 & p_{NP} & \cdots & 0 \\ \vdots & \vdots & \ddots & \vdots \\ 0 & 0 & \cdots & p_{NP} \end{bmatrix} p_{BF} = p_{BF} \otimes p_{NP}$ 1D Example 2D Example

Related U.S. Application Data continuation of application No. 15/445,958, filed on Feb. 28, 2017, now Pat. No. 10,129,906.

(60) Provisional application No. 62/301,823, filed on Mar. 1, 2016, provisional application No. 62/320,717, filed on Apr. 11, 2016, provisional application No. 62/376,773, filed on Aug. 18, 2016, provisional application No. 62/382,342, filed on Sep. 1, 2016.

(51) Int. Cl.

| | |
|---|---|
| *H04B 7/0417* | (2017.01) |
| *H04B 7/0426* | (2017.01) |
| *H04B 7/0452* | (2017.01) |
| *H04B 7/0456* | (2017.01) |
| *H04B 7/06* | (2006.01) |
| *H04L 1/20* | (2006.01) |
| *H04L 5/22* | (2006.01) |
| *H04L 5/00* | (2006.01) |
| *H04W 24/10* | (2009.01) |

(52) U.S. Cl.
CPC ......... *H04B 7/0421* (2013.01); *H04B 7/0426* (2013.01); *H04B 7/0443* (2013.01); *H04B 7/0447* (2013.01); *H04B 7/0452* (2013.01); *H04B 7/0456* (2013.01); *H04B 7/0469* (2013.01); *H04B 7/061* (2013.01); *H04B 7/0602* (2013.01); *H04B 7/065* (2013.01); *H04B 7/0608* (2013.01); *H04B 7/0617* (2013.01); *H04B 7/0619* (2013.01); *H04B 7/0621* (2013.01); *H04B 7/0626* (2013.01); *H04B 7/0689* (2013.01); *H04L 1/20* (2013.01); *H04L 5/0048* (2013.01); *H04L 5/22* (2013.01); *H04W 24/10* (2013.01); *H04B 7/0413* (2013.01); *H04L 5/0007* (2013.01)

(58) Field of Classification Search
CPC ..... H04W 88/08; H04W 52/42; H04W 52/16; H04W 74/004; H04W 24/10; B64C 39/024; H04B 7/0626; H04B 7/0452; H04B 7/0417; H04B 7/0639; H04B 7/0617; H04B 7/0456; H04B 7/0413; H04B 7/0632; H04B 7/024; H04B 7/0486; H04B 7/063; H04B 7/0478; H04B 7/065; H04B 7/0634; H04B 17/309; H04B 7/0482; H04B 17/345; H04B 7/0465; H04B 7/0647; H04B 7/0443; H04B 7/0447; H04B 7/0602; H04B 7/0621; H04B 7/0619; H04B 7/0608; H04B 7/061; H04B 7/043; H04B 7/0421; H04B 7/0426; H04B 7/0469; H04B 7/0689; H04L 25/0204; H04L 1/06; H04L 1/1893; H04L 1/20; H04L 5/22; H04L 5/0048; H04L 5/0007

See application file for complete search history.

(56) References Cited

U.S. PATENT DOCUMENTS

| | | | |
|---|---|---|---|
| 2014/0269596 A1* | 9/2014 | Kim | H04B 7/063 370/329 |
| 2015/0131568 A1* | 5/2015 | You | H04L 5/001 370/329 |

* cited by examiner

FIGURE 16

| Number of ports | Port layouts, and ($N_1,N_2$) values |
|---|---|
| 32 | (4,4), (2,8), (8,2), (16,1) |
| 64 | (8,4), (4,8), (2,16), (16,2), (32,1) |
| 128 | (8,8), (4,16), (2,32), (16,4), (32,2), (64,1) |

FIGURE 17

Hybrid pre-coder: $p = \begin{bmatrix} p_{NP} & 0 & \cdots & 0 \\ 0 & p_{NP} & \cdots & 0 \\ \vdots & \vdots & \ddots & \vdots \\ 0 & 0 & \cdots & p_{NP} \end{bmatrix}$ $p_{BF} = p_{BF} \otimes p_{NP}$ 1D Example 2D Example

PARTIAL PORT HYBRID CSI FEEDBACK FOR MIMO WIRELESS COMMUNICATION SYSTEMS

CROSS-REFERENCE TO RELATED APPLICATIONS AND CLAIM OF PRIORITY

This application is a continuation of U.S. patent application Ser. No. 16/186,258, filed Nov. 9, 2018, which is a continuation of U.S. patent application Ser. No. 15/445,958, filed Feb. 28, 2017, now U.S. Pat. No. 10,129,906, which claims priority to U.S. Provisional Patent Application No. 62/301,823, filed Mar. 1, 2016; U.S. Provisional Patent Application No. 62/320,717, filed Apr. 11, 2016; U.S. Provisional Patent Application No. 62/376,773, filed Aug. 18, 2016; and U.S. Provisional Patent Application No. 62/382,342, filed Sep. 1, 2016. The content of the above-identified patent documents are incorporated herein by reference.

TECHNICAL FIELD

The present application relates generally to uplink reporting operation in wireless communication systems. More specifically, this disclosure relates to hybrid channel state information (CSI) feedback on a physical uplink control channel (PUCCH) for MIMO Wireless Communication Systems.

BACKGROUND

Understanding and correctly estimating the channel in an advance wireless communication system between a user equipment (UE) and an eNode B (eNB) is important for efficient and effective wireless communication. In order to correctly estimate the channel conditions, the UE will report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

The present disclosure relates to a pre-$5^{th}$-Generation (5G) or 5G communication system to be provided for supporting higher data rates beyond $4^{th}$-Generation (4G) communication system such as Long Term Evolution (LTE). Embodiments of the present disclosure provide a hybrid CSI reporting on PUCCH for MIMO wireless communication systems.

In one embodiment, a user equipment (UE) for communicating in a multi-input multi-output (MIMO) wireless communication system is provided. The UE includes a transceiver configured to receive, from an eNodeB (eNB), periodic CSI feedback configuration information including a periodicity value and an offset value corresponding to a first CSI report, and at least one periodicity value and at least one offset value corresponding to a second CSI report. The UE further includes at least one processor configured to measure a first CSI reference signal (CSI-RS) and a second CSI-RS configured for a periodic CSI reporting based on at least two different enhanced MIMO types (eMIMO-Types), the at least two different eMIMO-Types comprising a first eMIMO-Type and a second eMIMO-Type that are configured with at least two different antenna port configurations, respectively; generate the first CSI report and the second CSI report for the first eMIMO-Type and the second eMIMO-Type, respectively, using respective codebooks for the first eMIMO-Type and the second eMIMO-Type, the first CSI report and the second CSI report being associated with the first CSI-RS and the second CSI-RS, respectively; determine a periodic reporting interval for each of the first CSI report and the second CSI report, wherein the periodic reporting interval for the first CSI report is determined based on at least one of the periodicity value or the offset value corresponding to the first CSI report, and at least one periodicity value and at least one offset value corresponding to the second CSI report; and report the first and second CSI reports based on the determined periodic reporting intervals using a physical uplink control channel (PUCCH) format 2 or a PUCCH format 3 or a combination of the PUCCH format 2 and the PUCCH format 3.

In another embodiment, an eNodeB (eNB) for communicating in a multi-input multi-output (MIMO) wireless communication system is provided. The eNB includes at least one processor configured to determine a first CSI reference signal (CSI-RS) and a second CSI-RS configured for a periodic CSI reporting based on at least two different enhanced MIMO types (eMIMO-Types), the at least two different eMIMO-Types comprising a first eMIMO-Type and a second eMIMO-Type that are configured with at least two different antenna port configurations, respectively; and determine a periodic reporting interval for each of a first CSI report and a second CSI report, wherein the periodic reporting interval for the first CSI report is determined based on at least one of a periodicity value or an offset value corresponding to the first CSI report, and at least one periodicity value and at least one offset value corresponding to the second CSI report. The eNB further includes a transceiver configured to transmit, to user equipment (UE), periodic CSI feedback configuration information including a periodicity value and an offset value corresponding to a first CSI report, and at least one periodicity value and at least one offset value corresponding to a second CSI report; and receive, from the UE, the first and second CSI reports based on the determined periodic reporting intervals using a physical uplink control channel (PUCCH) format 2 or a PUCCH format 3 or a combination of the PUCCH format 2 and the PUCCH format 3, wherein the first CSI report and the second CSI report are generated for the first eMIMO-Type and the second eMIMO-Type, respectively, using respective codebooks for the first eMIMO-Type and the second eMIMO-Type, the first CSI report and the second CSI report being associated with the first CSI-RS and the second CSI-RS, respectively.

In yet another embodiment, a method for communicating in a multi-input multi-output (MIMO) wireless communication system is provided. The method comprising receiving, from an eNodeB (eNB), periodic CSI feedback configuration information including a periodicity value and an offset value corresponding to a first CSI report, and at least one periodicity value and at least one offset value corresponding to a second CSI report; measuring a first CSI reference signal (CSI-RS) and a second CSI-RS configured for a periodic CSI reporting based on at least two different enhanced MIMO types (eMIMO-Types), the at least two different eMIMO-Types comprising a first eMIMO-Type and a second eMIMO-Type that are configured with at least two different antenna port configurations, respectively; generating the first CSI report and the second CSI report for the first eMIMO-Type and the second eMIMO-Type, respectively, using respective codebooks for the first eMIMO-Type and the second eMIMO-Type, the first CSI report and the second CSI report being associated with the first CSI-RS and the second CSI-RS, respectively; determining a periodic reporting interval for each of the first CSI report and the second CSI report, wherein the periodic reporting interval for the first CSI report is determined based on at least one of the periodicity value or the offset value corresponding to the first CSI report, and at least one periodicity value and at least one offset value corresponding to the second CSI report; and reporting the first and second CSI reports based on the determined periodic reporting intervals using a physical uplink control channel (PUCCH) format 2 or a PUCCH format 3 or a combination of the PUCCH format 2 and the PUCCH format 3.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 illustrates an example dual-polarized antenna port layouts for {24, 48, 96} ports according to embodiments of the present disclosure;

FIG. 17 illustrates an example dual-polarized antenna port layouts for {32, 64, 128} ports according to embodiments of the present disclosure;

DETAILED DESCRIPTION

FIG. 1 through FIG. 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.0.0, "E-UTRA, Physical channels and modulation" (REF1); 3GPP TS 36.212 v13.0.0, "E-UTRA, Multiplexing and Channel coding" (REF2); 3GPP TS 36.213 v13.0.0, "E-UTRA, Physical Layer Procedures" (REF3); 3GPP TS 36.321 v13.0.0, "E-UTRA, Medium Access Control (MAC) protocol specification" (REF4); 3GPP TS 36.331 v13.0.0, "E-UTRA, Radio Resource Control (RRC) protocol specification" (REF5).

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
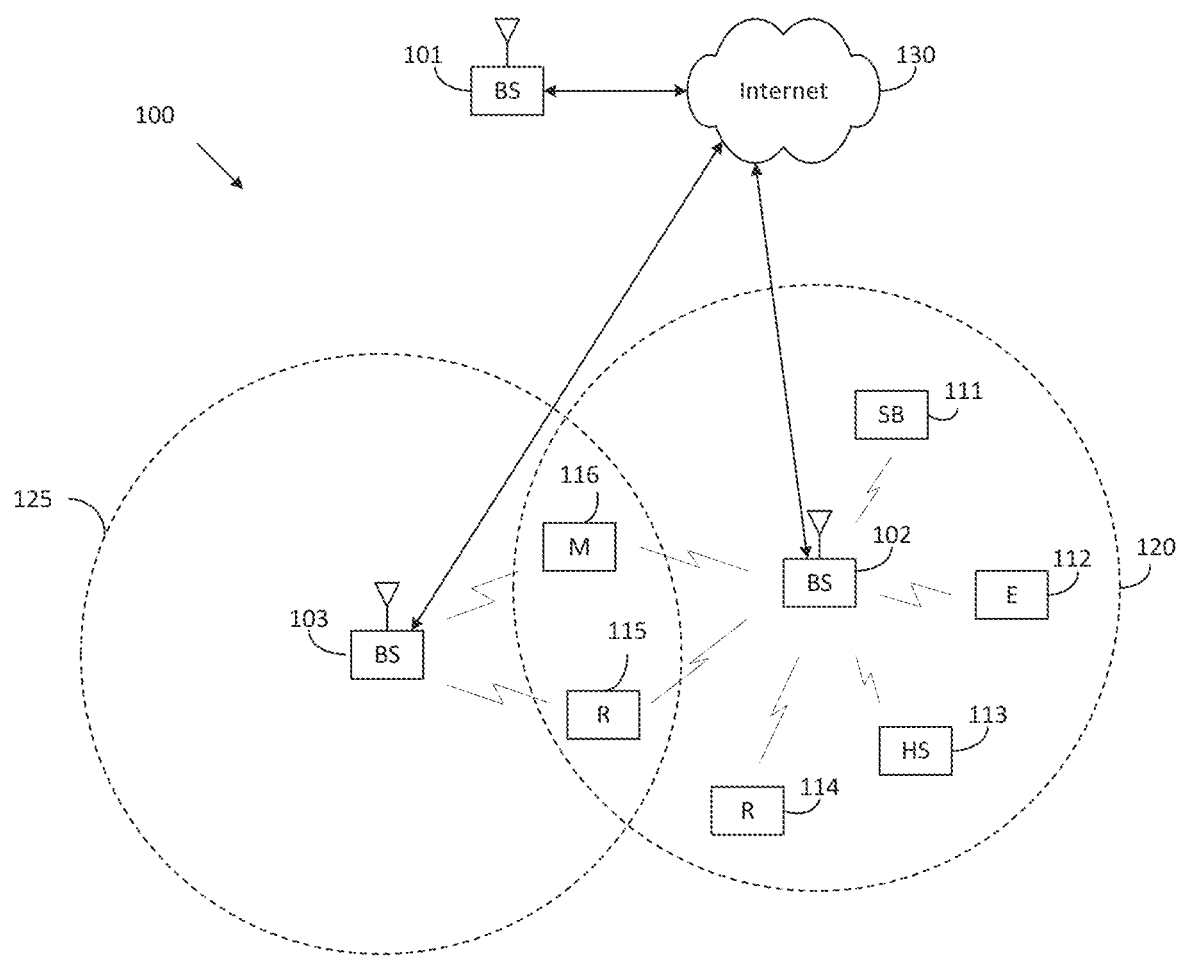
FIG. 1 illustrates an example wireless network according to embodiments of the present disclosure.
Figure 2:
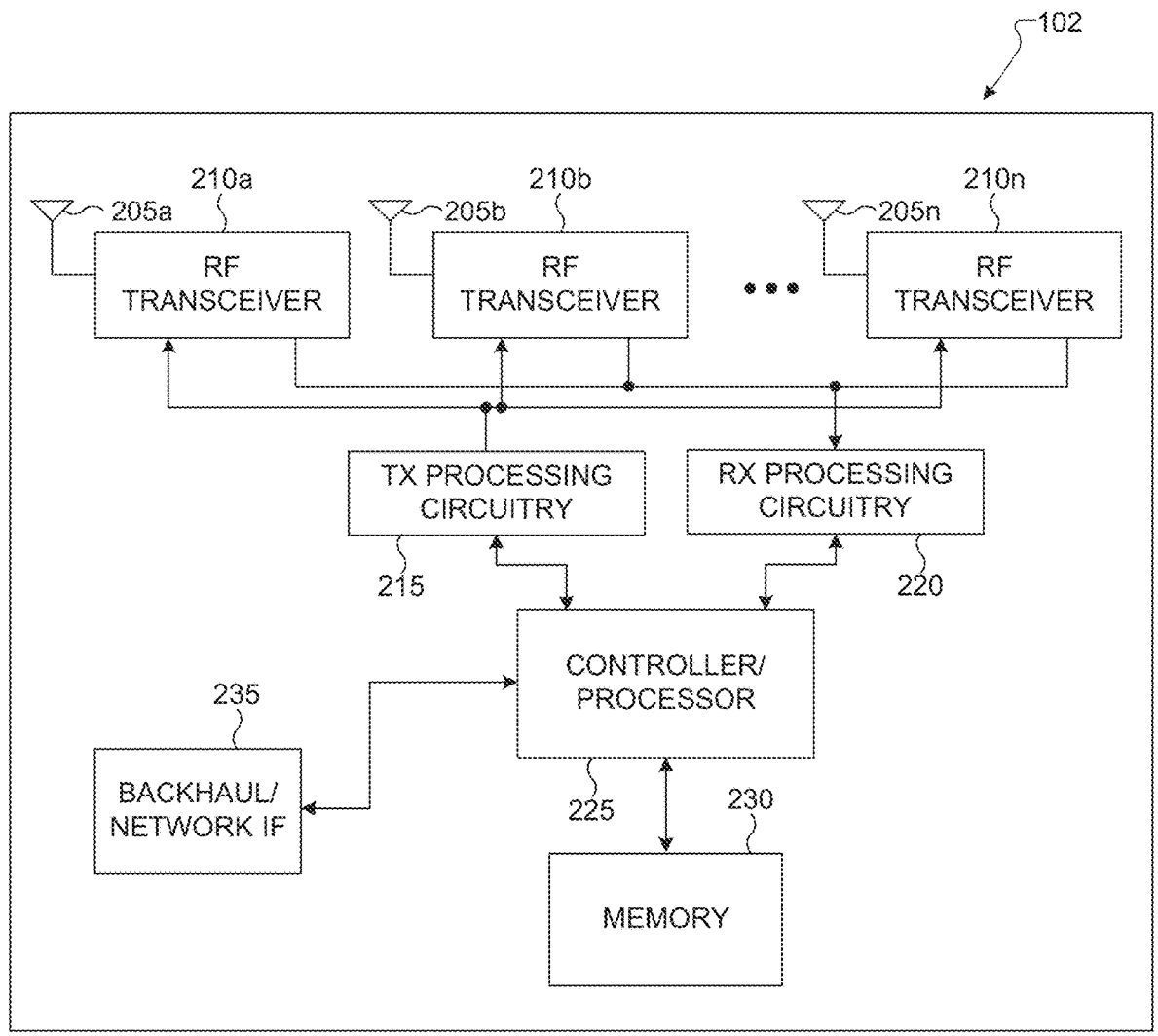
FIG. 2 illustrates an example eNodeB (eNB) according to embodiments of the present disclosure.
Figure 3:
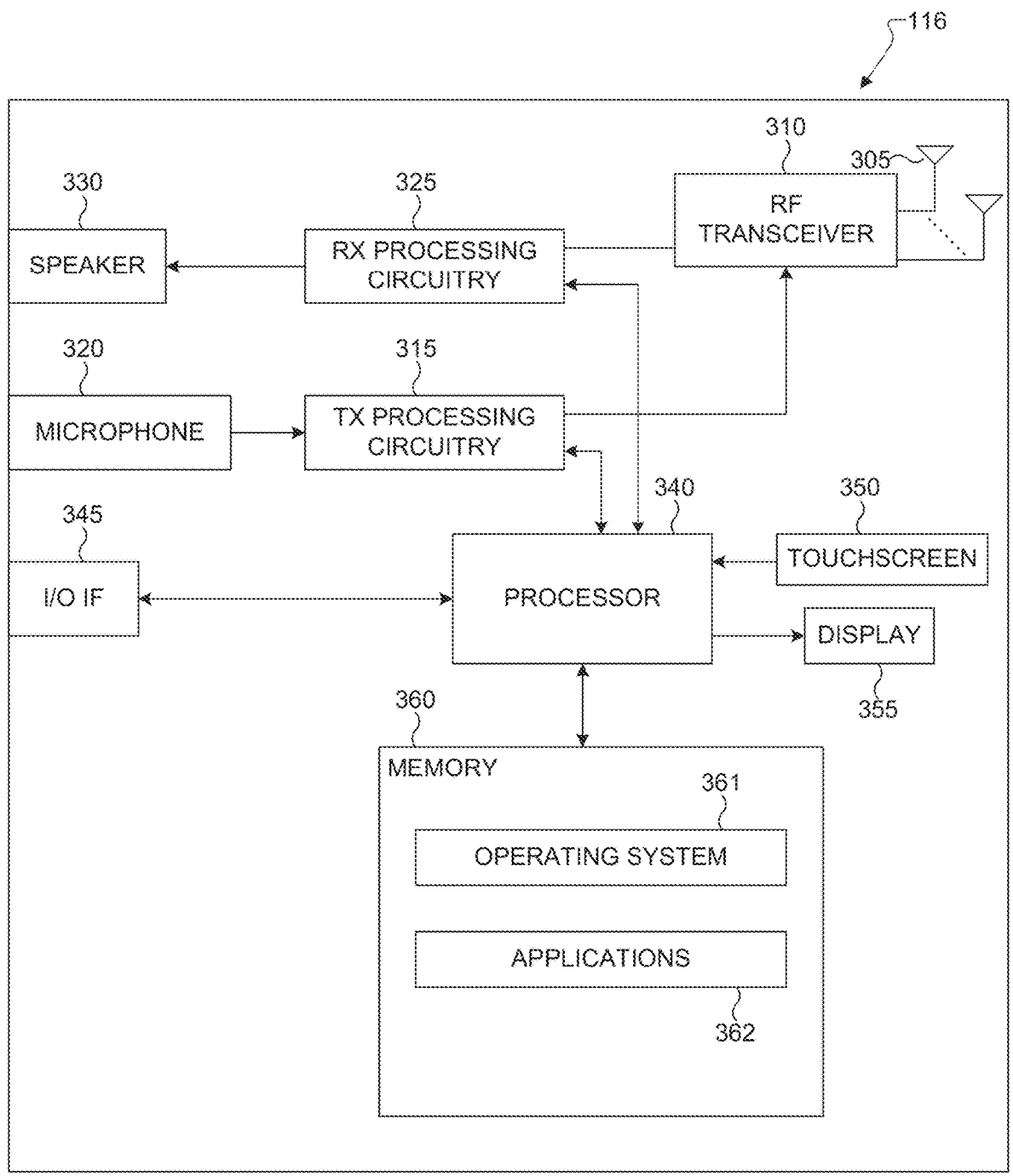
FIG. 3 illustrates an example user equipment (UE) according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient CSI reporting on PUCCH in an advanced wireless communication system. In certain embodiments, and one or more of the eNBs 101-103 includes circuitry, programing, or a combination thereof, for receiving efficient CSI reporting on PUCCH in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceivers 210a-210n are capable of transmitting, to user equipment (UE), periodic CSI feedback configuration information including a periodicity value and an offset value corresponding to a first CSI report, and at least one periodicity value and at least one offset value corresponding to a second CSI report; and receiving, from the UE, the first and second CSI reports based on the determined periodic reporting intervals using a physical uplink control channel (PUCCH) format 2 or a PUCCH format 3 or a combination of the PUCCH format 2 and the PUCCH format 3, wherein the first CSI report and the second CSI report are generated for the first eMIMO-Type and the second eMIMO-Type, respectively, the first CSI report and the second CSI report being associated with the first CSI-RS and the second CSI-RS, respectively.

In some embodiments, the RF transceivers 210a-210n are capable of receiving the first CSI report associated with the first eMIMO-Type, wherein the first CSI report includes at least one of a first precoding matrix index (PMI) or a first rank indicator (RI), and wherein the first PMI comprises at least one of a single PMI or a pair of two PMIs and the first eMIMO-Type is Class A; and receiving the second CSI report associated with the second eMIMO-Type, wherein the second CSI report includes at least one of a second PMI, a second RI, or a channel quality indicator (CQI), and wherein and the second eMIMO-Type is Class B with K=1 resource.

In some embodiments, the RF transceivers 210a-210n are capable of jointly receiving at least one of a first PMI or a first RI that is included in the first CSI report; and receiving each of the first and second CSI reports based on the determined periodic reporting interval using the PUCCH format, wherein the determined periodic reporting interval of the first CSI report is determined based on at least one of the periodicity value $M_{PMI/RI}$ or the offset value $N_{OFFSET, PMI/RI}$ included in the periodic CSI feedback configuration information, wherein the periodicity value $M_{PMI/RI}$ is determined based on at least one of the periodicity values $M_{RI}$ and $N_{pd}$ for the second RI, or CQI, respectively, and wherein the offset value $N_{OFFSET,PMI/RI}$ is determined based on at least one of the offset values $N_{OFFSET,CQI}$ and $N_{OFFSET,RI}$ for the CQI or the second RI, respectively.

In some embodiments, the RF transceivers 210a-210n are capable of jointly receiving wideband first PMI and first RI included in the first CSI report in subframes satisfying $(10 \times n_f + \lfloor n_s/2 \rfloor - N_{OFFSET,CQI} - N_{OFFSET,RI} - N_{OFFSET,PMI/RI})$ mod$(N_{pd} \cdot M_{RI} \cdot M_{PMI/RI})=0$ if a number of antenna ports associated with the second eMIMO-Type is more than 1 and $(10 \times n_f + \lfloor n_s/2 \rfloor - N_{OFFSET,CQI} - N_{OFFSET,PMI/RI})$ mod $(N_{pd} \cdot M_{PMI/RI})=0$ if the number of antenna ports associated with the second eMIMO-Type is 1.

In some embodiments, the RF transceivers 210a-210n are capable of separately receiving first PMI and first RI that are included in the first CSI report; and receiving each of the first and second CSI reports based on the determined periodic reporting interval using the PUCCH format, wherein each of the periodic reporting intervals for first PMI and a first RI, respectively, is determined based on the at least one of the periodicity value or the offset value included in the periodic CSI feedback configuration information, wherein each of the periodicity values for the first PMI and the first RI, respectively, is determined either based on one another or at least one of the second RI or CQI, and wherein each of the offset values for the first PMI and the first RI, respectively, is determined either based on one another or either CQI or the CQI and the second RI.

In some embodiments, the RF transceivers 210a-210n are capable of receiving at least one of the first or second CSI report using at least one of a physical uplink shared channel (PUSCH) Mode 0-1 or a PUSCH Mode 3-1 based on aperiodic CSI feedback configuration information; or receiving both of the first and second CSI reports using a PUCCH Mode 3-2 based on the aperiodic CSI feedback configuration information. In such embodiments, the aperiodic CSI feedback configuration information for an aperiodic CSI reporting is received from the eNB.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programing, or a combination thereof for processing of CSI reporting on PUCCH. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is capable of determining a first CSI reference signal (CSI-RS) and a second CSI-RS configured for a periodic CSI reporting based on at least two different enhanced MIMO types (eMIMO-Types), the at least two different eMIMO-Types comprising a first eMIMO-Type and a second eMIMO-Type that are generated using at least two different antenna port configurations, respectively; and determining a periodic reporting interval for each of a first CSI report and a second CSI report, wherein the periodic reporting interval for the first CSI report is determined based on at least one of a periodicity value or an offset value corresponding to the first CSI report, and at least one periodicity value and at least one offset value corresponding to the second CSI report.

In some embodiments, the controller/processor 225 is capable of determining the first CSI-RS that is a non-precoded (NP) CSI-RS and the second CSI-RS that is a beamformed (BF) CSI-RS with K=1 resource.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from an eNodeB (eNB), periodic CSI feedback configuration information including a periodicity value and an offset value corresponding to a first CSI report, and at least one periodicity value and at least one offset value corresponding to a second CSI report.

In some embodiments, the RF transceiver 310 is capable of jointly reporting at least one of a first PMI or a first RI that is included in the first CSI report; and reporting each of the first and second CSI reports based on the determined periodic reporting interval using the PUCCH format, wherein the determined periodic reporting interval of the first CSI report is determined based on at least one of the periodicity value $M_{PMI/RI}$ or the offset value $N_{OFFSET,PMI/RI}$ included in the periodic CSI feedback configuration information, wherein the periodicity value $M_{PMI/RI}$ is determined based on at least one of the periodicity values $M_{RI}$ and $N_{pd}$ for the second RI, or CQI, respectively, and wherein the offset value $N_{OFFSET,PMI/RI}$ is determined based on at least one of the offset values $N_{OFFSET,CQI}$ and $N_{OFFSET,RI}$ for the CQI or the second RI, respectively.

In some embodiments, the RF transceiver 310 is capable of jointly reporting wideband first PMI and first RI included in the first CSI report in subframes satisfying $(10 \times n_f + \lfloor n_s/2 \rfloor - N_{OFFSET,CQI} - N_{OFFSET,RI} - N_{OFFSET,PMI/RI}) \mod (N_{pd} \cdot M_{RI} \cdot M_{PMI/RI}) = 0$ if a number of antenna ports associated with the second eMIMO-Type is more than 1 and $(10 \times n_f + \lfloor n_s/2 \rfloor - N_{OFFSET,CQI} - N_{OFFSET,PMI/RI}) \mod (N_{pd} \cdot M_{PMI/RI}) = 0$ if the number of antenna ports associated with the second eMIMO-Type is 1.

In some embodiments, the RF transceiver 310 is capable of separately reporting first PMI and first RI that are included in the first CSI report; and reporting each of the first and second CSI reports based on the determined periodic reporting interval using the PUCCH format, wherein each of the periodic reporting intervals for first PMI and a first RI, respectively, is determined based on the at least one of the periodicity value or the offset value included in the periodic CSI feedback configuration information, wherein each of the periodicity values for the first PMI and the first RI, respectively, is determined either based on one another or at least one of the second RI or CQI, and wherein each of the offset values for the first PMI and the first RI, respectively, is determined either based on one another or either CQI or the CQI and the second RI.

In some embodiments, the RF transceiver 310 is capable of reporting at least one of the first or second CSI report using at least one of a physical uplink shared channel (PUSCH) Mode 0-1 or a PUSCH Mode 3-1 based on aperiodic CSI feedback configuration information; or reporting both of the first and second CSI reports using a PUCCH Mode 3-2 based on the aperiodic CSI feedback configuration information. In such embodiments, the aperiodic CSI feedback configuration information for an aperiodic CSI reporting is received from the eNB.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of measuring a first CSI reference signal (CSI-RS) and a second CSI-RS configured for a periodic CSI reporting based on at least two different enhanced MIMO types (eMIMO-Types), the at least two different eMIMO-Types comprising a first eMIMO-Type and a second eMIMO-Type that are generated using at least two different antenna port configurations, respectively; generating the first CSI report and the second CSI report for the first eMIMO-Type and the second eMIMO-Type, respectively, the first CSI report and the second CSI report being associated with the first CSI-RS and the second CSI-RS, respectively; determining a periodic reporting interval for each of the first CSI report and the second CSI report, wherein the periodic reporting interval for the first CSI report is determined based on at least one of the periodicity value or the offset value corresponding to the first CSI report, and at least one periodicity value and at least one offset value corresponding to the second CSI report; and reporting the first and second CSI reports based on the determined periodic reporting intervals using a physical uplink control channel (PUCCH) format 2 or a PUCCH format 3 or a combination of the PUCCH format 2 and the PUCCH format 3.

In some embodiments, the processor 340 is also capable of measuring the first CSI-RS that is a non-precoded (NP) CSI-RS and the second CSI-RS that is a beamformed (BF) CSI-RS with K=1 resource; generating at least one of a first precoding matrix index (PMI) or a first rank indicator (RI) that is included in the first CSI report associated with the first eMIMO-Type, wherein the first PMI comprises at least one of a single PMI or a pair of two PMIs and the first eMIMO-Type is Class A; and generating at least one of a second PMI, a second RI, or a channel quality indicator (CQI) that is included in the second CSI report associated with the second eMIMO-Type, wherein and the second eMIMO-Type is Class B with K=1 resource.

In some embodiments, the processor 340 is also capable of measuring the first CSI-RS for the first CSI report based on the first eMIMO-Type generated using a subset of antenna ports, and wherein the first CSI-RS comprises an NP CSI-RS.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
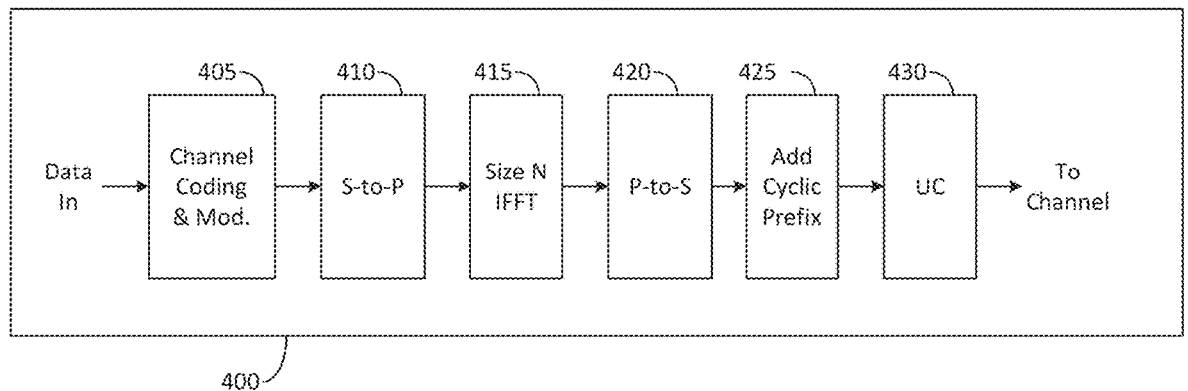
FIG. 4A illustrates a high-level diagram of an orthogonal frequency division multiple access transmit path according to embodiments of the present disclosure.
Figure 4B:
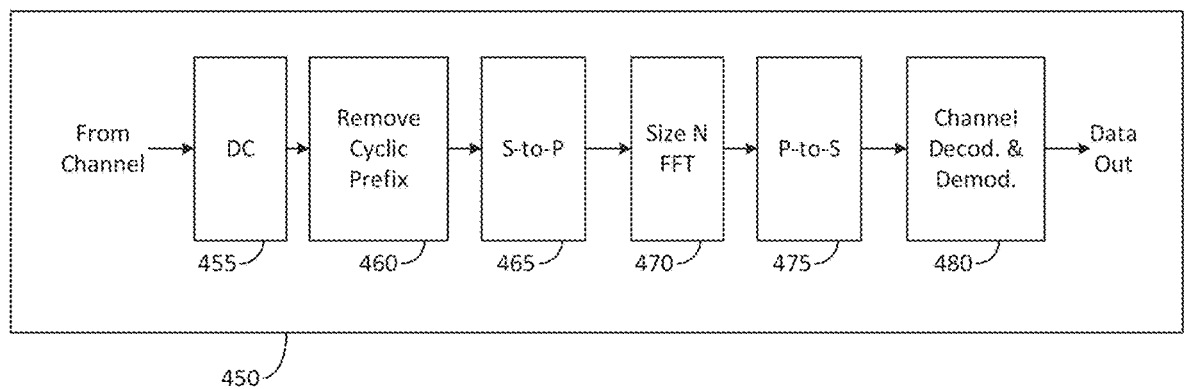
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel.12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basis functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
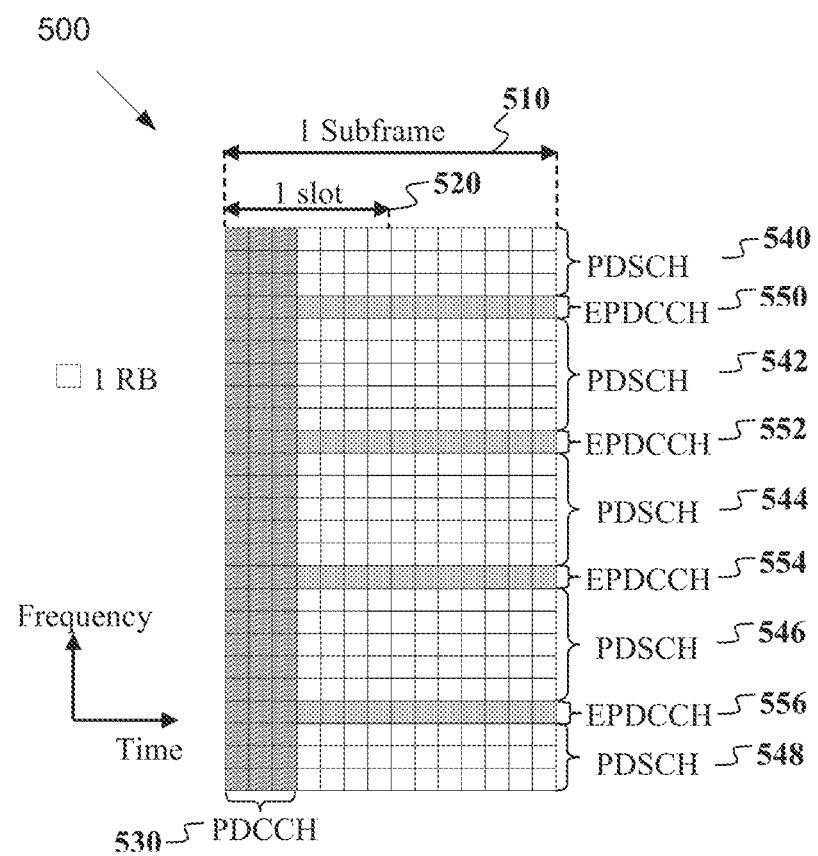
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe structure 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining Z SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to $M_{PDSCH}$ RBs for a total of $Z=O_F+\lfloor(n_{s0}+y \cdot N_{EPDCCH})/D\rfloor$ REs for a PDSCH transmission BW. An EPDCCH transmission is achieved in either one RB or multiple of RBs.

Figure 6:
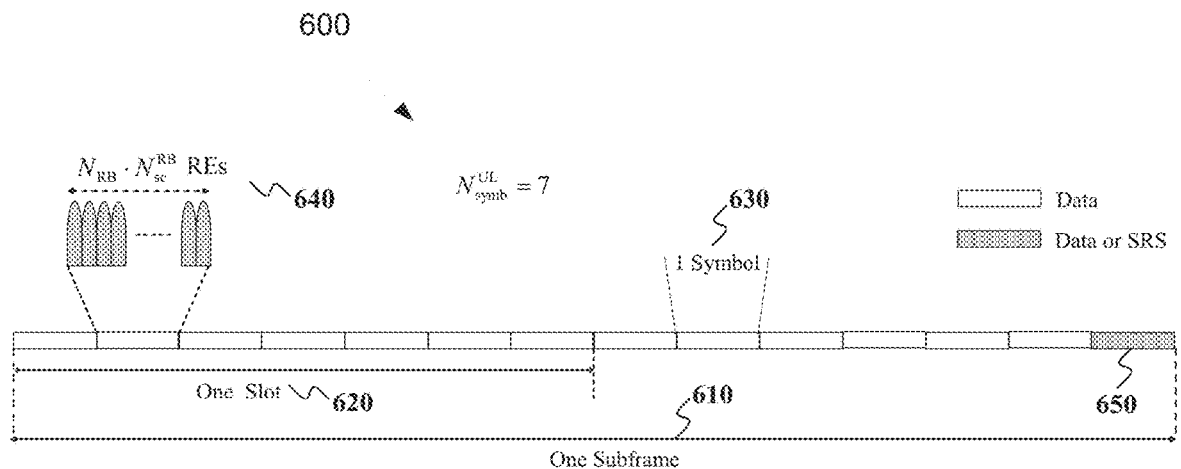
FIG. 6 illustrates an example transmission structure of an uplink (UL) subframe according to embodiments of the present disclosure.

FIG. 6 illustrates an example transmission structure of a physical uplink shared channel (PUSCH) subframe or a physical uplink control channel (PUCCH) subframe 600. Embodiments of the transmission structure for the PUSCH or the PUCCH over the UL subframe shown in FIG. 6 is for illustration only. Other embodiments could be used without departing from the scope of the present disclosure. A UL subframe 610 includes two slots. Each slot 620 includes $N_{symb}^{UL}$ symbols 630 for transmitting data information, uplink control information (UCI), demodulation reference signals (DMRS), or sounding RSs (SRSs). A frequency resource unit of an UL system BW is a RB. A UE is allocated to $N_{RB}$ RBs 640 for a total of $N_{RB} \cdot NR_{sc}^{RB}$ resource elements (Res) for a transmission BW. For a PUCCH, $N_{RB}=1$. A last subframe symbol is used to multiplex SRS transmissions 650 from one or more UEs. A number of subframe symbols that are available for data/UCI/DMRS transmission is $N_{symb}=2 \cdot (N_{symb}^{UL}-1)-N_{SRS}$, $N_{SRS}$, where $N_{SRS}=1$ if a last subframe symbol is used to transmit SRS and $N_{SRS}=0$ otherwise.

Figure 7:
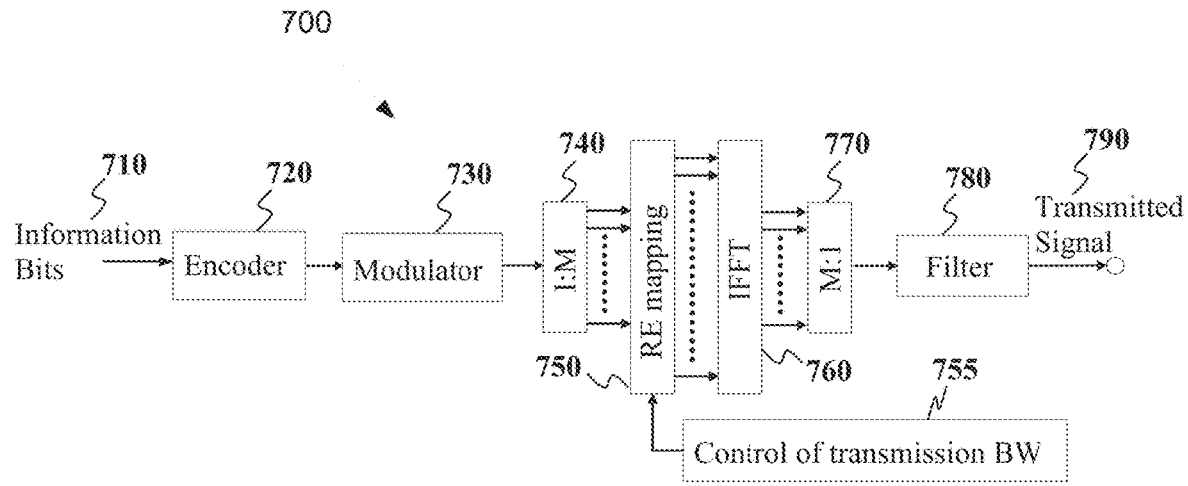
FIG. 7 illustrates an example transmitter block diagram for a physical downlink shared channel (PDSCH) subframe according to embodiments of the present disclosure.

FIG. 7 illustrates an example transmitter block diagram for a physical downlink shared channel (PDSCH) subframe 700 according to embodiments of the present disclosure. An embodiment of the PDSCH transmitter block diagram 700 shown in FIG. 7 is for illustration only. Other embodiments are used without departing from the scope of the present disclosure.

Information bits 710 are encoded by an encoder 720 (such as a turbo encoder) and modulated by a modulator 730, for example using a quadrature phase shift keying (QPSK) modulation. A Serial to Parallel (S/P) converter 740 generates M modulation symbols that are subsequently provided to a mapper 750 to be mapped to REs selected by a transmission BW selection unit 755 for an assigned PDSCH transmission BW, unit 760 applies an inverse fast fourier transform (IFFT). An output is then serialized by a parallel to a serial (P/S) converter 770 to create a time domain signal, filtering is applied by a filter 780, and then signal is transmitted. Additional functionalities, such as data scrambling, a cyclic prefix insertion, a time windowing, an interleaving, and others are well known in the art and are not shown for brevity.

Figure 8:
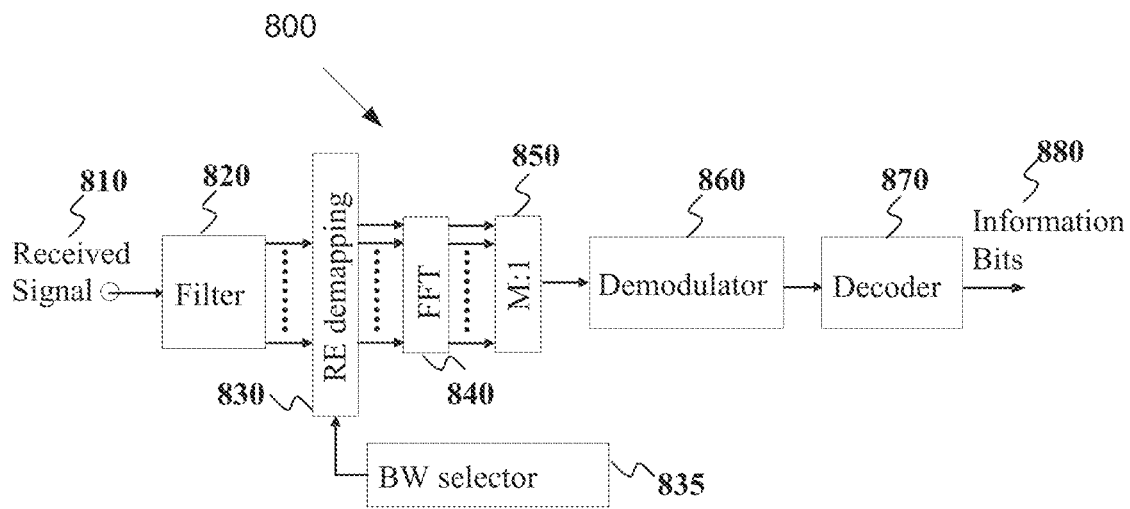
FIG. 8 illustrates an example receiver block diagram for a PDSCH subframe according to embodiments of the present disclosure.

FIG. 8 illustrates an example receiver block diagram for a packet data shared channel (PDSCH) subframe 800 according to embodiments of the present disclosure. An embodiment of the PDSCH receiver block diagram 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments can be used without departing from the scope of the present disclosure.

A received signal 810 is filtered by a filter 820, and then is output to a resource element (RE) demapping block 830. The RE demapping 830 assigns a reception bandwidth (BW) that is selected by a BW selector 835. The BW selector 835 is configured to control a transmission BW. A fast Fourier transform (FFT) circuit 840 applies a FFT. The output of the FFT circuitry 840 is serialized by a parallel-to-serial converter 850. Subsequently, a demodulator 860 coherently demodulates data symbols by applying a channel estimate obtained from a demodulation reference signal (DMRS) or a common reference signal (CRS) (not shown), and then a decoder 870 decodes demodulated data to provide an estimate of the information data bits 880. The decoder 870 can be configured to implement any decoding process, such as a turbo decoding process. Additional functionalities such as time-windowing, a cyclic prefix removal, a de-scrambling, channel estimation, and a de-interleaving are not shown for brevity.

Figure 9:
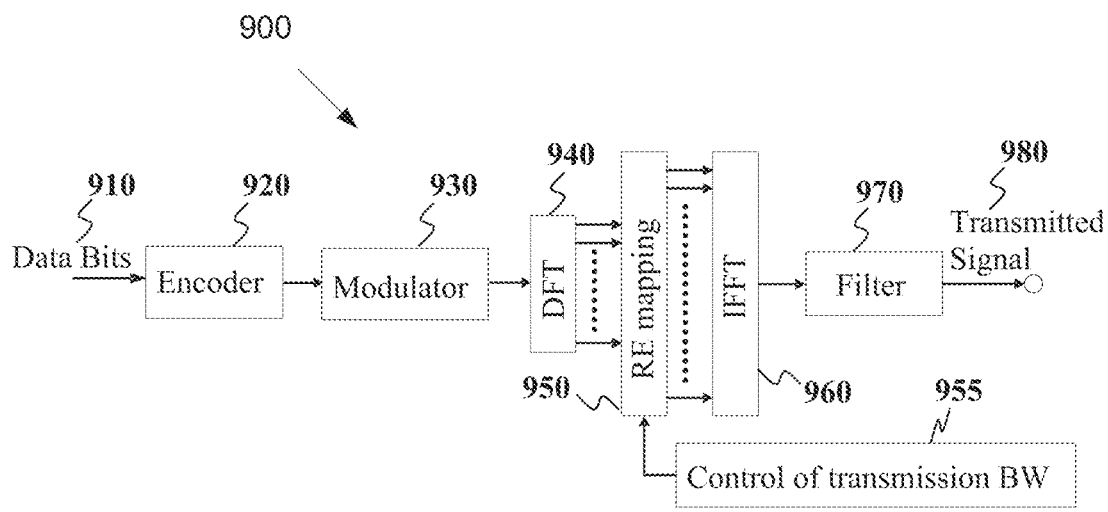
FIG. 9 illustrates an example transmitter block diagram for a physical uplink shared channel (PUSCH) subframe according to embodiments of the present disclosure.

FIG. 9 illustrates a transmitter block diagram for a physical uplink shared channel (PUSCH) subframe 900 according to embodiments of the present disclosure. One or more of the components illustrated in FIG. 9 can be implemented in specialized circuitry configured to perform the noted functions or one or more of the components can be implemented by one or more processors executing instructions to perform the noted functions. An embodiment of the PUSCH transmitter block diagram 900 shown in FIG. 9 is for illustration only. Other embodiments are used without departing from the scope of the present disclosure.

Information data bits 910 are encoded by an encoder 920 and modulated by a modulator 930. Encoder 920 can be configured to implement any encoding process, such as a turbo coding process. A discrete Fourier transform (DFT) circuitry 940 applies a DFT on the modulated data bits. REs are mapped by an RE mapping circuit 950. The REs corresponding to an assigned PUSCH transmission BW are selected by a transmission BW selection unit 955. An inverse FFT (IFFT) circuit 960 applies an IFFT to the output of the RE mapping circuit 950. After a cyclic prefix insertion (not shown), filter 970 applies a filtering. The filtered signal then is transmitted.

Figure 10:
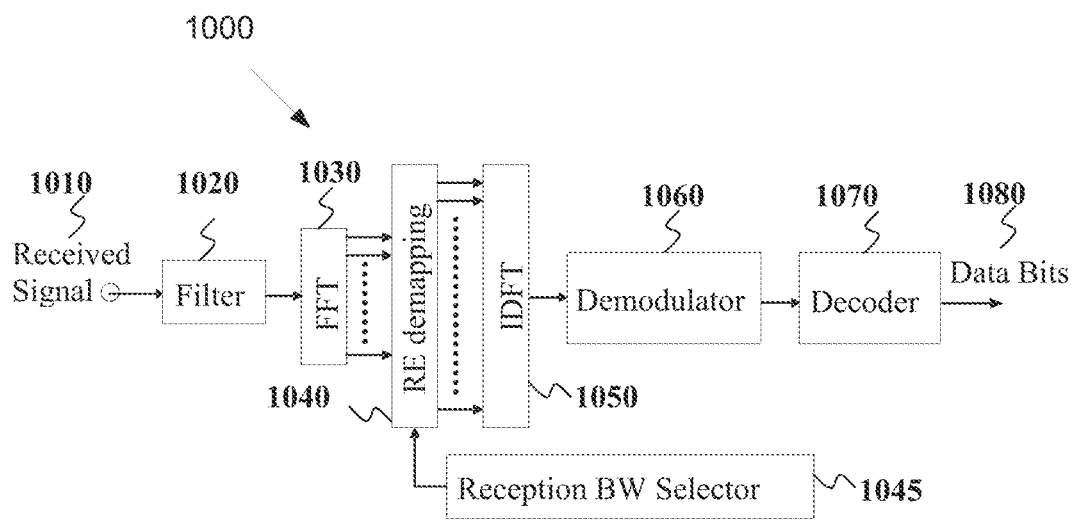
FIG. 10 illustrates an example receiver block diagram for a PUSCH in a subframe according to embodiments of the present disclosure.

FIG. 10 illustrates an example receiver block diagram for a PUSCH subframe 1000 according to embodiments of the present disclosure. An embodiment of the PUSCH receiver block diagram 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received signal 1010 is filtered by a filter 1020. Subsequently, after a cyclic prefix is removed (not shown), an FFT circuit 1030 applies an FFT. REs are mapped by an RE mapping circuit 1040. REs 1040 corresponding to an assigned PUSCH reception BW are selected by a reception BW selector 1045. An inverse DFT (IDFT) circuit 1050 applies an IDFT. Demodulator 1060 receives an output from IDFT circuit 1050 and coherently demodulates data symbols by applying a channel estimate obtained from a DMRS (not shown). A decoder 1070 decodes the demodulated data to provide an estimate of the information data bits 1080. The decoder 1070 can be configured to implement any decoding process, such as a turbo decoding process.

Figure 11:
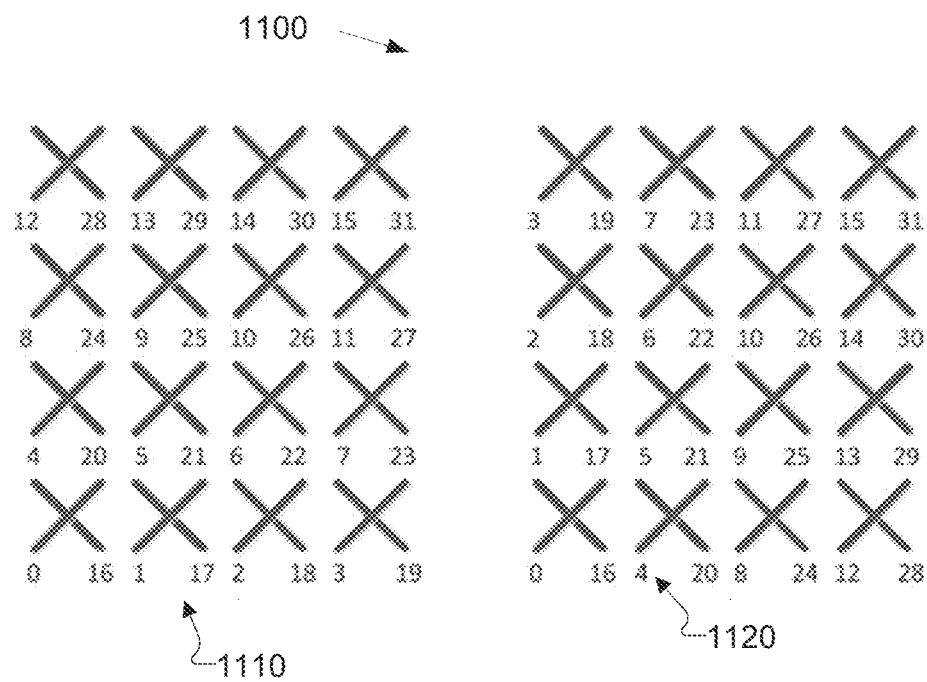
FIG. 11 illustrates an example configuration of a two dimensional (2D) array according to embodiments of the present disclosure.

FIG. 11 illustrates an example configuration of a two dimensional (2D) antenna array 1100 which is constructed from 16 dual-polarized antenna elements arranged in a 4×4 rectangular format according to embodiments of the present disclosure. In this illustration, each labelled antenna element is logically mapped onto a single antenna port. Two alternative labelling conventions are depicted for illustrative purposes (such as a horizontal first in 1110 and a vertical first in 1120). In one embodiment, one antenna port corresponds to multiple antenna elements (such as physical antennas) combined via a virtualization. This 4×4 dual polarized array is then viewed as 16×2=32-element array of elements. The vertical dimension (such as including 4 rows) facilitates an elevation beamforming in addition to an azimuthal beamforming across a horizontal dimension including 4 columns of dual polarized antennas. A MIMO precoding in Rel.12 of the LTE standardization was largely designed to offer a precoding gain for one-dimensional antenna array. While fixed beamforming (such as antenna virtualization) is implemented across an elevation dimension, it is unable to reap a potential gain offered by a spatial and frequency selective nature of channels.

In 3GPP LTE specification, MIMO precoding (for beamforming or spatial multiplexing) can be facilitated via precoding matrix index (PMI) reporting as a component of channel state information (CSI) reporting. The PMI report is derived from one of the following sets of standardized codebooks: two antenna ports (single-stage); four antenna ports (single-stage or dual-stage); eight antenna ports (dual-stage); configurable dual-stage eMIMO-Type of 'CLASS A' codebook for eight, twelve, or sixteen antenna ports (also known as 'nonPrecoded);' and single-stage eMIMO-Type of 'CLASS B' codebook for two, four, or eight antenna ports (also known as 'beamformed').

If an eNodeB follows a PMI recommendation from a UE, the eNB is expected to precode the eNB's transmitted signal according to a recommended precoding vector or matrix for a given subframe and RB. Regardless whether the eNB follows this recommendation, the UE is configured to report a PMI according to a configured precoding codebook. Here a PMI, which may consist of a single index or a pair of indices, is associated with a precoding matrix W in an associated codebook.

When dual-stage class A codebook is configured, a resulting precoding matrix can be described in equation (1). That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components. The first stage pertains to a long-term component. Therefore it is associated with long-term channel statistics such as the aforementioned AoD profile and AoD spread. On the other hand, the second stage pertains to a short-term component which performs selection, co-phasing, or any linear operation to the first component precoder $W_{1,1}(i_{1,1}) \otimes W_{1,2}(i_{1,2})$. The precoder $W_2(i_2)$, therefore, performs a linear transformation of the long-term component such as a linear combination of a set of basis functions or vectors associated with the column vectors of $W_{1,1}(i_{1,1}) \otimes W_{1,2}(i_{1,2})$).

$$W(i_{1,1}, i_{1,2}, i_2) = \underbrace{(W_{1,1}(i_{1,1}) \otimes W_{1,2}(i_{1,2}))}_{W_1(i_{1,1}, i_{1,2})} W_2(i_2) \quad (1)$$

The above discussion assumes that the serving eNB transmits and a served UE measures non-precoded CSI-RS (NP CSI-RS). That is, a cell-specific one-to-one mapping between CSI-RS port and TXRU is utilized. Here, different CSI-RS ports have the same wide beam width and direction and hence generally cell wide coverage. This use case can be realized when the eNB configures the UE with 'CLASS A' eMIMO-Type which corresponds to NP CSI-RS. Other than CQI and RI, CSI reports associated with 'CLASS A' or 'nonPrecoded' eMIMO-Type include a three-component PMI $\{i_{1,1}, i_{1,2}, i_2\}$.

Another type of CSI-RS applicable to FD-MIMO is beamformed CSI-RS (BF CSI-RS). In this case, beamforming operation, either cell-specific (with K>1 CSI-RS resources) or UE-specific (with K=1 CSI-RS resource), is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions. This beamforming operation is intended to increase CSI-RS coverage.

In addition, when UE-specific beamforming is applied to CSI-RS resource (termed the UE-specific or UE-specifically beamformed CSI-RS), CSI-RS overhead reduction is possible. UE complexity reduction is also evident since the configured number of ports tends to be much smaller than its NP CSI-RS counterpart. When a UE is configured to receive BF CSI-RS from a serving eNB, the UE can be configured to report PMI parameter(s) associated with a second-stage precoder without the associated first-stage precoder or, in general, associated with a single-stage precoder/codebook. This use case can be realized when the eNB configures the UE with 'CLASS B' eMIMO-Type which corresponds to BF CSI-RS. Other than CQI and RI, CSI reports associated with 'CLASS B' or 'beamformed' eMIMO-Type (with one CSI-RS resource and alternative codebook) include a one-component PMI n. Although a single PMI defined with respect to a distinct codebook, this PMI can be associated with the second-stage PMI component of 'CLASS A'/'nonPrecoded' codebooks $i_2$.

Therefore, given a precoding codebook (a set of precoding matrices), a UE measures a CSI-RS in a subframe designated to carry CSI-RS, calculates/determines a CSI (including PMI, RI, and CQI where each of these three CSI parameters can consist of multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beam-formed (BF) CSI-RS. As mentioned, in Rel.13, the support of these two types of CSI-RS is given in terms of two eMIMO-Types: 'CLASS A' (with one CSI-RS resource) and 'CLASS B' (with one or a plurality of CSI-RS resources), respectively.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification, the aforementioned precoding codebooks are utilized for CSI reporting. Two schemes of CSI reporting modes are supported (e.g., PUSCH-based aperiodic CSI (A-CSI) and PUCCH-based periodic CSI (P-CSI)). In each scheme, different modes are defined based on frequency selectivity of CQI and/or PMI, that is, whether wideband or subband reporting is performed. The supported CSI reporting modes are given in Table 1.

TABLE 1

CQI and PMI Feedback Types for PUSCH CSI reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

TABLE 2

CQI and PMI Feedback Types for PUCCH CSI reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |

TABLE 2-continued

CQI and PMI Feedback Types for PUCCH CSI reporting Modes

| | | PMI Feedback Type | |
|---|---|---|---|
| | | No PMI | Single PMI |
| | UE Selected (subband CQI) | Mode 2-0 | Mode 2-1 |

According to the WI, the hybrid CSI reporting based on non-precoded and beam-formed CSI-RS associated with two eMIMO-Types may be supported in LTE specification.

In the present disclosure, for brevity, FDD is considered as the duplex method for both DL and UL signaling but the embodiments of the present disclosure are also directly applicable to TDD.

Terms such as 'non-precoded' (or 'NP') CSI-RS and 'beamformed' (or 'BF') CSI-RS are used throughout this present disclosure. The present disclosure does not change when different terms or names are used to refer to these two CSI-RS types. The same holds for CSI-RS resource. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are exemplary and can be substituted with other labels such as '1' and '2', 'A' or 'B'. Alternatively, instead of using categories such as CSI-RS type or CSI-RS resource type, a category of CSI reporting class can also be used. For instance, NP CSI-RS is associated with eMIMO-Type of 'CLASS A' while UE-specific BF CSI-RS is associated with eMIMO-Type of 'CLASS B' with one CSI-RS resource.

Throughout the present disclosure, 2D dual-polarized array is used solely for illustrative purposes, unless stated otherwise. Extensions to 2D single-polarized array are straightforward for those skilled in the art.

Figure 12:
FIG. 12 illustrates an example dual-polarized antenna port layouts for {2, 4, 8, 12, 16} ports according to embodiments of the present disclosure.

FIG. 12 illustrates an example dual-polarized antenna port layouts for {2, 4, 8, 12, 16} ports 1200 according to embodiments of the present disclosure. An embodiment of the dual-polarized antenna port layouts for {2, 4, 8, 12, 16} ports 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, 2D antenna arrays are constructed from $N_1 \times N_2$ dual-polarized antenna elements arranged in a $(N_1, N_2)$ rectangular format for 2, 4, 8, 12, 16 antenna ports. In FIG. 12, each antenna element is logically mapped onto a single antenna port. In general, one antenna port may correspond to multiple antenna elements (physical antennas) combined via a virtualization. This $N_1 \times N_2$ dual polarized array can then be viewed as $2N_1N_2$-element array of elements.

The first dimension consists of $N_1$ columns and facilitates azimuth beamforming. The second dimension similarly consists of $N_2$ rows and allows elevation beamforming. MIMO precoding in LTE specification was largely designed to offer precoding (beamforming) gain for one-dimensional (1D) antenna array using 2, 4, 8 antenna ports, which correspond to $(N_1, N_2)$ belonging to $\{(1, 1), (2, 1), (4, 1)\}$. While fixed beamforming (i.e. antenna virtualization) can be implemented across the elevation dimension, it is unable to reap the potential gain offered by the spatial and frequency selective nature of the channel. Therefore, MIMO precoding in LTE specification is designed to offer precoding gain for two-dimensional (2D) antenna array using 8, 12, 16 antenna ports, which correspond to ($N_1$, $N_2$) belonging to {(2, 2), (2, 3), (3, 2), (8, 1), (4, 2), (2, 4)}.

Although ($N_1$, $N_2$)=(6, 1) case has not been supported in LTE specification, it may be supported in future releases. The embodiments of the present disclosure are general and are applicable to any ($N_1$, $N_2$) values including ($N_1$, $N_2$)=(6, 1). The first and second dimensions as shown in FIG. 12 are for illustration only. The present disclosure is applicable to the case, in which they are swapped, i.e., first and second dimensions respectively correspond to elevation and azimuth or any other pair of directions.

Figure 13:
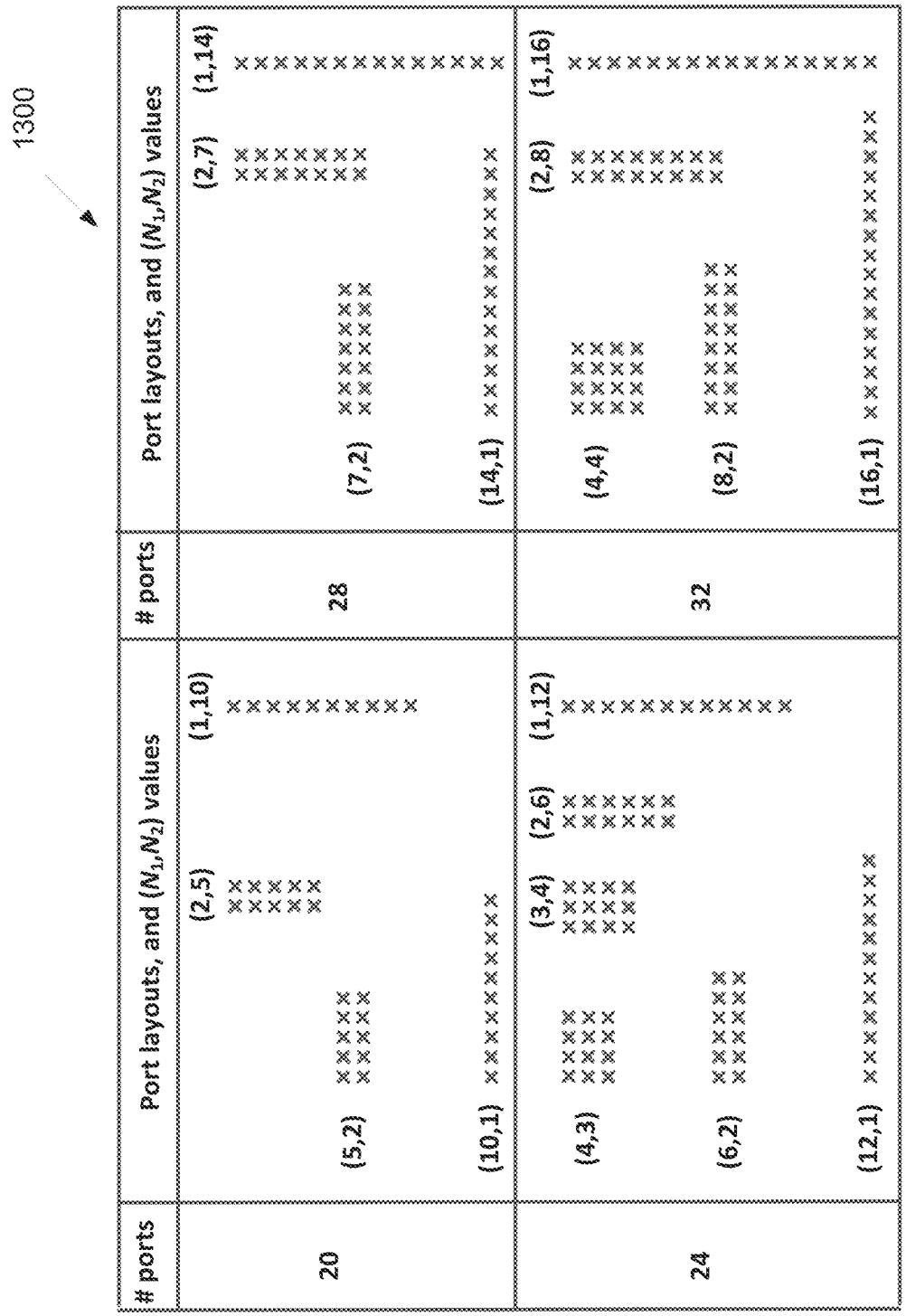
FIG. 13 illustrates an example dual-polarized antenna port layouts for {20, 24, 28, 32} ports according to embodiments of the present disclosure.

FIG. 13 illustrates an example dual-polarized antenna port layouts for {20, 24, 28, 32} ports 1300 according to embodiments of the present disclosure. An embodiment of the dual-polarized antenna port layouts for {20, 24, 28, 32} ports 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

According to LTE specification, an eFD-MIMO may support {20, 24, 28, 32} antenna ports. Assuming rectangular (1D or 2D) port layouts, there are several possible ($N_1$, $N_2$) values for {20, 24, 28, 32} ports. An illustration of 1D and 2D antenna port layouts for these ($N_1$, $N_2$) values are shown in FIG. 13.

In some embodiments, a UE is configured with one or both of the two types of CSI-RS resources. In one example, the "first non-zero-power (NZP) CSI-RS resource" corresponds to either a full port (e.g. CSI-RS is transmitted from all $2N_1N_2$ ports and it is non-precoded (NP) or Class A eMIMO-Type) or a partial port (e.g. CSI-RS is transmitted from a subset of $2N_1N_2$ ports). In such example, NP CSI-RS or Class A eMIMO-Type, or beam-formed (BF) CSI-RS or Class B eMIMO-Type with $K_1 \geq 1$ resources may be used. In another example, the "second NZP CSI-RS resource" corresponds to a BF CSI-RS or Class B eMIMO-Type with either $K_2=1$ resource or $K_2>1$ resources.

In some embodiments, the configured first CSI-RS has one component for each of the two dimensions. For 1D antenna port configurations, the first CSI-RS has one component, and for 2D antenna port configurations, the first CSI-RS has two components, for example, a first CSI-RS 1 or a first CSI-RS component 1, and a first CSI-RS 2 or a first CSI-RS component 2.

In some embodiments, the configured second CSI-RS has one component for each of the two dimensions. For 1D antenna port configurations, the second CSI-RS has one component, and for 2D antenna port configurations, the second CSI-RS has two components, for example, a second CSI-RS 1 or second CSI-RS component 1, and a second CSI-RS 2 or second CSI-RS component 2.

In some embodiments, the full-port first CSI-RS resource is also referred to as Class A CSI-RS or eMIMO-Type, the partial-port first CSI-RS resource is also referred to as Class B (K>1) CSI-RS or eMIMO-Type, and the second CSI-RS resource is also referred to as Class B CSI-RS or eMIMO-Type.

In LTE specification, the following CSI reporting types or eMIMO-Type are supported: 'Class A' eMIMO-Type in which "First CSI-RS resource" is full-port, NP and CSI is reported using Class A codebook; and 'Class B' eMIMO-Type in which "Second CSI-RS resource" is beamformed and CSI is reported using Class B codebook. In such embodiments, the following parameters are determined, K=1: CQI, PMI, RI feedback and K>1: CRI, CQI, PMI, RI feedback.

Figure 14:
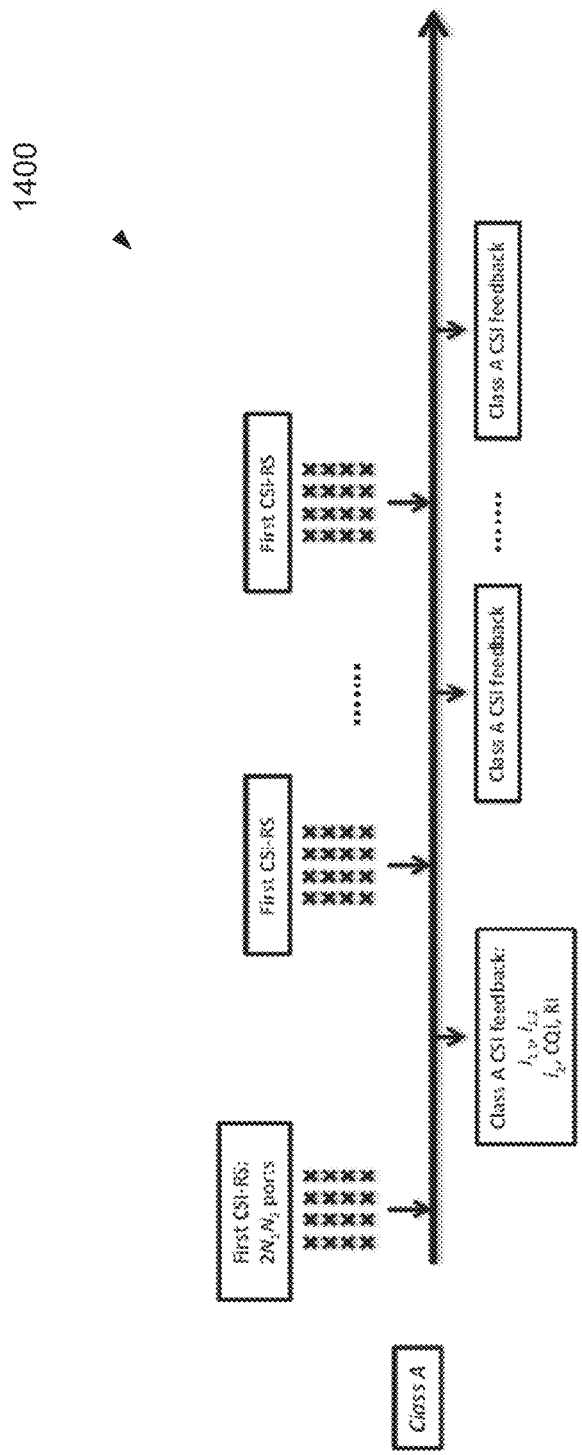
FIG. 14 illustrates an example Class A channel state information (CSI) feedback scheme according to embodiments of the present disclosure.

FIG. 14 illustrates an example Class A channel state information (CSI) feedback scheme 1400 according to embodiments of the present disclosure. An embodiment of the Class A CSI feedback scheme 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In LTE specification 'Class A' eMIMO-Type, a UE is configured with a CSI process comprising of a "first" CSI-RS resource for all $2N_1N_2$ ports. Upon receiving the CSI-RS for these ports, the UE derives and feeds back the Class A CSI feedback content comprising of the first PMI index pair, ($i_{1,1}$, $i_{1,2}$), the second PMI index $i_2$, CQI, and RI. An exemplary use case of the Class A CSI feedback scheme is described in FIG. 14. The UE derives the two PMIs using the Class A PMI codebook.

Figure 15:
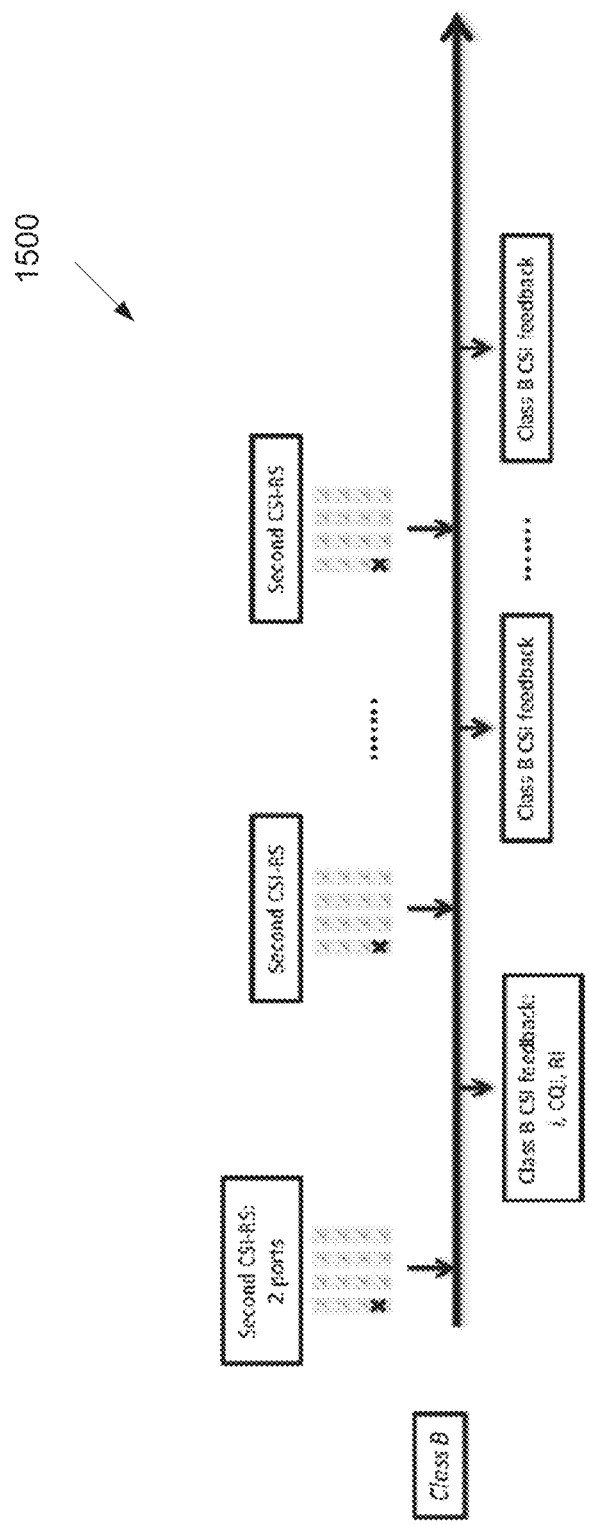
FIG. 15 illustrates an example Class B CSI feedback scheme according to embodiments of the present disclosure.

FIG. 15 illustrates an example Class B CSI feedback scheme 1500 according to embodiments of the present disclosure. An embodiment of the Class B CSI feedback scheme 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In LTE specification 'Class B' eMIMO-Type, a UE is configured with a CSI process comprising of a "second" CSI-RS resource for a subset of $2N_1N_2$ ports. For example, the number of configured ports is 2. Upon receiving the CSI-RS for these ports, the UE derives and feeds back the Class B CSI feedback content comprising of a single PMI i, CQI, and RI. An exemplary use case of the Class B CSI feedback scheme is described in FIG. 15. The UE derives the PMI using the Class B PMI codebook.

Note that the CSI-RS overhead with the Class A CSI feedback scheme is large, which may lead to performance loss. The overhead is small for Class B CSI feedback scheme, but it relies on the availability of beam-forming weights to beam-form Class B CSI-RS. The beam-forming weights may be obtained from UL SRS measurements assuming UL-DL duplex distance is small. Alternatively, it may be obtained through a Class A feedback configured with larger periodicity. The later alternative is an example of "Hybrid" CSI feedback scheme.

An issue with the Class A CSI feedback scheme for the future generation of communication system, is the increase in CSI-RS overhead to support larger number of antenna ports. In particular, as the number of supported antenna ports increases beyond a certain number, i.e. 32, they can't be transmitted and measured in the same subframe. Hence, CSI-RS transmission and reception may require multiple subframes, which may not be desirable in practice.

Another issue with the Class A CSI feedback scheme is that the increase in overhead is unclear to bring justifiable performance benefits. In other words, to achieve certain performance, it may not be necessary to transmit CSI-RS from all $2N_1N_2$ ports in every CSI-RS transmission instance as is the case with Class A CSI feedback scheme. The same performance may perhaps be achieved by a so-called "hybrid CSI feedback scheme" in which there are two types of CSI-RS resources, the first CSI-RS resource is transmitted from all or a subset of $2N_1N_2$ ports with a larger periodicity and the second CSI-RS resource is transmitted from fewer than $2N_1N_2$ ports, e.g. 2, with a smaller periodicity. The two CSI-RS resources are associated with two CSI reporting or eMIMO-Types.

In some embodiments, a UE is configured with either one CSI process with two NZP CSI-RS resources (each of the two associated with an eMIMO-Type) or two CSI processes each with one NZP CSI-RS resource associated with an eMIMO-Type, where 1st CSI-RS resource is associated with either Class A eMIMO-Type or Class B eMIMO-Type with $K_1 \geq 1$ resource. In this instance of use cases, these two alternatives correspond to non-precoded (NP) CSI-RS and partial-port CSI-RS, respectively. And wherein 2nd CSI-RS resource is associated with Class B eMIMO-Type with $K_2 \geq 1$ resources.

The two NZP CSI-RS resources are associated with two eMIMO-Types according to the configuration where examples of supported eMIMO-Type combinations are according to Table 3. The RI reported in the 1st eMIMO-Type is denoted as $RI^{(1)}$ and that reported in the 2nd eMIMO-Type is denoted as $RI^{(2)}$. Some of these configurations such as Configuration 0 have multiple alternatives such as a, b, and c depending on CSI reporting contents. In one embodiment, one of these alternatives is configured to the UE via higher-layer RRC signaling. In another embodiment, the alternative is fixed, for example, 0-a, and hence does not need to be configured.

In some embodiments, a UE is configured with a hybrid CSI reporting in which the first eMIMO-Type is Class A and the second eMIMO-Type is Class B, K=1. The CSI reported in Class A eMIMO-Type includes $i_1$ or $(i_{1,1}, i_{1,2})$ and Class B, K=1 eMIMO-Type includes CQI, PMI, and $RI^{(2)}$.

In some embodiments, a UE is configured to report periodic the hybrid CSI, according to Configuration 0-b, such that the reporting interval of the first eMIMO-Type (Class A) is a multiple of one of the reports of the second eMIMO-Type with the offset parameter $N_{OFFSET,PMI} = N_{OFFSET,ClassA}$, which is configured to the UE.

In the case where wideband CQI/PMI reporting is configured: for a UE configured in transmission mode 9 or 10, and UE configured with the first eMIMO-Type and the second eMIMO-Type by higher layers, and first eMIMO-Type set to 'CLASS A' and second eMIMO-Type set to 'CLASS B' with K=1 resource; the reporting instances for wideband CQI/PMI of second eMIMO-Type are subframes satisfying $(10 \times n_f + \lfloor n_s/2 \rfloor - N_{OFFSET,CQI}) \mod (N_{pd}) = 0$; the reporting interval of the RI reporting of second eMIMO-Type is an integer multiple $M_{RI}$ of period $N_{pd}$ (in subframes), where the reporting instances for RI are subframes satisfying $(10 \times n_f + \lfloor n_s/2 \rfloor - N_{OFFSET,CQI} - N_{OFFSET,RI}) \mod (N_{pd} \cdot M_{RI}) = 0$; and the reporting interval of wideband first PMI of first eMIMO-Type reporting is according to one of the following alternatives: (Alt 0) The reporting instances for wideband first PMI are subframes satisfying $(10 \times n_f + \lfloor n_s/2 \rfloor - N_{OFFSET,CQI} - N_{OFFSET,RI} - N_{OFFSET,ClassA}) \mod (H \cdot M_{RI} \cdot N_{pd}) = 0$; (Alt 1) The reporting instances for wideband first PMI are subframes satisfying $(10 \times n_f + \lfloor n_s/2 \rfloor - N_{OFFSET,CQI} - N_{OFFSET,ClassA}) \mod (H \cdot M_{RI} \cdot N_{pd}) = 0$; (Alt 2) The reporting instances for wideband first PMI are subframes satisfying $(10 \times n_f + \lfloor n_s/2 \rfloor - N_{OFFSET,CQI} - N_{OFFSET,RI} - N_{OFFSET,ClassA}) \mod (H \cdot N_{pd}) = 0$; (Alt 3) The reporting instances for wideband first PMI are subframes satisfying $(10 \times n_f + \lfloor n_s/2 \rfloor - N_{OFFSET,CQI} - N_{OFFSET,ClassA}) \mod (H \cdot N_{pd}) = 0$; (Alt 4) The reporting instances for wideband first PMI are subframes satisfying $(10 \times n_f + \lfloor n_s/2 \rfloor - N_{OFFSET,CQI} - N_{OFFSET,RI} - N_{OFFSET,ClassA}) \mod (H \cdot M_{RI}) = 0$; and (Alt 5) The reporting instances for wideband first PMI are subframes satisfying $(10 \times n_f + \lfloor n_s/2 \rfloor - N_{OFFSET,CQI} - N_{OFFSET,ClassA}) \mod (H \cdot M_{RI}) = 0$, wherein in Alt 0-5, the

TABLE 3

Supported eMIMO-Type combinations for hybrid CSI reporting

| Configuration | | CSI derived with the first CSI-RS resource | | CSI derived with the second (BF) CSI-RS resource | |
|---|---|---|---|---|---|
| | | eMIMO-Type | CSI reporting content | eMIMO-Type | CSI reporting reporting content |
| 0 | 0-a | Class A | $i_1$ or $(i_{1,1}, i_{1,2})$, $RI^{(1)}$ | Class B | CQI, PMI |
| | 0-b | | $i_1$ or $(i_{1,1}, i_{1,2})$ | $K_2 = 1$ | $RI^{(2)}$, CQI, PMI |
| | 0-c | | $i_1$ or $(i_{1,1}, i_{1,2})$, $RI^{(1)}$ | | $RI^{(2)}$, CQI, PMI |
| 1 | 1-a | Class B $K_1 = 1$ | PMI (Alt0: Rel. 13 Class B codebook Alt1: Rel. 12 codebooks) | Class B $K_2 = 1$ | $RI^{(2)}$, CQI, PMI |
| | 1-b | | CQI, $RI^{(1)}$, PMI (Alt0: Rel. 13 Class B codebook Alt1: Rel. 12 codebooks) | | $RI^{(2)}$, CQI, PMI |
| 2 | 2-a | Class B | CRI | Class B | $RI^{(2)}$, CQI, PMI |
| | 2-b | $K_1 > 1$ | PMI (Alt0: Rel. 13 Class B codebook Alt1: Rel. 12 codebooks)/$RI^{(1)}$ for each CSI-RS resource | $K_2 = 1$ | $RI^{(2)}$, CQI, PMI |
| 3 | 3-a | Class B $K_1 = 1$ | $i_1$ or $(i_{1,1}, i_{1,2})$ | Class B $K_2 > 1$ | CRI, and $\{RI^{(2)}$, CQI, PMI$\}$ conditioned on CRI |
| 4 | 3-a | Class A | $i_1$ or $(i_{1,1}, i_{1,2})$ | Class B $K_2 > 1$ | CRI, and $\{RI^{(2)}$, CQI, PMI$\}$ conditioned on CRI |
| | 3-b | | $i_1$ or $(i_{1,1}, i_{1,2})$, $RI^{(1)}$ | | CRI, and $\{RI^{(2)}$, CQI, PMI$\}$ conditioned on CRI | reporting interval of wideband first PMI is an integer multiple $M_{PMI}$=H' of period $N_{pd}$ or $M_{RI}$ or $N_{pd} \cdot M_{RI}$ (in subframes).

The periodic CSI reporting using PUCCH Mode 1-1, Submode 1 and Submode 2, respectively, is summarized in Table 4 and Table 5. The two equations in Alt 0-5 are equivalent if we set $M_{PMI}$=H' and $N_{OFFSET,PMI}$=$N_{OFFSET,ClassA}$.

TABLE 4

Periodic CSI reporting for Configuration 0-b: PUCCH Mode 1-1, Submode 1

| Mode 1-1: Submode 1 | eMIMO-Type | Reporting type | Periodicity and offset |
|---|---|---|---|
| PMI $i_1$ or ($i_{1,1}, i_{1,2}$) | First (Class A) | Type 2a | Alt 0, Alt 1, Alt 2, Alt 3, Alt 4, Alt 5 |

Alt 0: $(10 \times n_f + \lfloor n_s/2 \rfloor - N_{OFFSET,CQI} - N_{OFFSET,RI} - N_{OFFSET,ClassA}) \bmod (H' \cdot M_{RI} \cdot N_{pd}) = 0$
or $(10 \times n_f + \lfloor n_s/2 \rfloor - N_{OFFSET,CQI} - N_{OFFSET,RI} - N_{OFFSET,PMI}) \bmod (M_{PMI} \cdot M_{RI} \cdot N_{pd}) = 0$
Alt 1: $(10 \times n_f + \lfloor n_s/2 \rfloor - N_{OFFSET,CQI} - N_{OFFSET,ClassA}) \bmod (H' \cdot M_{RI} \cdot N_{pd}) = 0$
or $(10 \times n_f + \lfloor n_s/2 \rfloor - N_{OFFSET,CQI} - N_{OFFSET,PMI}) \bmod (M_{PMI} \cdot M_{RI} \cdot N_{pd}) = 0$
Alt 2: $(10 \times n_f + \lfloor n_s/2 \rfloor - N_{OFFSET,CQI} - N_{OFFSET,RI} - N_{OFFSET,ClassA}) \bmod (H' \cdot N_{pd}) = 0$
or $(10 \times n_f + \lfloor n_s/2 \rfloor - N_{OFFSET,CQI} - N_{OFFSET,RI} - N_{OFFSET,PMI}) \bmod (M_{PMI} \cdot N_{pd}) = 0$
Alt 3: $(10 \times n_f + \lfloor n_s/2 \rfloor - N_{OFFSET,CQI} - N_{OFFSET,ClassA}) \bmod (H' \cdot N_{pd}) = 0$
or $(10 \times n_f + \lfloor n_s/2 \rfloor - N_{OFFSET,CQI} - N_{OFFSET,PMI}) \bmod (M_{PMI} \cdot N_{pd}) = 0$
Alt 4: $(10 \times n_f + \lfloor n_s/2 \rfloor - N_{OFFSET,CQI} - N_{OFFSET,RI} - N_{OFFSET,ClassA}) \bmod (H' \cdot M_{RI}) = 0$
or $(10 \times n_f + \lfloor n_s/2 \rfloor - N_{OFFSET,CQI} - N_{OFFSET,RI} - N_{OFFSET,PMI}) \bmod (M_{PMI} \cdot M_{RI}) = 0$
Alt 5: $(10 \times n_f + \lfloor n_s/2 \rfloor - N_{OFFSET,CQI} - N_{OFFSET,ClassA}) \bmod (H' \cdot M_{RI}) = 0$
or $(10 \times n_f + \lfloor n_s/2 \rfloor - N_{OFFSET,CQI} - N_{OFFSET,PMI}) \bmod (M_{PMI} \cdot M_{RI}) = 0$

| Mode 1-1: Submode 1 | eMIMO-Type | Reporting type | Periodicity and offset |
|---|---|---|---|
| RI/WB PMI1 | Second (Class B, K = 1) | Type 5 | |

$(10 \times n_f + \lfloor n_s/2 \rfloor - N_{OFFSET,CQI} - N_{OFFSET,RI}) \bmod (N_{pd} \cdot M_{RI}) = 0$

| Mode 1-1: Submode 1 | eMIMO-Type | Reporting type | Periodicity and offset |
|---|---|---|---|
| WB CQI/PMI2 | Second (Class B, K = 1) | Type 2b | |

$(10 \times n_f + \lfloor n_s/2 \rfloor - N_{OFFSET,CQI}) \bmod (N_{pd}) = 0$

TABLE 5

Periodic CSI reporting for Configuration 0-b: PUCCH Mode 1-1, Submode 2

| Mode 1-1: Submode 1 | eMIMO-Type | Reporting type | Periodicity and offset |
|---|---|---|---|
| PMI $i_1$ or ($i_{1,1}, i_{1,2}$) | First (Class A) | Type 2a | Alt 0, Alt 1, Alt 2, Alt 3, Alt 4, Alt 5 |

Alt 0: $(10 \times n_f + \lfloor n_s/2 \rfloor - N_{OFFSET,CQI} - N_{OFFSET,RI} - N_{OFFSET,ClassA}) \bmod (H' \cdot M_{RI} \cdot N_{pd}) = 0$
or $(10 \times n_f + \lfloor n_s/2 \rfloor - N_{OFFSET,CQI} - N_{OFFSET,RI} - N_{OFFSET,PMI}) \bmod (M_{PMI} \cdot M_{RI} \cdot N_{pd}) = 0$
Alt 1: $(10 \times n_f + \lfloor n_s/2 \rfloor - N_{OFFSET,CQI} - N_{OFFSET,ClassA}) \bmod (H' \cdot M_{RI} \cdot N_{pd}) = 0$
or $(10 \times n_f + \lfloor n_s/2 \rfloor - N_{OFFSET,CQI} - N_{OFFSET,PMI}) \bmod (M_{PMI} \cdot M_{RI} \cdot N_{pd}) = 0$
Alt 2: $(10 \times n_f + \lfloor n_s/2 \rfloor - N_{OFFSET,CQI} - N_{OFFSET,RI} - N_{OFFSET,ClassA}) \bmod (H' \cdot N_{pd}) = 0$
or $(10 \times n_f + \lfloor n_s/2 \rfloor - N_{OFFSET,CQI} - N_{OFFSET,RI} - N_{OFFSET,PMI}) \bmod (M_{PMI} \cdot N_{pd}) = 0$ TABLE 5-continued Periodic CSI reporting for Configuration 0-b: PUCCH Mode 1-1, Submode 2

Alt 3: $(10 \times n_f + \lfloor n_s/2 \rfloor - N_{OFFSET,CQI} - N_{OFFSET,ClassA}) \bmod (H' \cdot N_{pd}) = 0$
or $(10 \times n_f + \lfloor n_s/2 \rfloor - N_{OFFSET,CQI} - N_{OFFSET,PMI}) \bmod (M_{PMI} \cdot N_{pd}) = 0$
Alt 4: $(10 \times n_f + \lfloor n_s/2 \rfloor - N_{OFFSET,CQI} - N_{OFFSET,RI} - N_{OFFSET,ClassA}) \bmod (H' \cdot M_{RI}) = 0$
or $(10 \times n_f + \lfloor n_s/2 \rfloor - N_{OFFSET,CQI} - N_{OFFSET,RI} - N_{OFFSET,PMI}) \bmod (M_{PMI} \cdot M_{RI}) = 0$
Alt 5: $(10 \times n_f + \lfloor n_s/2 \rfloor - N_{OFFSET,CQI} - N_{OFFSET,ClassA}) \bmod (H' \cdot M_{RI}) = 0$
or $(10 \times n_f + \lfloor n_s/2 \rfloor - N_{OFFSET,CQI} - N_{OFFSET,PMI}) \bmod (M_{PMI} \cdot M_{RI}) = 0$

| Mode 1-1: Submode 1 | eMIMO-Type | Reporting type | Periodicity and offset |
|---|---|---|---|
| RI | Second (Class B, K = 1) | Type 3 | |

$(10 \times n_f + \lfloor n_s/2 \rfloor - N_{OFFSET,CQI} - N_{OFFSET,RI}) \bmod (N_{pd} \cdot M_{RI}) = 0$

| Mode 1-1: Submode 1 | eMIMO-Type | Reporting type | Periodicity and offset |
|---|---|---|---|
| WB CQI/PMI1/PMI2 | Second (Class B, K = 1) | Type 2b | |

$(10 \times n_f + \lfloor n_s/2 \rfloor - N_{OFFSET,CQI}) \bmod (N_{pd}) = 0$

In some embodiments, a UE is configured with a hybrid CSI reporting in which the 1st eMIMO-Type is Class A and the 2nd eMIMO-Type is Class B, K=1. The CSI reported in Class A eMIMO-Type includes $i_1$ or ($i_{1,1}, i_{1,2}$), and $RI^{(1)}$ and Class B eMIMO-Type includes CQI, PMI, and $RI^{(2)}$.

In some embodiments, a UE is configured to report periodic the hybrid CSI, according to Configuration 0-c and when both $i_1$ or ($i_{1,1}, i_{1,2}$), and $RI^{(1)}$ are reported jointly in the same PUCCH reporting instances, such that the reporting interval both $i_1$ or ($i_{1,1}, i_{1,2}$), and $RI^{(1)}$ of the first eMIMO-Type (Class A) is a multiple of one of the reports of the second eMIMO-Type with the offset parameter $N_{OFFSET,PMI/RI}$ $N_{OFFSET,ClassA}$, which is configured to the UE.

In the case where wideband CQI/PMI reporting is configured: for a UE configured in transmission mode 9 or 10, and UE configured with the first eMIMO-Type and the second eMIMO-Type by higher layers, and first eMIMO-Type set to 'CLASS A' and second eMIMO-Type set to 'CLASS B' with K=1 resource; the reporting instances for wideband CQI/PMI of second eMIMO-Type are subframes satisfying $(10 \times n_f + \lfloor n_s/2 \rfloor - N_{OFFSET,CQI}) \bmod (N_{pd}) = 0$; the reporting interval of the RI reporting of second eMIMO-Type is an integer multiple $M_{RI}$ of period $N_{pd}$ (in subframes), where the reporting instances for RI are subframes satisfying $(10 \times n_f + \lfloor n_s/2 \rfloor - N_{OFFSET,CQI} - N_{OFFSET,RI}) \bmod (N_{pd} \cdot M_{RI}) = 0$; and the reporting interval of wideband first PMI and RI of first eMIMO-Type reporting is according to one of the following alternatives, where: (Alt 0) The reporting instances for wideband first PMI and RI are subframes satisfying $(10 \times n_f + \lfloor n_s/2 \rfloor - N_{OFFSET,CQI} - N_{OFFSET,RI} - N_{OFFSET,ClassA}) \bmod (H' \cdot M_{RI} \cdot N_{pd}) = 0$; (Alt 1) The reporting instances for wideband first PMI and RI are subframes satisfying $(10 \times n_f + \lfloor n_s/2 \rfloor - N_{OFFSET,CQI} - N_{OFFSET,ClassA}) \bmod (H' \cdot M_{RI} \cdot N_{pd}) = 0$; (Alt 2) The reporting instances for wideband first PMI and RI are subframes satisfying $(10 \times n_f + \lfloor n_s/2 \rfloor - N_{OFFSET,CQI} - N_{OFFSET,RI} - N_{OFFSET,ClassA}) \bmod (H' \cdot N_{pd}) = 0$; (Alt 3) The reporting instances for wideband first PMI and RI are subframes satisfying $(10 \times n_f + \lfloor n_s/2 \rfloor - N_{OFFSET,CQI} - N_{OFFSET,ClassA}) \bmod (H' \cdot N_{pd}) = 0$; (Alt 4) The reporting instances for wideband first PMI and RI are subframes satisfying $(10 \times n_f + \lfloor n_s/2 \rfloor - N_{OFFSET,CQI} -$ $N_{OFFSET,RI} - N_{OFFSET,ClassA}) \bmod(H' \cdot M_{RI}) = 0$; and (Alt 5) The reporting instances for wideband first PMI and RI are subframes satisfying $(10 \times n_f + \lfloor n_s/2 \rfloor - N_{OFFSET,CQI} - N_{OFFSET,ClassA}) \bmod(H' \cdot M_{RI}) = 0$, wherein in Alt 0-5, the reporting interval of wideband first PMI and RI is an integer multiple $M_{PMI/RI} = H'$ of period $N_{pd}$ or $M_{RI}$ or $N_{pd} \cdot M_{RI}$ (in subframes).

The periodic CSI reporting using PUCCH Mode 1-1, Submode 1 and Submode 2, respectively, is summarized in Table 6 and Table 7. The two equations in Alt 0-5 are equivalent if we set $M_{PMI/RI} = H'$ and $N_{OFFSET,PMI/RI} = N_{OFFSET,ClassA}$.

TABLE 6

Periodic CSI reporting for Configuration 0-c: PUCCH Mode 1-1, Submode 1

| Mode 1-1: Submode 1 | eMIMO-Type | Reporting type | Periodcity and offset |
|---|---|---|---|
| RI/PMI $i_1$ or $(i_{1,1}, i_{1,2})$ | First (Class A) | Type 5 | Alt 0, Alt 1, Alt 2, Alt 3, Alt 4, Alt 5 |

Alt 0: $(10 \times n_f + \lfloor n_s/2 \rfloor - N_{OFFSET,CQI} - N_{OFFSET,RI} - N_{OFFSET,ClassA}) \bmod(H' \cdot M_{RI} \cdot N_{pd}) = 0$
or $(10 \times n_f + \lfloor n_s/2 \rfloor - N_{OFFSET,CQI} - N_{OFFSET,RI} - N_{OFFSET,PMI/RI}) \bmod(M_{PMI/RI} \cdot M_{RI} \cdot N_{pd}) = 0$
Alt 1: $(10 \times n_f + \lfloor n_s/2 \rfloor - N_{OFFSET,CQI} - N_{OFFSET,ClassA}) \bmod(H' \cdot M_{RI} \cdot N_{pd}) = 0$
or $(10 \times n_f + \lfloor n_s/2 \rfloor - N_{OFFSET,CQI} - N_{OFFSET,PMI/RI}) \bmod(M_{PMI} \cdot M_{RI} \cdot N_{pd}) = 0$
Alt 2: $(10 \times n_f + \lfloor n_s/2 \rfloor - N_{OFFSET,CQI} - N_{OFFSET,RI} - N_{OFFSET,ClassA}) \bmod(H' \cdot N_{pd}) = 0$
or $(10 \times n_f + \lfloor n_s/2 \rfloor - N_{OFFSET,CQI} - N_{OFFSET,RI} - N_{OFFSET,PMI/RI}) \bmod(M_{PMI/RI} \cdot N_{pd}) = 0$
Alt 3: $(10 \times n_f + \lfloor n_s/2 \rfloor - N_{OFFSET,CQI} - N_{OFFSET,ClassA}) \bmod(H' \cdot N_{pd}) = 0$
or $(10 \times n_f + \lfloor n_s/2 \rfloor - N_{OFFSET,CQI} - N_{OFFSET,PMI/RI}) \bmod(M_{PMI/RI} \cdot N_{pd}) = 0$
Alt 4: $(10 \times n_f + \lfloor n_s/2 \rfloor - N_{OFFSET,CQI} - N_{OFFSET,RI} - N_{OFFSET,ClassA}) \bmod(H' \cdot M_{RI}) = 0$
or $(10 \times n_f + \lfloor n_s/2 \rfloor - N_{OFFSET,CQI} - N_{OFFSET,RI} - N_{OFFSET,PMI/RI}) \bmod(M_{PMI/RI} \cdot M_{RI}) = 0$
Alt 5: $(10 \times n_f + \lfloor n_s/2 \rfloor - N_{OFFSET,CQI} - N_{OFFSET,ClassA}) \bmod(H' \cdot M_{RI}) = 0$
or $(10 \times n_f + \lfloor n_s/2 \rfloor - N_{OFFSET,CQI} - N_{OFFSET,PMI/RI}) \bmod(M_{PMI/RI} \cdot M_{RI}) = 0$

| Mode 1-1: Submode 1 | eMIMO-Type | Reporting type | Periodicity and offset |
|---|---|---|---|
| RI/WB PMI1 | Second (Class B, K = 1) | Type 5 | |

$(10 \times n_f + \lfloor n_s/2 \rfloor - N_{OFFSET,CQI} - N_{OFFSET,RI}) \bmod (N_{pd} \cdot M_{RI}) = 0$

| Mode 1-1: Submode 1 | eMIMO-Type | Reporting type | Periodicity and offset |
|---|---|---|---|
| WB CQI/PMI2 | Second (Class B, K = 1) | Type 2b | |

$(10 \times n_f + \lfloor n_s/2 \rfloor - N_{OFFSET,CQI}) \bmod(N_{pd}) = 0$

TABLE 7

Periodic CSI reporting for Configuration 0-c: PUCCH Mode 1-1, Submode 2

| Mode 1-1: Submode 2 | eMIMO-Type | Reporting type | Periodicity and offset |
|---|---|---|---|
| RI/PMI $i_1$ or $(i_{1,1}, i_{1,2})$ | First (Class A) | Type 5 | Alt 0, Alt 1, Alt 2, Alt 3, Alt 4, Alt 5 |

Alt 0: $(10 \times n_f + \lfloor n_s/2 \rfloor - N_{OFFSET,CQI} - N_{OFFSET,RI} - N_{OFFSET,ClassA}) \bmod(H' \cdot M_{RI} \cdot N_{pd}) = 0$
or $(10 \times n_f + \lfloor n_s/2 \rfloor - N_{OFFSET,CQI} - N_{OFFSET,RI} - N_{OFFSET,PMI/RI}) \bmod(M_{PMI/RI} \cdot M_{RI} \cdot N_{pd}) = 0$ TABLE 7-continued Periodic CSI reporting for Configuration 0-c: PUCCH Mode 1-1, Submode 2

Alt 1: $(10 \times n_f + \lfloor n_s/2 \rfloor - N_{OFFSET,CQI} - N_{OFFSET,ClassA}) \bmod(H' \cdot M_{RI} \cdot N_{pd}) = 0$
or $(10 \times n_f + \lfloor n_s/2 \rfloor - N_{OFFSET,CQI} - N_{OFFSET,PMI/RI}) \bmod(M_{PMI/RI} \cdot M_{RI} \cdot N_{pd}) = 0$
Alt 2: $(10 \times n_f + \lfloor n_s/2 \rfloor - N_{OFFSET,CQI} - N_{OFFSET,RI} - N_{OFFSET,ClassA}) \bmod(H' \cdot N_{pd}) = 0$
or $(10 \times n_f + \lfloor n_s/2 \rfloor - N_{OFFSET,CQI} - N_{OFFSET,RI} - N_{OFFSET,PMI/RI}) \bmod(M_{PMI/RI} \cdot N_{pd}) = 0$
Alt 3: $(10 \times n_f + \lfloor n_s/2 \rfloor - N_{OFFSET,CQI} - N_{OFFSET,ClassA}) \bmod(H' \cdot N_{pd}) = 0$
or $(10 \times n_f + \lfloor n_s/2 \rfloor - N_{OFFSET,CQI} - N_{OFFSET,PMI/RI}) \bmod(M_{PMI/RI} \cdot N_{pd}) = 0$
Alt 4: $(10 \times n_f + \lfloor n_s/2 \rfloor - N_{OFFSET,CQI} - N_{OFFSET,RI} - N_{OFFSET,ClassA}) \bmod(H' \cdot M_{RI}) = 0$
or $(10 \times n_f + \lfloor n_s/2 \rfloor - N_{OFFSET,CQI} - N_{OFFSET,RI} - N_{OFFSET,PMI/RI}) \bmod(M_{PMI/RI} \cdot M_{RI}) = 0$
Alt 5: $(10 \times n_f + \lfloor n_s/2 \rfloor - N_{OFFSET,CQI} - N_{OFFSET,ClassA}) \bmod(H' \cdot M_{RI}) = 0$
or $(10 \times n_f + \lfloor n_s/2 \rfloor - N_{OFFSET,CQI} - N_{OFFSET,PMI/RI}) \bmod(M_{PMI/RI} \cdot M_{RI}) = 0$

| Mode 1-1: Submode 2 | eMIMO-Type | Reporting type | Periodicity and offset |
|---|---|---|---|
| RI | Second 2 (Class B, K = 1) | Type 3 | |

$(10 \times n_f + \lfloor n_s/2 \rfloor - N_{OFFSET,CQI} - N_{OFFSET,RI}) \bmod (N_{pd} \cdot M_{RI}) = 0$

| Mode 1-1: Submode 2 | eMIMO-Type | Reporting type | Periodicity and offset |
|---|---|---|---|
| WB CQI/PMI1/PMI2 | Second (Class B, K = 1) | Type 2b | |

$(10 \times n_f + \lfloor n_s/2 \rfloor - N_{OFFSET,CQI}) \bmod(N_{pd}) = 0$

As an example, the periodicity $M_{PMI/RI}$ and relative offset $N_{OFFSET,PMI/RI}$ for wideband first PMI and RI reporting are determined based on the higher layer parameter pmi-ri-ConfigIndex ($I_{PMI/RI}$) given in Table 7-1 below.

TABLE 7-1

Mapping of $I_{PMI/RI}$ to $M_{PMI/RI}$ and $N_{OFFSET,PMI/RI}$

| $I_{PMI/RI}$ | Value of $M_{PMI/RI}$ | Value of $N_{OFFSET,PMI/RI}$ |
|---|---|---|
| $0 \leq I_{PMI/RI} \leq 160$ | 1 | $-I_{PMI/RI}$ |
| $161 \leq I_{PMI/RI} \leq 321$ | 2 | $-(I_{PMI/RI} - 161)$ |
| $322 \leq I_{PMI/RI} \leq 482$ | 4 | $-(I_{PMI/RI} - 322)$ |
| $483 \leq I_{PMI/RI} \leq 643$ | 8 | $-(I_{PMI/RI} - 483)$ |
| $644 \leq I_{PMI/RI} \leq 804$ | 16 | $-(I_{PMI/RI} - 644)$ |
| $805 \leq I_{PMI/RI} \leq 965$ | 32 | $-(I_{PMI/RI} - 805)$ |
| $966 \leq I_{PMI/RI} \leq 1023$ | | Reserved |

In some embodiments, a UE is configured to report periodic the hybrid CSI, according to Configuration 0-c and when $i_1$ or $(i_{1,1}, i_{1,2})$, and RI[(1)] are reported separately in two different PUCCH reporting instances. In one example, $i_1$ or $(i_{1,1}, i_{1,2})$ of the first eMIMO-Type (Class A) is a multiple of one of the reports of the second eMIMO-Type with the offset parameter $N_{OFFSET,ClassA,PMI}$, which is configured to the UE. In another example, RI[(1)] of the first eMIMO-Type (Class A) is a multiple of one of the reports of the second eMIMO-Type with the offset parameter $N_{OFFSET,ClassA,RI}$, which is configured to the UE.

In some embodiments, the offsets of PMI and RI of first eMIMO-Type are relative to the second eMIMO-Type. In such embodiments, wideband CQI/PMI reporting is configured, for example, for a UE configured in transmission mode 9 or 10, and UE configured with the first eMIMO-Type and the second eMIMO-Type by higher layers, and first eMIMO- Type set to 'CLASS A' and second eMIMO-Type set to 'CLASS B' with K=1 resource. In one example, the reporting instances for wideband CQI/PMI of second eMIMO-Type are subframes satisfying $(10 \times n_f + \lfloor n_s/2 \rfloor - N_{OFFSET,CQI}) \bmod(N_{pd}) = 0$. In another example, the reporting interval of the RI reporting of second eMIMO-Type is an integer multiple $M_{RI}$ of period $N_{pd}$ (in subframes). In such example, the reporting instances for RI are subframes satisfying $(10 \times n_f + \lfloor n_s/2 \rfloor - N_{OFFSET,CQI} - N_{OFFSET,RI}) \bmod(N_{pd} \cdot M_{RI}) = 0$.

In yet another example, the reporting interval of wideband first PMI of first eMIMO-Type reporting is according to one of the following alternatives: (Alt 0) The reporting instances for wideband first PMI are subframes satisfying $(10 \times n_f + \lfloor n_s/2 \rfloor - N_{OFFSET,CQI} - N_{OFFSET,RI} - N_{OFFSET,ClassA,PMI}) \bmod (H' \cdot M_{RI} \cdot N_{pd}) = 0$; (Alt 1) The reporting instances for wideband first PMI are subframes satisfying $(10 \times n_f + \lfloor n_s/2 \rfloor - N_{OFFSET,CQI} - N_{OFFSET,ClassA,PMI}) \bmod (H' \cdot M_{RI} \cdot N_{pd}) = 0$; (Alt 2) The reporting instances for wideband first PMI are subframes satisfying $(10 \times n_f + \lfloor n_s/2 \rfloor - N_{OFFSET,CQI} - N_{OFFSET,RI} - N_{OFFSET,ClassA,PMI}) \bmod (H' \cdot N_{pd}) = 0$; (Alt 3) The reporting instances for wideband first PMI are subframes satisfying $(10 \times n_f + \lfloor n_s/2 \rfloor - N_{OFFSET,CQI} - N_{OFFSET,ClassA,PMI}) \bmod (H' \cdot N_{pd}) = 0$; (Alt 4) The reporting instances for wideband first PMI are subframes satisfying $(10 \times n_f + \lfloor n_s/2 \rfloor - N_{OFFSET,CQI} - N_{OFFSET,RI} - N_{OFFSET,ClassA,PMI}) \bmod (H' \cdot M_{RI}) = 0$; and (Alt 5) The reporting instances for wideband first PMI are subframes satisfying $(10 \times n_f + \lfloor n_s/2 \rfloor - N_{OFFSET,CQI} - N_{OFFSET,ClassA,PMI}) \bmod (H' \cdot M_{RI}) = 0$.

In yet another example, the reporting interval of RI of first eMIMO-Type reporting is according to one of the following alternatives: (Alt 0) The reporting instances for RI are subframes satisfying $(10 \times n_f + \lfloor n_s/2 \rfloor - N_{OFFSET,CQI} - N_{OFFSET,RI} - N_{OFFSET,ClassA,RI}) \bmod (H' \cdot M_{RI} \cdot N_{pd}) = 0$; (Alt 1) The reporting instances for RI are subframes satisfying $(10 \times n_f + \lfloor n_s/2 \rfloor - N_{OFFSET,CQI} - N_{OFFSET,ClassA,RI}) \bmod (H' \cdot M_{RI} \cdot N_{pd}) = 0$; (Alt 2) The reporting instances for RI are subframes satisfying $(10 \times n_f + \lfloor n_s/2 \rfloor - N_{OFFSET,CQI} - N_{OFFSET,RI} - N_{OFFSET,ClassA,RI}) \bmod (H' \cdot N_{pd}) = 0$; (Alt 3) The reporting instances for RI are subframes satisfying $(10 \times n_f + \lfloor n_s/2 \rfloor - N_{OFFSET,CQI} - N_{OFFSET,ClassA,RI}) \bmod (H' \cdot N_{pd}) = 0$; (Alt 4) The reporting instances for RI are subframes satisfying; and (Alt 5) The reporting instances for RI are subframes satisfying $(10 \times n_f + \lfloor n_s/2 \rfloor - N_{OFFSET,CQI} - N_{OFFSET,ClassA,RI}) \bmod (H' \cdot M_{RI}) = 0$.

The periodic CSI reporting using PUCCH Mode 1-1, Submode 1 and Submode 2, respectively, is summarized in Table 8 and Table 9.

TABLE 8

Periodic CSI reporting for configuration 0-c: PUCCH Mode 1-1, submode 1

| Mode 1-1: Submode 1 | eMIMO-Type | Reporting type | Periodicity and offset |
|---|---|---|---|
| PMI $i_1$ or ($i_{1,1}$, $i_{1,2}$) | First (Class A) | Type 2a | Alt 0, Alt 1, Alt 2, Alt 3, Alt 4, Alt 5 |
| Alt 0: $(10 \times n_f + \lfloor n_s/2 \rfloor - N_{OFFSET,CQI} - N_{OFFSET,RI} - N_{OFFSET,ClassA,PMI}) \bmod(H' \cdot M_{RI} \cdot N_{pd}) = 0$ | | | |
| Alt 1: $(10 \times n_f + \lfloor n_s/2 \rfloor - N_{OFFSET,CQI} - N_{OFFSET,ClassA,PMI}) \bmod(H' \cdot M_{RI} \cdot N_{pd}) = 0$ | | | |
| Alt 2: $(10 \times n_f + \lfloor n_s/2 \rfloor - N_{OFFSET,CQI} - N_{OFFSET,RI} - N_{OFFSET,ClassA,PMI}) \bmod(H' \cdot N_{pd}) = 0$ | | | |
| Alt 3: $(10 \times n_f + \lfloor n_s/2 \rfloor - N_{OFFSET,CQI} - N_{OFFSET,ClassA,PMI}) \bmod(H' \cdot N_{pd}) = 0$ | | | |
| Alt 4: $(10 \times n_f + \lfloor n_s/2 \rfloor - N_{OFFSET,CQI} - N_{OFFSET,RI} - N_{OFFSET,ClassA,PMI}) \bmod(H' \cdot M_{RI}) = 0$ | | | |
| Alt 5: $(10 \times n_f + \lfloor n_s/2 \rfloor - N_{OFFSET,CQI} - N_{OFFSET,ClassA,PMI}) \bmod(H' \cdot M_{RI}) = 0$ | | | |

TABLE 8-continued

Periodic CSI reporting for configuration 0-c: PUCCH Mode 1-1, submode 1

| Mode 1-1: Submode 1 | eMIMO-Type | Reporting type | Periodicity and offset |
|---|---|---|---|
| RI | First (Class A) | Type 3 | Alt 0, Alt 1, Alt 2, Alt 3, Alt 4, Alt 5 |
| Alt 0: $(10 \times n_f + \lfloor n_s/2 \rfloor - N_{OFFSET,CQI} - N_{OFFSET,RI} - N_{OFFSET,ClassA,RI}) \bmod(H' \cdot M_{RI} \cdot N_{pd}) = 0$ | | | |
| Alt 1: $(10 \times n_f + \lfloor n_s/2 \rfloor - N_{OFFSET,CQI} - N_{OFFSET,ClassA,RI}) \bmod(H' \cdot M_{RI} \cdot N_{pd}) = 0$ | | | |
| Alt 2: $(10 \times n_f + \lfloor n_s/2 \rfloor - N_{OFFSET,CQI} - N_{OFFSET,RI} - N_{OFFSET,ClassA,RI}) \bmod(H' \cdot N_{pd}) = 0$ | | | |
| Alt 3: $(10 \times n_f + \lfloor n_s/2 \rfloor - N_{OFFSET,CQI} - N_{OFFSET,ClassA,RI}) \bmod(H' \cdot N_{pd}) = 0$ | | | |
| Alt 4: $(10 \times n_f + \lfloor n_s/2 \rfloor - N_{OFFSET,CQI} - N_{OFFSET,RI} - N_{OFFSET,ClassA,RI}) \bmod(H' \cdot M_{RI}) = 0$ | | | |
| Alt 5: $(10 \times n_f + \lfloor n_s/2 \rfloor - N_{OFFSET,CQI} - N_{OFFSET,ClassA,RI}) \bmod(H' \cdot M_{RI}) = 0$ | | | |

| Mode 1-1: Submode 1 | eMIMO-Type | Reporting type | Periodicity and offset |
|---|---|---|---|
| RI/WB PMI1 | Second (Class B, K = 1) | Type 5 | Alt 0, Alt 1, Alt 2, Alt 3, Alt 4, Alt 5 |
| $(10 \times n_f + \lfloor n_s/2 \rfloor - N_{OFFSET,CQI} - N_{OFFSET,RI}) \bmod(N_{pd} \cdot M_{RI}) = 0$ | | | |

| Mode 1-1: Submode 1 | eMIMO-Type | Reporting type | Periodicity and offset |
|---|---|---|---|
| WB CQI/PMI2 | Second (Class B, K = 1) | Type 2b | |
| $(10 \times n_f + \lfloor n_s/2 \rfloor - N_{OFFSET,CQI}) \bmod(N_{pd}) = 0$ | | | |

TABLE 9

Periodic CSI reporting for configuration 0-c: PUCCH Mode 1-1, submode 2

| Mode 1-1: Submode 2 | eMIMO-Type | Reporting type | Periodcity and offset |
|---|---|---|---|
| RI/PMI $i_1$ or ($i_{1,1}$, $i_{1,2}$) | First (Class A) | Type 5 | Alt 0, Alt 1, Alt 2, Alt 3, Alt 4, Alt 5 |
| Alt 0: $(10 \times n_f + \lfloor n_s/2 \rfloor - N_{OFFSET,CQI} - N_{OFFSET,RI} - N_{OFFSET,ClassA,PMI}) \bmod(H' \cdot M_{RI} \cdot N_{pd}) = 0$ | | | |
| Alt 1: $(10 \times n_f + \lfloor n_s/2 \rfloor - N_{OFFSET,CQI} - N_{OFFSET,ClassA,PMI}) \bmod(H' \cdot M_{RI} \cdot N_{pd}) = 0$ | | | |
| Alt 2: $(10 \times n_f + \lfloor n_s/2 \rfloor - N_{OFFSET,CQI} - N_{OFFSET,RI} - N_{OFFSET,ClassA,PMI}) \bmod(H' \cdot N_{pd}) = 0$ | | | |
| Alt 3: $(10 \times n_f + \lfloor n_s/2 \rfloor - N_{OFFSET,CQI} - N_{OFFSET,ClassA,PMI}) \bmod(H' \cdot N_{pd}) = 0$ | | | |
| Alt 4: $(10 \times n_f + \lfloor n_s/2 \rfloor - N_{OFFSET,CQI} - N_{OFFSET,RI} - N_{OFFSET,ClassA,PMI}) \bmod(H' \cdot M_{RI}) = 0$ | | | |
| Alt 5: $(10 \times n_f + \lfloor n_s/2 \rfloor - N_{OFFSET,CQI} - N_{OFFSET,ClassA,PMI}) \bmod(H' \cdot M_{RI}) = 0$ | | | |

| Mode 1-1: Submode 2 | eMIMO-Type | Reporting type | Periodicity and offset |
|---|---|---|---|
| RI | First (Class A) | Type 3 | |
| Alt 0: $(10 \times n_f + \lfloor n_s/2 \rfloor - N_{OFFSET,CQI} - N_{OFFSET,RI} - N_{OFFSET,ClassA,RI}) \bmod(H' \cdot M_{RI} \cdot N_{pd}) = 0$ | | | |
| Alt 1: $(10 \times n_f + \lfloor n_s/2 \rfloor - N_{OFFSET,CQI} - N_{OFFSET,ClassA,RI}) \bmod(H' \cdot M_{RI} \cdot N_{pd}) = 0$ | | | |
| Alt 2: $(10 \times n_f + \lfloor n_s/2 \rfloor - N_{OFFSET,CQI} - N_{OFFSET,RI} - N_{OFFSET,ClassA,RI}) \bmod(H' \cdot N_{pd}) = 0$ | | | |
| Alt 3: $(10 \times n_f + \lfloor n_s/2 \rfloor - N_{OFFSET,CQI} - N_{OFFSET,ClassA,RI}) \bmod(H' \cdot N_{pd}) = 0$ | | | |
| Alt 4: $(10 \times n_f + \lfloor n_s/2 \rfloor - N_{OFFSET,CQI} - N_{OFFSET,RI} - N_{OFFSET,ClassA,RI}) \bmod(H' \cdot M_{RI}) = 0$ | | | |
| Alt 5: $(10 \times n_f + \lfloor n_s/2 \rfloor - N_{OFFSET,CQI} - N_{OFFSET,ClassA\ RI}) \bmod(H' \cdot M_{RI}) = 0$ | | | |

TABLE 9-continued

Periodic CSI reporting for configuration
0-c: PUCCH Mode 1-1, submode 2

| Mode 1-1: Submode 2 | eMIMO-Type | Reporting type | Periodicity and offset |
|---|---|---|---|
| RI<br>$(10 \times n_f + \lfloor n_s/2 \rfloor - N_{OFFSET,CQI} - N_{OFFSET,RI}) \mod(N_{pd} \cdot M_{RI}) = 0$ | Second<br>(Class B, K = 1) | Type 3 | |

| Mode 1-1: Submode 2 | eMIMO-Type | Reporting type | Periodicity and offset |
|---|---|---|---|
| WB CQI/PMI1/PMI2<br>$(10 \times n_f + \lfloor n_s/2 \rfloor - N_{OFFSET,CQI}) \mod(N_{pd}) = 0$ | Second<br>(Class B, K = 1) | Type 2b | |

In some embodiments, the offsets of PMI and RI of first eMIMO-Type are relative to each other. For example, offset of PMI is relative to that of RI. In such embodiments, wideband CQI/PMI reporting is configured, for example, for a UE configured in transmission mode 9 or 10, and UE configured with the first eMIMO-Type and the second eMIMO-Type by higher layers, and first eMIMO-Type set to 'CLASS A' and second eMIMO-Type set to 'CLASS B' with K=1 resource. In another example, the reporting instances for wideband CQI/PMI of second eMIMO-Type are subframes satisfying $(10 \times n_f + \lfloor n_s/2 \rfloor - N_{OFFSET,CQI}) \mod(N_{pd})=0$. In yet another example, the reporting interval of the RI reporting of second eMIMO-Type is an integer multiple $M_{RI}$ of period $N_{pd}$ (in subframes). In such example, the reporting instances for RI are subframes satisfying $(10 \times n_f + \lfloor n_s/2 \rfloor - N_{OFFSET,CQI} - N_{OFFSET,RI}) \mod(N_{pd} \cdot M_{RI})=0$.

In yet another example, the reporting interval of wideband first PMI of first eMIMO-Type reporting is according to one of the following alternatives: (Alt 0) The reporting instances for wideband first PMI are subframes satisfying $(10 \times n_f + \lfloor n_s/2 \rfloor - N_{OFFSET,ClassA,RI} - N_{OFFSET,ClassA,PMI}) \mod(H' \cdot M_{RI} \cdot N_{pd})=0$; (Alt 1) The reporting instances for wideband first PMI are subframes satisfying $(10 \times n_f + \lfloor n_s/2 \rfloor - N_{OFFSET,ClassA,RI} - N_{OFFSET,ClassA,PMI}) \mod(H' \cdot M_{RI} \cdot N_{pd})=0$; (Alt 2) The reporting instances for wideband first PMI are subframes satisfying $(10 \times n_f + \lfloor n_s/2 \rfloor - N_{OFFSET,ClassA,RI} - N_{OFFSET,ClassA,PMI}) \mod(H' \cdot N_{pd})=0$; (Alt 3) The reporting instances for wideband first PMI are subframes satisfying $(10 \times n_f + \lfloor n_s/2 \rfloor - N_{OFFSET,ClassA,RI} - N_{OFFSET,ClassA,PMI}) \mod(H' \cdot N_{pd})=0$; (Alt 4) The reporting instances for wideband first PMI are subframes satisfying $(10 \times n_f + \lfloor n_s/2 \rfloor - N_{OFFSET,ClassA,RI} - N_{OFFSET,ClassA,PMI}) \mod(H' \cdot M_{RI})=0$; and (Alt 5) The reporting instances for wideband first PMI are subframes satisfying $(10 \times n_f + \lfloor n_s/2 \rfloor - N_{OFFSET,ClassA,RI} - N_{OFFSET,ClassA,PMI}) \mod(H' \cdot M_{RI})=0$.

In yet another example, the reporting interval of RI of first eMIMO-Type reporting is according to one of the following alternatives: (Alt 0) The reporting instances for RI are subframes satisfying $(10 \times n_f + \lfloor n_s/2 \rfloor - N_{OFFSET,CQI} - N_{OFFSET,RI} - N_{OFFSET,ClassA,RI}) \mod(H' \cdot M_{RI} \cdot N_{pd})=0$; (Alt 1) The reporting instances for RI are subframes satisfying $(10 \times n_f + \lfloor n_s/2 \rfloor - N_{OFFSET,CQI} - N_{OFFSET,ClassA,RI}) \mod(H' \cdot M_{RI} \cdot N_{pd})=0$; (Alt 2) The reporting instances for RI are subframes satisfying $(10 \times n_f + \lfloor n_s/2 \rfloor - N_{OFFSET,CQI} - N_{OFFSET,RI} - N_{OFFSET,ClassA,RI}) \mod(H' \cdot N_{pd})=0$; (Alt 3) The reporting instances for RI are subframes satisfying $(10 \times n_f + \lfloor n_s/2 \rfloor - N_{OFFSET,CQI} - N_{OFFSET,ClassA,RI}) \mod(H' \cdot N_{pd})=0$; (Alt 4) The reporting instances for RI are subframes satisfying $(10 \times n_f + \lfloor n_s/2 \rfloor - N_{OFFSET,CQI} - N_{OFFSET,RI} - N_{OFFSET,ClassA,RI}) \mod(H' \cdot M_{RI})=0$; and (Alt 5) The reporting instances for RI are subframes satisfying $(10 \times n_f + \lfloor n_s/2 \rfloor - N_{OFFSET,CQI} - N_{OFFSET,ClassA,RI}) \mod(H' \cdot M_{RI})=0$.

The periodic CSI reporting using PUCCH Mode 1-1, Submode 1 and Submode 2, respectively, is summarized in Table 10 and Table 11.

TABLE 10

Periodic CSI reporting configuration
0-c: PUCCH Mode 1-1, Submode 1

| Mode 1-1: Submode 1 | eMIMO-Type | Reporting type | Periodicity and offset |
|---|---|---|---|
| PMI $i_1$ or $(i_{1,1}, i_{1,2})$ | First (Class A) | Type 2a | Alt 0, Alt 1, Alt 2, Alt 3, Alt 4, Alt 5 |

Alt 0: $(10 \times n_f + \lfloor n_s/2 \rfloor - N_{OFFSET,ClassA,RI} - N_{OFFSET,ClassA,PMI}) \mod(H' \cdot M_{RI} \cdot N_{pd}) = 0$
Alt 1: $(10 \times n_f + \lfloor n_s/2 \rfloor - N_{OFFSET,ClassA,RI} - N_{OFFSET,ClassA,PMI}) \mod(H' \cdot M_{RI} \cdot N_{pd}) = 0$
Alt 2: $(10 \times n_f + \lfloor n_s/2 \rfloor - N_{OFFSET,ClassA,RI} - N_{OFFSET,ClassA,PMI}) \mod(H' \cdot N_{pd}) = 0$
Alt 3: $(10 \times n_f + \lfloor n_s/2 \rfloor - N_{OFFSET,ClassA,RI} - N_{OFFSET,ClassA,PMI}) \mod(H' \cdot N_{pd}) = 0$
Alt 4: $(10 \times n_f + \lfloor n_s/2 \rfloor - N_{OFFSET,ClassA,RI} - N_{OFFSET,ClassA, PMI}) \mod(H' \cdot M_{RI}) = 0$
Alt 5: $(10 \times n_f + \lfloor n_s/2 \rfloor - N_{OFFSET,ClassA,RI} - N_{OFFSET,ClassA, PMI}) \mod(H' \cdot M_{RI}) = 0$

| Mode 1-1: Submode 1 | eMIMO-Type | Reporting type | Periodicity and offset |
|---|---|---|---|
| RI | First (Class A) | Type 3 | Alt 0, Alt 1, Alt 2, Alt 3, Alt 4, Alt 5 |

Alt 0: $(10 \times n_f + \lfloor n_s/2 \rfloor - N_{OFFSET,CQI} - N_{OFFSET,RI} - N_{OFFSET,ClassA,RI}) \mod(H' \cdot M_{RI} \cdot N_{pd}) = 0$
Alt 1: $(10 \times n_f + \lfloor n_s/2 \rfloor - N_{OFFSET,CQI} - N_{OFFSET,ClassA,RI}) \mod(H' \cdot M_{RI} \cdot N_{pd}) = 0$
Alt 2: $(10 \times n_f + \lfloor n_s/2 \rfloor - N_{OFFSET,CQI} - N_{OFFSET,RI} - N_{OFFSET,ClassA,RI}) \mod(H' \cdot N_{pd}) = 0$
Alt 3: $(10 \times n_f + \lfloor n_s/2 \rfloor - N_{OFFSET,CQI} - N_{OFFSET,ClassA,RI}) \mod(H' \cdot N_{pd}) = 0$
Alt 4: $(10 \times n_f + \lfloor n_s/2 \rfloor - N_{OFFSET,CQI} - N_{OFFSET,RI} - N_{OFFSET,ClassA,RI}) \mod(H' \cdot M_{RI}) = 0$
Alt 5: $(10 \times n_f + \lfloor n_s/2 \rfloor - N_{OFFSET,CQI} - N_{OFFSET,ClassA,RI}) \mod(H' \cdot M_{RI}) = 0$

| Mode 1-1: Submode 1 | eMIMO-Type | Reporting type | Periodicity and offset |
|---|---|---|---|
| RI/WB PMI1<br>$(10 \times n_f + \lfloor n_s/2 \rfloor - N_{OFFSET,CQI} - N_{OFFSET,RI}) \mod(N_{pd} \cdot M_{RI}) = 0$ | Second (Class B, K = 1) | Type 5 | |

| Mode 1-1: Submode 1 | eMIMO-Type | Reporting type | Periodicity and offset |
|---|---|---|---|
| WB CQI/PMI2<br>$(10 \times n_f + \lfloor n_s/2 \rfloor - N_{OFFSET,CQI}) \mod(N_{pd}) = 0$ | Second (Class B, K = 1) | Type 2b | |

TABLE 11

Periodic CSI reporting configuration
0-c: PUCCH Mode 1-1. Submode 2.

| Mode 1-1: Submode 2 | eMIMO-Type | Reporting type | Periodicity and offset |
|---|---|---|---|
| RI/PMI $i_1$ or $(i_{1,1}, i_{1,2})$ | First (Class A) | Type 5 | Alt 0, Alt 1, Alt 2, Alt 3, Alt 4, Alt 5 |

Alt 0: $(10 \times n_f + \lfloor n_s/2 \rfloor - N_{OFFSET, ClassA, RI} - N_{OFFSET, ClassA, PMI}) \mod(H' \cdot M_{RI} \cdot N_{pd}) = 0$
Alt 1: $(10 \times n_f + \lfloor n_s/2 \rfloor - N_{OFFSET, ClassA, RI} - N_{OFFSET, ClassA, PMI}) \mod(H' \cdot M_{RI} \cdot N_{pd}) = 0$
Alt 2: $(10 \times n_f + \lfloor n_s/2 \rfloor - N_{OFFSET, ClassA, RI} - N_{OFFSET, ClassA, PMI}) \mod(H' \cdot N_{pd}) = 0$ TABLE 11-continued Periodic CSI reporting configuration
0-c: PUCCH Mode 1-1. Submode 2.

Alt 3: $(10 \times n_f + \lfloor n_s/2 \rfloor - N_{OFFSET, ClassA, RI} - N_{OFFSET, ClassA, PMI}) \bmod(H' \cdot N_{pd}) = 0$
Alt 4: $(10 \times n_f + \lfloor n_s/2 \rfloor - N_{OFFSET, ClassA, RI} - N_{OFFSET, ClassA, PMI}) \bmod(H' \cdot M_{RI}) = 0$
Alt 5: $(10 \times n_f + \lfloor n_s/2 \rfloor - N_{OFFSET, ClassA, RI} - N_{OFFSET, ClassA, PMI}) \bmod(H' \cdot M_{RI}) = 0$

| Mode 1-1: Submode 2 | eMIMO-Type | Reporting type | Periodicity and offset |
|---|---|---|---|
| RI | First (Class A) | Type 3 | Alt 0, Alt 1, Alt 2, Alt 3, Alt 4, Alt 5 |

Alt 0: $(10 \times n_f + \lfloor n_s/2 \rfloor - N_{OFFSET, CQI} - N_{OFFSET, RI} - N_{OFFSET, ClassA, RI}) \bmod(H' \cdot M_{RI} \cdot N_{pd}) = 0$
Alt 1: $(10 \times n_f + \lfloor n_s/2 \rfloor - N_{OFFSET, CQI} - N_{OFFSET, ClassA, RI}) \bmod(H' \cdot M_{RI} \cdot N_{pd}) = 0$
Alt 2: $(10 \times n_f + \lfloor n_s/2 \rfloor - N_{OFFSET, CQI} - N_{OFFSET, RI} - N_{OFFSET, ClassA, RI}) \bmod(H' \cdot N_{pd}) = 0$
Alt 3: $(10 \times n_f + \lfloor n_s/2 \rfloor - N_{OFFSET, CQI} - N_{OFFSET, ClassA, RI}) \bmod(H' \cdot N_{pd}) = 0$
Alt 4: $(10 \times n_f + \lfloor n_s/2 \rfloor - N_{OFFSET, CQI} - N_{OFFSET, RI} - N_{OFFSET, ClassA, RI}) \bmod(H' \cdot M_{RI}) = 0$
Alt 5: $(10 \times n_f + \lfloor n_s/2 \rfloor - N_{OFFSET, CQI} - N_{OFFSET, ClassA, RI}) \bmod(H' \cdot M_{RI}) = 0$

| Mode 1-1: Submode 2 | eMIMO-Type | Reporting type | Periodicity and offset |
|---|---|---|---|
| RI | Second (Class B, K = 1) | Type 3 | |

$(10 \times n_f + \lfloor n_s/2 \rfloor - N_{OFFSET, CQI} - N_{OFFSET, RI}) \bmod(N_{pd} \cdot M_{RI}) = 0$

| Mode 1-1: Submode 2 | eMIMO-Type | Reporting type | Periodicity and offset |
|---|---|---|---|
| WB CQI/PMI1/PMI2 | Second (Class B, K = 1) | Type 2b | |

$(10 \times n_f + \lfloor n_s/2 \rfloor - N_{OFFSET, CQI}) \bmod(N_{pd}) = 0$

In some embodiments, a UE is configured with a hybrid CSI reporting in which the 1st eMIMO-Type is Class B, $K_1=2$ and the 2nd eMIMO-Type is Class B, $K_2=1$. The CSI reported in: Class B, $K_1=2$ eMIMO-Type is PMI (assuming RI=1) for each CSI-RS resource; or Class B, $K_2=1$ eMIMO-Type includes RI$^{(2)}$, CQI, and PMI.

In some embodiments, a UE is configured to report periodic hybrid CSI, according to Configuration 2 and when PMI1 and PMI2 associated with two resources of first eMIMO-Type are reported jointly in the same PUCCH reporting instances, such that the reporting interval PMI1 and PMI2 of the first eMIMO-Type (Class B, K=2) is a multiple of one of the reports of the second eMIMO-Type (Class B, K=1) with the offset parameter $N_{OFFSET,ClassB}$, which is configured to the UE.

In such embodiments, wideband CQI/PMI reporting is configured, for example, for a UE configured in transmission mode 9 or 10, and UE configured with the first eMIMO-Type and the second eMIMO-Type by higher layers, and first eMIMO-Type set to 'CLASS B' with K=2 resources and second eMIMO-Type set to 'CLASS B' with K=1 resource. In another example, the reporting instances for wideband CQI/PMI of second eMIMO-Type are subframes satisfying $(10 \times n_f + \lfloor n_s/2 \rfloor - N_{OFFSET,CQI}) \bmod(N_{pd})=0$. In yet another example, the reporting interval of the RI reporting of second eMIMO-Type is an integer multiple $M_{RI}$ of period $N_{pd}$ (in subframes). In such example, the reporting instances for RI are subframes satisfying $(10 \times n_f + \lfloor n_s/2 \rfloor - N_{OFFSET,CQI} - N_{OFFSET,RI}) \bmod(N_{pd} \cdot M_{RI})=0$.

In yet another example, the reporting interval of wideband PMI1 and PMI2 of first eMIMO-Type reporting is according to one of the following alternatives: (Alt 0) The reporting instances for wideband PMI1 and PMI2 are subframes satisfying $(10 \times n_f + \lfloor n_s/2 \rfloor - N_{OFFSET,CQI} - N_{OFFSET,RI} - N_{OFFSET,ClassB}) \bmod(H' \cdot M_{RI} \cdot N_{pd})=0$; (Alt 1) The reporting instances for wideband PMI1 and PMI2 are subframes satisfying $(10 \times n_f + \lfloor n_s/2 \rfloor - N_{OFFSET,CQI} - N_{OFFSET,ClassB}) \bmod(H' \cdot M_{RI} \cdot N_{pd})=0$; (Alt 2) The reporting instances for wideband PMI1 and PMI2 are subframes satisfying $(10 \times n_f + \lfloor n_s/2 \rfloor - N_{OFFSET,CQI} - N_{OFFSET,RI} - N_{OFFSET,ClassB}) \bmod(H' \cdot N_{pd})=0$; (Alt 3) The reporting instances for wideband PMI1 and PMI2 are subframes satisfying $(10 \times n_f + \lfloor n_s/2 \rfloor - N_{OFFSET,CQI} - N_{OFFSET,ClassB}) \bmod(H' \cdot N_{pd})=0$; (Alt 4) The reporting instances for wideband PMI1 and PMI2 are subframes satisfying $(10 \times n_f + \lfloor n_s/2 \rfloor - N_{OFFSET,CQI} - N_{OFFSET,RI} - N_{OFFSET,ClassB}) \bmod(H' \cdot M_{RI})=0$; and (Alt 5) The reporting instances for wideband PMI1 and PMI2 are subframes satisfying $(10 \times n_f + \lfloor n_s/2 \rfloor - N_{OFFSET,CQI} - N_{OFFSET,ClassB}) \bmod(H' \cdot M_{RI})=0$.

The periodic CSI reporting using PUCCH Mode 1-1, Submode 1 and Submode 2, respectively, is summarized in Table 12 and Table 13.

TABLE 12

Periodic CSI reporting configuration
2: PUCCH Mode 1-1. Submode 1

| Mode 1-1: Submode 1 | eMIMO-Type | Reporting type | Periodicity and offset |
|---|---|---|---|
| PMI1/PMI2 | First (Class B, K = 2) | Type 2a | Alt 0, Alt 1, Alt 2, Alt 3, Alt 4, Alt 5 |

Alt 0: $(10 \times n_f + \lfloor n_s/2 \rfloor - N_{OFFSET, CQI} - N_{OFFSET, RI} - N_{OFFSET, ClassB}) \bmod(H' \cdot M_{RI} \cdot N_{pd}) = 0$
Alt 1: $(10 \times n_f + \lfloor n_s/2 \rfloor - N_{OFFSET, CQI} - N_{OFFSET, ClassB}) \bmod(H' \cdot M_{RI} \cdot N_{pd}) = 0$
Alt 2: $(10 \times n_f + \lfloor n_s/2 \rfloor - N_{OFFSET, CQI} - N_{OFFSET, RI} - N_{OFFSET, ClassB}) \bmod(H' \cdot N_{pd}) = 0$
Alt 3: $(10 \times n_f + \lfloor n_s/2 \rfloor - N_{OFFSET, CQI} - N_{OFFSET, ClassB}) \bmod(H' \cdot N_{pd}) = 0$
Alt 4: $(10 \times n_f + \lfloor n_s/2 \rfloor - N_{OFFSET, CQI} - N_{OFFSET, RI} - N_{OFFSET, ClassB}) \bmod(H' \cdot M_{RI}) = 0$
Alt 5: $(10 \times n_f + \lfloor n_s/2 \rfloor - N_{OFFSET, CQI} - N_{OFFSET, ClassB}) \bmod(H' \cdot M_{RI}) = 0$

| Mode 1-1: Submode 1 | eMIMO-Type | Reporting type | Periodicity and offset |
|---|---|---|---|
| RI/WB PMI1 | Second (Class B, K = 1) | Type 5 | |

$(10 \times n_f + \lfloor n_s/2 \rfloor - N_{OFFSET, CQI} - N_{OFFSET, RI}) \bmod(N_{pd} \cdot M_{RI}) = 0$

| Mode 1-1: Submode 1 | eMIMO-Type | Reporting type | Periodicity and offset |
|---|---|---|---|
| WB CQI/PMI2 | Second (Class B, K = 1) | Type 2b | |

$(10 \times n_f + \lfloor n_s/2 \rfloor - N_{OFFSET, CQI}) \bmod(N_{pd}) = 0$

TABLE 13

Periodic CSI reporting configuration
2: PUCCH Mode 1-1. Submode 2

| Mode 1-1: Submode 2 | eMIMO-Type | Reporting type | Periodicity and offset |
|---|---|---|---|
| PMI1/PMI2 | First (Class B, K = 2) | Type 2a | Alt 0, Alt 1, Alt 2, Alt 3, Alt 4, Alt 5 |

Alt 0: $(10 \times n_f + \lfloor n_s/2 \rfloor - N_{OFFSET, CQI} - N_{OFFSET, RI} - N_{OFFSET, ClassB}) \bmod(H' \cdot M_{RI} \cdot N_{pd}) = 0$
Alt 1: $(10 \times n_f + \lfloor n_s/2 \rfloor - N_{OFFSET, CQI} - N_{OFFSET, ClassB}) \bmod(H' \cdot M_{RI} \cdot N_{pd}) = 0$ TABLE 13-continued Periodic CSI reporting configuration
2: PUCCH Mode 1-1, Submode 2

Alt 2: $(10 \times n_f + \lfloor n_s/2 \rfloor - N_{OFFSET, CQI} - N_{OFFSET, RI} - N_{OFFSET, ClassB}) \mod(H' \cdot N_{pd}) = 0$
Alt 3: $(10 \times n_f + \lfloor n_s/2 \rfloor - N_{OFFSET, CQI} - N_{OFFSET, ClassB}) \mod(H' \cdot N_{pd}) = 0$
Alt 4: $(10 \times n_f + \lfloor n_s/2 \rfloor - N_{OFFSET, CQI} - N_{OFFSET, RI} - N_{OFFSET, ClassB}) \mod(H' \cdot M_{RI}) = 0$
Alt 5: $(10 \times n_f + \lfloor n_s/2 \rfloor - N_{OFFSET, CQI} - N_{OFFSET, ClassB}) \mod(H' \cdot M_{RI}) = 0$

| Mode 1-1: Submode 2 | eMIMO-Type | Reporting type | Periodicity and offset |
|---|---|---|---|
| RI | Second (Class B, K = 1) | Type 3 | |

$(10 \times n_f + \lfloor n_s/2 \rfloor - N_{OFFSET, CQI} - N_{OFFSET, RI}) \mod(N_{pd} \cdot M_{RI}) = 0$

| Mode 1-1: Submode 2 | eMIMO-Type | Reporting type | Periodicity and offset |
|---|---|---|---|
| WB CQI/PMI1/PMI2 | Second (Class B, K = 1) | Type 2b | |

$(10 \times n_f + \lfloor n_s/2 \rfloor - N_{OFFSET, CQI}) \mod(N_{pd}) = 0$

In some embodiments, a UE is configured to report periodic hybrid CSI, according to Configuration 2 and when PMI1 and PMI2 associated with two resources of first eMIMO-Type are reported in two different PUCCH reporting instances, such that the reporting interval of: PMI1 of the first eMIMO-Type (Class B, K=2) is a multiple of one of the reports of the second eMIMO-Type with the offset parameter $N_{OFFSET,ClassB,PMI1}$, which is configured to the UE; or PMI2 the first eMIMO-Type (Class B, K=2) is a multiple of one of the reports of the second eMIMO-Type with the offset parameter $N_{OFFSET,ClassB,PMI2}$, which is configured to the UE.

In some embodiments, the offsets of PMI1 and PMI2 of first eMIMO-Type are relative to the second eMIMO-Type. In such embodiments, wideband CQI/PMI reporting is configured, for example, for a UE configured in transmission mode 9 or 10, and UE configured with the first eMIMO-Type and the second eMIMO-Type by higher layers, and first eMIMO-Type set to 'CLASS B' with K=2 resources and second eMIMO-Type set to 'CLASS B' with K=1 resource.

In one example, the reporting instances for wideband CQI/PMI of second eMIMO-Type are subframes satisfying $(10 \times n_f + \lfloor n_s/2 \rfloor - N_{OFFSET,CQI}) \mod(N_{pd}) = 0$.

In yet another example, the reporting interval of the RI reporting of second eMIMO-Type is an integer multiple $M_{RI}$ of period $N_{pd}$ (in subframes). In such example, the reporting instances for RI are subframes satisfying $(10 \times n_f + \lfloor n_s/2 \rfloor - N_{OFFSET,CQI} - N_{OFFSET,RI}) \mod(N_{pd} \cdot M_{RI}) = 0$.

In yet another example, the reporting interval of wideband PMI1 of first eMIMO-Type reporting is according to one of the following alternatives: (Alt 0) The reporting instances for wideband PMI1 are subframes satisfying $(10 \times n_f + \lfloor n_s/2 \rfloor - N_{OFFSET,CQI} - N_{OFFSET,RI} - N_{OFFSET,ClassB,PMI1}) \mod(H' \cdot M_{RI} \cdot N_{pd}) = 0$; (Alt 1) The reporting instances for wideband PMI1 are subframes satisfying $(10 \times n_f + \lfloor n_s/2 \rfloor - N_{OFFSET,CQI} - N_{OFFSET,ClassB,PMI1}) \mod(H' \cdot M_{RI} \cdot N_{pd}) = 0$; (Alt 2) The reporting instances for wideband PMI1 are subframes satisfying $(10 \times n_f + \lfloor n_s/2 \rfloor - N_{OFFSET,CQI} - N_{OFFSET,RI} - N_{OFFSET,ClassB,PMI1}) \mod(H' \cdot N_{pd}) = 0$; (Alt 3) The reporting instances for wideband PMI1 are subframes satisfying $(10 \times n_f + \lfloor n_s/2 \rfloor - N_{OFFSET,CQI} - N_{OFFSET,ClassB,PMI1}) \mod(H' \cdot N_{pd}) = 0$; (Alt 4) The reporting instances for wideband PMI1 are subframes satisfying $(10 \times n_f + \lfloor n_s/2 \rfloor - N_{OFFSET,CQI} - N_{OFFSET,RI} - N_{OFFSET,ClassB,PMI1}) \mod(H' \cdot M_{RI}) = 0$; and (Alt 5) The reporting instances for wideband PMI1 are subframes satisfying $(10 \times n_f + \lfloor n_s/2 \rfloor - N_{OFFSET,CQI} - N_{OFFSET,ClassB,PMI1}) \mod(H' \cdot M_{RI}) = 0$.

In yet another example, the reporting interval of wideband PMI2 of first eMIMO-Type reporting is according to one of the following alternatives: (Alt 0) The reporting instances for wideband PMI2 are subframes satisfying $(10 \times n_f + \lfloor n_s/2 \rfloor - N_{OFFSET,CQI} - N_{OFFSET,RI} - N_{OFFSET,ClassB,PMI2}) \mod(H' \cdot M_{RI} \cdot N_{pd}) = 0$; (Alt 1) The reporting instances for wideband PMI2 are subframes satisfying $(10 \times n_f + \lfloor n_s/2 \rfloor - N_{OFFSET,CQI} - N_{OFFSET,ClassB,PMI2}) \mod(H' \cdot M_{RI} \cdot N_{pd}) = 0$; (Alt 2) The reporting instances for wideband PMI2 are subframes satisfying $(10 \times n_f + \lfloor n_s/2 \rfloor - N_{OFFSET,CQI} - N_{OFFSET,RI} - N_{OFFSET,ClassB,PMI2}) \mod(H' \cdot N_{pd}) = 0$; (Alt 3) The reporting instances for wideband PMI2 are subframes satisfying $(10 \times n_f + \lfloor n_s/2 \rfloor - N_{OFFSET,CQI} - N_{OFFSET,ClassB,PMI2}) \mod(H' \cdot N_{pd}) = 0$; (Alt 4) The reporting instances for wideband PMI2 are subframes satisfying $(10 \times n_f + \lfloor n_s/2 \rfloor - N_{OFFSET,CQI} - N_{OFFSET,RI} - N_{OFFSET,ClassB,PMI2}) \mod(H' \cdot M_{RI}) = 0$; and (Alt 5) The reporting instances for wideband PMI2 are subframes satisfying $(10 \times n_f + \lfloor n_s/2 \rfloor - N_{OFFSET,CQI} - N_{OFFSET,ClassB,PMI2}) \mod(H' \cdot M_{RI}) = 0$.

The periodic CSI reporting using PUCCH Mode 1-1, Submode 1 and Submode 2, respectively, is summarized in Table 14 and Table 15.

TABLE 14

Periodic CSI reporting configuration
2: PUCCH Mode 1-1, Submode 1

| Mode 1-1: Submode 1 | eMIMO-Type | Reporting type | Periodicity and offset |
|---|---|---|---|
| PMI1 | First (Class B, K = 2) | Type 2a | Alt 0, Alt 1, Alt 2, Alt 3, Alt 4, Alt 5 |

Alt 0: $(10 \times n_f + \lfloor n_s/2 \rfloor - N_{OFFSET, CQI} - N_{OFFSET, RI} - N_{OFFSET, ClassB, PMI1}) \mod(H' \cdot M_{RI} \cdot N_{pd}) = 0$
Alt 1: $(10 \times n_f + \lfloor n_s/2 \rfloor - N_{OFFSET, CQI} - N_{OFFSET, ClassB, PMI1}) \mod(H' \cdot M_{RI} \cdot N_{pd}) = 0$
Alt 2: $(10 \times n_f + \lfloor n_s/2 \rfloor - N_{OFFSET, CQI} - N_{OFFSET, RI} - N_{OFFSET, ClassB, PMI1}) \mod(H' \cdot N_{pd}) = 0$
Alt 3: $(10 \times n_f + \lfloor n_s/2 \rfloor - N_{OFFSET, CQI} - N_{OFFSET, ClassB, PMI1}) \mod(H' \cdot N_{pd}) = 0$
Alt 4: $(10 \times n_f + \lfloor n_s/2 \rfloor - N_{OFFSET, CQI} - N_{OFFSET, RI} - N_{OFFSET, ClassB, PMI1}) \mod(H' \cdot M_{RI}) = 0$
Alt 5: $(10 \times n_f + \lfloor n_s/2 \rfloor - N_{OFFSET, CQI} - N_{OFFSET, ClassB, PMI1}) \mod(H' \cdot M_{RI}) = 0$

| Mode 1-1: Submode 1 | eMIMO-Type | Reporting type | Periodicity and offset |
|---|---|---|---|
| PMI2 | First (Class B, K = 2) | Type 2a | |

Alt 0: $(10 \times n_f + \lfloor n_s/2 \rfloor - N_{OFFSET, CQI} - N_{OFFSET, RI} - N_{OFFSET, ClassB, PMI2}) \mod(H' \cdot M_{RI} \cdot N_{pd}) = 0$
Alt 1: $(10 \times n_f + \lfloor n_s/2 \rfloor - N_{OFFSET, CQI} - N_{OFFSET, ClassB, PMI2}) \mod(H' \cdot M_{RI} \cdot N_{pd}) = 0$
Alt 2: $(10 \times n_f + \lfloor n_s/2 \rfloor - N_{OFFSET, CQI} - N_{OFFSET, RI} - N_{OFFSET, ClassB, PMI2}) \mod(H' \cdot N_{pd}) = 0$
Alt 3: $(10 \times n_f + \lfloor n_s/2 \rfloor - N_{OFFSET, CQI} - N_{OFFSET, ClassB, PMI2}) \mod(H' \cdot N_{pd}) = 0$
Alt 4: $(10 \times n_f + \lfloor n_s/2 \rfloor - N_{OFFSET, CQI} - N_{OFFSET, RI} - N_{OFFSET, ClassB, PMI2}) \mod(H' \cdot M_{RI}) = 0$
Alt 5: $(10 \times n_f + \lfloor n_s/2 \rfloor - N_{OFFSET, CQI} - N_{OFFSET, ClassB, PMI2}) \mod(H' \cdot M_{RI}) = 0$

| Mode 1-1: Submode 1 | eMIMO-Type | Reporting type | Periodicity and offset |
|---|---|---|---|
| RI/WB PMI1 | Second (Class B, K = 1) | Type 5 | |

$(10 \times n_f + \lfloor n_s/2 \rfloor - N_{OFFSET, CQI} - N_{OFFSET, RI}) \mod(N_{pd} \cdot M_{RI}) = 0$ TABLE 14-continued Periodic CSI reporting configuration
2: PUCCH Mode 1-1. Submode 1

| Mode 1-1: Submode 1 | eMIMO-Type | Reporting type | Periodicity and offset |
|---|---|---|---|
| WB CQI/PMI2 | Second (Class B, K = 1) | Type 2b | |
| $(10 \times n_f + \lfloor n_s/2 \rfloor - N_{OFFSET, CQI}) \bmod(N_{pd}) = 0$ | | | |

TABLE 15

Periodic CSI reporting configuration
2: PUCCH Mode 1-1. Submode 2

| Mode 1-1: Submode 2 | eMIMO-Type | Reporting type | Periodicity and offset |
|---|---|---|---|
| PMI1 | First (Class B, K = 2) | Type 2a | Alt 0, Alt 1, Alt 2, Alt 3, Alt 4, Alt 5 |
| Alt 0: $(10 \times n_f + \lfloor n_s/2 \rfloor - N_{OFFSET, CQI} - N_{OFFSET, RI} - N_{OFFSET, ClassB, PMI1}) \bmod(H' \cdot M_{RI} \cdot N_{pd}) = 0$ | | | |
| Alt 1: $(10 \times n_f + \lfloor n_s/2 \rfloor - N_{OFFSET, CQI} - N_{OFFSET, ClassB, PMI1}) \bmod(H' \cdot M_{RI} \cdot N_{pd}) = 0$ | | | |
| Alt 2: $(10 \times n_f + \lfloor n_s/2 \rfloor - N_{OFFSET, CQI} - N_{OFFSET, RI} - N_{OFFSET, ClassB, PMI1}) \bmod(H' \cdot N_{pd}) = 0$ | | | |
| Alt 3: $(10 \times n_f + \lfloor n_s/2 \rfloor - N_{OFFSET, CQI} - N_{OFFSET, ClassB, PMI1}) \bmod(H' \cdot N_{pd}) = 0$ | | | |
| Alt 4: $(10 \times n_f + \lfloor n_s/2 \rfloor - N_{OFFSET, CQI} - N_{OFFSET, RI} - N_{OFFSET, ClassB, PMI1}) \bmod(H' \cdot M_{RI}) = 0$ | | | |
| Alt 5: $(10 \times n_f + \lfloor n_s/2 \rfloor - N_{OFFSET, CQI} - N_{OFFSET, ClassB, PMI1}) \bmod(H' \cdot M_{RI}) = 0$ | | | |

| Mode 1-1: Submode 2 | eMIMO-Type | Reporting type | Periodicity and offset |
|---|---|---|---|
| PMI2 | First (Class B, K = 2) | Type 2a | Alt 0, Alt 1, Alt 2, Alt 3, Alt 4, Alt 5 |
| Alt 0: $(10 \times n_f + \lfloor n_s/2 \rfloor - N_{OFFSET, CQI} - N_{OFFSET, RI} - N_{OFFSET, ClassB, PMI2}) \bmod(H' \cdot M_{RI} \cdot N_{pd}) = 0$ | | | |
| Alt 1: $(10 \times n_f + \lfloor n_s/2 \rfloor - N_{OFFSET, CQI} - N_{OFFSET, ClassB, PMI2}) \bmod(H' \cdot M_{RI} \cdot N_{pd}) = 0$ | | | |
| Alt 2: $(10 \times n_f + \lfloor n_s/2 \rfloor - N_{OFFSET, CQI} - N_{OFFSET, RI} - N_{OFFSET, ClassB, PMI2}) \bmod(H' \cdot N_{pd}) = 0$ | | | |
| Alt 3: $(10 \times n_f + \lfloor n_s/2 \rfloor - N_{OFFSET, CQI} - N_{OFFSET, ClassB, PMI2}) \bmod(H' \cdot N_{pd}) = 0$ | | | |
| Alt 4: $(10 \times n_f + \lfloor n_s/2 \rfloor - N_{OFFSET, CQI} - N_{OFFSET, RI} - N_{OFFSET, ClassB, PMI2}) \bmod(H' \cdot M_{RI}) = 0$ | | | |
| Alt 5: $(10 \times n_f + \lfloor n_s/2 \rfloor - N_{OFFSET, CQI} - N_{OFFSET, ClassB, PMI2}) \bmod(H' \cdot M_{RI}) = 0$ | | | |

| Mode 1-1: Submode 2 | eMIMO-Type | Reporting type | Periodicity and offset |
|---|---|---|---|
| RI | Second (Class B, K = 1) | Type 3 | |
| $(10 \times n_f + \lfloor n_s/2 \rfloor - N_{OFFSET, CQI} - N_{OFFSET, RI}) \bmod(N_{pd} \cdot M_{RI}) = 0$ | | | |

| Mode 1-1: Submode 2 | eMIMO-Type | Reporting type | Periodicity and offset |
|---|---|---|---|
| WB CQI/PMI1/PMI2 | Second (Class B, K = 1) | Type 2b | |
| $(10 \times n_f + \lfloor n_s/2 \rfloor - N_{OFFSET, CQI}) \bmod(N_{pd}) = 0$ | | | |

In some embodiments, the offsets of PMI1 and PMI2 of first eMIMO-Type are relative to each other. For example, offset of PMI2 is relative to that of PMI1. In such embodiments, wideband CQI/PMI reporting is configured, for example, for a UE configured in transmission mode 9 or 10, and UE configured with the first eMIMO-Type and the second eMIMO-Type by higher layers, and first eMIMO-Type set to 'CLASS B' with K=2 resources and second eMIMO-Type set to 'CLASS B' with K=1 resource.

In one example, the reporting instances for wideband CQI/PMI of second eMIMO-Type are subframes satisfying $(10 \times n_f + \lfloor n_s/2 \rfloor - N_{OFFSET, CQI}) \bmod(N_{pd}) = 0$.

In yet another example, the reporting interval of the RI reporting of second eMIMO-Type is an integer multiple $M_{RI}$ of period $N_{pd}$ (in subframes). In such example, the reporting instances for RI are subframes satisfying $(10 \times n_f + \lfloor n_s/2 \rfloor - N_{OFFSET, CQI} - N_{OFFSET, RI}) \bmod(N_{pd} \cdot M_{RI}) = 0$.

In yet another example, the reporting interval of wideband PMI1 of first eMIMO-Type reporting is according to one of the following alternatives: (Alt 0) The reporting instances for wideband PMI1 are subframes satisfying $(10 \times n_f + \lfloor n_s/2 \rfloor - N_{OFFSET, CQI} - N_{OFFSET, RI} - N_{OFFSET, ClassB, PMI1}) \bmod(H' \cdot M_{RI} \cdot N_{pd}) = 0$; (Alt 1) The reporting instances for wideband PMI1 are subframes satisfying $(10 \times n_f + \lfloor n_s/2 \rfloor - N_{OFFSET, CQI} - N_{OFFSET, ClassB, PMI1}) \bmod(H' \cdot M_{RI} \cdot N_{pd}) = 0$; (Alt 2) The reporting instances for wideband PMI1 are subframes satisfying $(10 \times n_f + \lfloor n_s/2 \rfloor - N_{OFFSET, CQI} - N_{OFFSET, RI} - N_{OFFSET, ClassB, PMI1}) \bmod(H' \cdot N_{pd}) = 0$; (Alt 3) The reporting instances for wideband PMI1 are subframes satisfying $(10 \times n_f + \lfloor n_s/2 \rfloor - N_{OFFSET, CQI} - N_{OFFSET, ClassB, PMI1}) \bmod(H' \cdot N_{pd}) = 0$; (Alt 4) The reporting instances for wideband PMI1 are subframes satisfying $(10 \times n_f + \lfloor n_s/2 \rfloor - N_{OFFSET, CQI} - N_{OFFSET, RI} - N_{OFFSET, ClassB, PMI1}) \bmod(H' \cdot M_{RI}) = 0$; and (Alt 5) The reporting instances for wideband PMI1 are subframes satisfying $(10 \times n_f + \lfloor n_s/2 \rfloor - N_{OFFSET, CQI} - N_{OFFSET, ClassB, PMI1}) \bmod(H' \cdot M_{RI}) = 0$.

In yet another example, the reporting interval of wideband PMI2 of first eMIMO-Type reporting is according to one of the following alternatives: (Alt 0) The reporting instances for RI are subframes satisfying $(10 \times n_f + \lfloor n_s/2 \rfloor - N_{OFFSET, ClassB, PMI1} - N_{OFFSET, ClassB, PMI2}) \bmod(H' \cdot M_{RI} \cdot N_{pd}) = 0$; (Alt 1) The reporting instances for RI are subframes satisfying $(10 \times n_f + \lfloor n_s/2 \rfloor - N_{OFFSET, ClassB, PMI1} - N_{OFFSET, ClassB, PMI2}) \bmod(H' \cdot M_{RI} \cdot N_{pd}) = 0$; (Alt 2) The reporting instances for RI are subframes satisfying $(10 \times n_f + \lfloor n_s/2 \rfloor - N_{OFFSET, ClassB, PMI1} - N_{OFFSET, ClassB, PMI2}) \bmod(H' \cdot N_{pd}) = 0$; (Alt 3) The reporting instances for RI are subframes satisfying $(10 \times n_f + \lfloor n_s/2 \rfloor - N_{OFFSET, ClassB, PMI1} - N_{OFFSET, ClassB, PMI2}) \bmod(H' \cdot N_{pd}) = 0$; (Alt 4) The reporting instances for RI are subframes satisfying $(10 \times n_f + \lfloor n_s/2 \rfloor - N_{OFFSET, ClassB, PMI1} - N_{OFFSET, ClassB, PMI2}) \bmod(H' \cdot M_{RI}) = 0$; and (Alt 5) The reporting instances for RI are subframes satisfying $(10 \times n_f + \lfloor n_s/2 \rfloor - N_{OFFSET, ClassB, PMI1} - N_{OFFSET, ClassB, PMI2}) \bmod(H' \cdot M_{RI}) = 0$.

The periodic CSI reporting using PUCCH Mode 1-1, Submode 1 and Submode 2, respectively, is summarized in Table 16 and Table 17.

TABLE 16

Periodic CSI reporting configuration
2: PUCCH Mode 1-1. Submode 1

| Mode 1-1: Submode 1 | eMIMO-Type | Reporting type | Periodicity and offset |
|---|---|---|---|
| PMI1 | First (Class B, K = 2) | Type 2a | Alt 0, Alt 1, Alt 2, Alt 3, Alt 4, Alt 5 |
| Alt 0: $(10 \times n_f + \lfloor n_s/2 \rfloor - N_{OFFSET, CQI} - N_{OFFSET, RI} - N_{OFFSET, ClassB, PMI1}) \bmod(H' \cdot M_{RI} \cdot N_{pd}) = 0$ | | | |
| Alt 1: $(10 \times n_f + \lfloor n_s/2 \rfloor - N_{OFFSET, CQI} - N_{OFFSET, ClassB, PMI1}) \bmod(H' \cdot M_{RI} \cdot N_{pd}) = 0$ | | | |
| Alt 2: $(10 \times n_f + \lfloor n_s/2 \rfloor - N_{OFFSET, CQI} - N_{OFFSET, RI} - N_{OFFSET, ClassB, PMI1}) \bmod(H' \cdot N_{pd}) = 0$ | | | |
| Alt 3: $(10 \times n_f + \lfloor n_s/2 \rfloor - N_{OFFSET, CQI} - N_{OFFSET, ClassB, PMI1}) \bmod(H' \cdot N_{pd}) = 0$ | | | |
| Alt 4: $(10 \times n_f + \lfloor n_s/2 \rfloor - N_{OFFSET, CQI} - N_{OFFSET, RI} - N_{OFFSET, ClassB, PMI1}) \bmod(H' \cdot M_{RI}) = 0$ | | | |

TABLE 16-continued

Periodic CSI reporting configuration
2: PUCCH Mode 1-1, Submode 1

Alt 5: $(10 \times n_f + \lfloor n_s/2 \rfloor - N_{OFFSET, CQI} - N_{OFFSET, ClassB, PMI1}) \bmod(H' \cdot M_{RI}) = 0$

| Mode 1-1: Submode 1 | eMIMO-Type | Reporting type | Periodicity and offset |
|---|---|---|---|
| PMI2 | First (Class B, K = 2) | Type 2a | Alt 0, Alt 1, Alt 2, Alt 3, Alt 4, Alt 5 |

Alt 0: $(10 \times n_f + \lfloor n_s/2 \rfloor - N_{OFFSET, ClassB, PMI1} - N_{OFFSET, ClassB, PMI2}) \bmod(H' \cdot M_{RI} \cdot N_{pd}) = 0$
Alt 1: $(10 \times n_f + \lfloor n_s/2 \rfloor - N_{OFFSET, ClassB, PMI1} - N_{OFFSET, ClassB, PMI2}) \bmod(H' \cdot M_{RI} \cdot N_{pd}) = 0$
Alt 2: $(10 \times n_f + \lfloor n_s/2 \rfloor - N_{OFFSET, ClassB, PMI1} - N_{OFFSET, ClassB, PMI2}) \bmod(H' \cdot N_{pd}) = 0$
Alt 3: $(10 \times n_f + \lfloor n_s/2 \rfloor - N_{OFFSET, ClassB, PMI1} - N_{OFFSET, ClassB, PMI2}) \bmod(H' \cdot N_{pd}) = 0$
Alt 4: $(10 \times n_f + \lfloor n_s/2 \rfloor - N_{OFFSET, ClassB, PMI1} - N_{OFFSET, ClassB, PMI2}) \bmod(H' \cdot M_{RI}) = 0$
Alt 5: $(10 \times n_f + \lfloor n_s/2 \rfloor - N_{OFFSET, ClassB, PMI1} - N_{OFFSET, ClassB, PMI2}) \bmod(H' \cdot M_{RI}) = 0$

| Mode 1-1: Submode 1 | eMIMO-Type | Reporting type | Periodicity and offset |
|---|---|---|---|
| RI/WB PMI1 | Second (Class B, K = 1) | Type 5 | |

$(10 \times n_f + \lfloor n_s/2 \rfloor - N_{OFFSET, CQI} - N_{OFFSET, RI}) \bmod(N_{pd} \cdot M_{RI}) = 0$

| Mode 1-1: Submode 1 | eMIMO-Type | Reporting type | Periodicity and offset |
|---|---|---|---|
| WB CQI/PMI2 | Second (Class B, K = 1) | Type 2b | |

$(10 \times n_f + \lfloor n_s/2 \rfloor - N_{OFFSET, CQI}) \bmod(N_{pd}) = 0$

TABLE 17

Periodic CSI reporting configuration
2: PUCCH Mode 1-1, Submode 2

| Mode 1-1: Submode 2 | eMIMO-Type | Reporting type | Periodicity and offset |
|---|---|---|---|
| PMI1 | First (Class B, K = 2) | Type 2a | Alt 0, Alt 1, Alt 2, Alt 3, Alt 4, Alt 5 |

Alt 0: $(10 \times n_f + \lfloor n_s/2 \rfloor - N_{OFFSET, CQI} - N_{OFFSET, RI} - N_{OFFSET, ClassB, PMI1}) \bmod(H' \cdot M_{RI} \cdot N_{pd}) = 0$
Alt 1: $(10 \times n_f + \lfloor n_s/2 \rfloor - N_{OFFSET, CQI} - N_{OFFSET, ClassB, PMI1}) \bmod(H' \cdot M_{RI} \cdot N_{pd}) = 0$
Alt 2: $(10 \times n_f + \lfloor n_s/2 \rfloor - N_{OFFSET, CQI} - N_{OFFSET, RI} - N_{OFFSET, ClassB, PMI1}) \bmod(H' \cdot N_{pd}) = 0$
Alt 3: $(10 \times n_f + \lfloor n_s/2 \rfloor - N_{OFFSET, CQI} - N_{OFFSET, ClassB, PMI1}) \bmod(H' \cdot N_{pd}) = 0$
Alt 4: $(10 \times n_f + \lfloor n_s/2 \rfloor - N_{OFFSET, CQI} - N_{OFFSET, RI} - N_{OFFSET, ClassB, PMI1}) \bmod(H' \cdot M_{RI}) = 0$
Alt 5: $(10 \times n_f + \lfloor n_s/2 \rfloor - N_{OFFSET, CQI} - N_{OFFSET, ClassB, PMI1}) \bmod(H' \cdot M_{RI}) = 0$

| Mode 1-1: Submode 2 | eMIMO-Type | Reporting type | Periodicity and offset |
|---|---|---|---|
| PMI2 | First (Class B, K = 2) | Type 2a | Alt 0, Alt 1, Alt 2, Alt 3, Alt 4, Alt 5 |

Alt 0: $(10 \times n_f + \lfloor n_s/2 \rfloor - N_{OFFSET, ClassB, PMI1} - N_{OFFSET, ClassB, PMI2}) \bmod(H' \cdot M_{RI} \cdot N_{pd}) = 0$
Alt 1: $(10 \times n_f + \lfloor n_s/2 \rfloor - N_{OFFSET, ClassB, PMI1} - N_{OFFSET, ClassB, PMI2}) \bmod(H' \cdot M_{RI} \cdot N_{pd}) = 0$
Alt 2: $(10 \times n_f + \lfloor n_s/2 \rfloor - N_{OFFSET, ClassB, PMI1} - N_{OFFSET, ClassB, PMI2}) \bmod(H' \cdot N_{pd}) = 0$
Alt 3: $(10 \times n_f + \lfloor n_s/2 \rfloor - N_{OFFSET, ClassB, PMI1} - N_{OFFSET, ClassB, PMI2}) \bmod(H' \cdot N_{pd}) = 0$
Alt 4: $(10 \times n_f + \lfloor n_s/2 \rfloor - N_{OFFSET, ClassB, PMI1} - N_{OFFSET, ClassB, PMI2}) \bmod(H' \cdot M_{RI}) = 0$
Alt 5: $(10 \times n_f + \lfloor n_s/2 \rfloor - N_{OFFSET, ClassB, PMI1} - N_{OFFSET, ClassB, PMI2}) \bmod(H' \cdot M_{RI}) = 0$

| Mode 1-1: Submode 2 | eMIMO-Type | Reporting type | Periodicity and offset |
|---|---|---|---|
| RI | Second (Class B, K = 1) | Type 3 | |

$(10 \times n_f + \lfloor n_s/2 \rfloor - N_{OFFSET, CQI} - N_{OFFSET, RI}) \bmod(N_{pd} \cdot M_{RI}) = 0$

| Mode 1-1: Submode 2 | eMIMO-Type | Reporting type | Periodicity and offset |
|---|---|---|---|
| WB CQI/PMI1/PMI2 | Second (Class B, K = 1) | Type 2b | |

$(10 \times n_f + \lfloor n_s/2 \rfloor - N_{OFFSET, CQI}) \bmod(N_{pd}) = 0$

Figure 16:
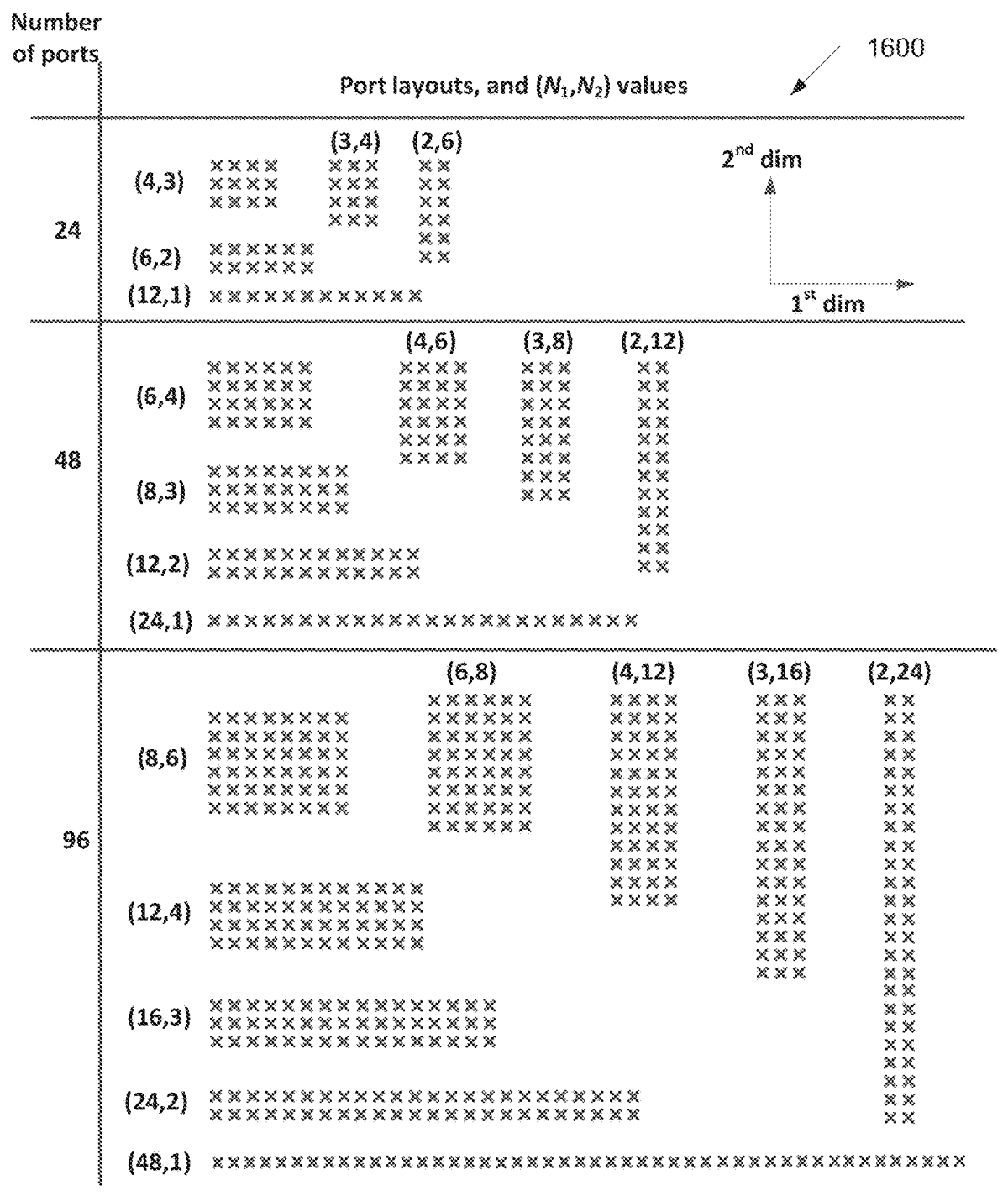

FIG. 16 illustrates an example dual-polarized antenna port layouts for {24, 48, 96} ports 1600 according to embodiments of the present disclosure. An embodiment of the dual-polarized antenna port layouts for {24, 48, 96} ports 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

Figure 17:
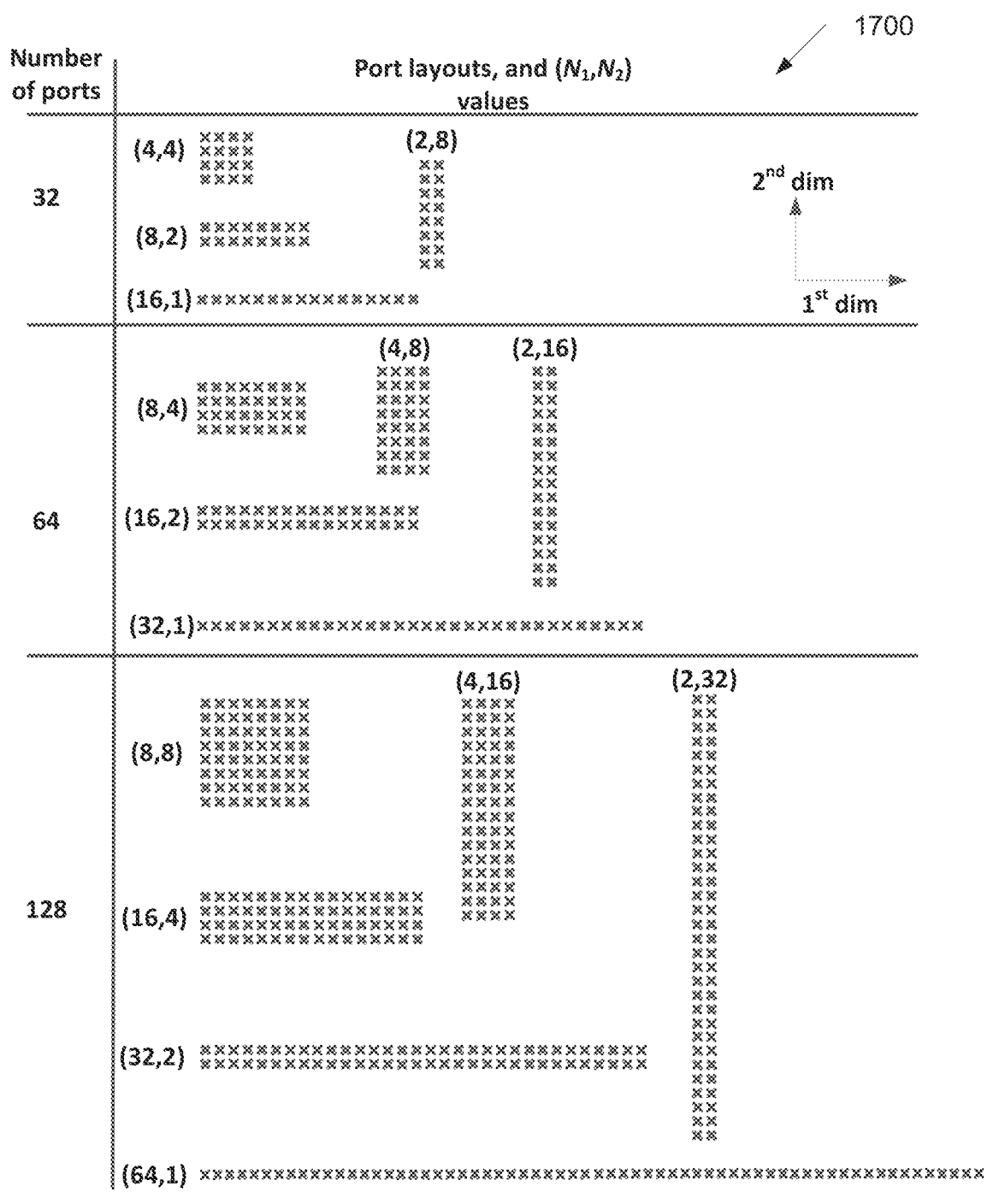

FIG. 17 illustrates an example dual-polarized antenna port layouts for {32, 64, 128} ports 1700 according to embodiments of the present disclosure. An embodiment of the dual-polarized antenna port layouts for {32, 64, 128} ports 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

The future generation of communication systems, such as LTE system and beyond, and 5G, will likely to have more number of antenna ports than the ones currently supported by the standards. An illustration of 1D and 2D antenna port layouts for {24, 48, 96} and {32, 64, 128} ports are shown in FIG. 16 and FIG. 17.

In some embodiments, a UE is configured with one or both of the two types of CSI-RS resources: the "first CSI-RS resource" corresponds to either 1) full port: CSI-RS is transmitted from all $2N_1N_2$ ports and it is non-precoded (NP) or partial port: CSI-RS is transmitted from a subset of $2N_1N_2$ ports, and it is either i) NP CSI-RS or ii) beamformed (BF) CSI-RS with $K_1>1$ resources; or the "second CSI-RS resource" corresponds to a BF CSI-RS with either 1) $K_2=1$ resource or 2) $K_2>1$ resources.

In some embodiments, the configured first CSI-RS has one component for each dimension. For 1D antenna port configurations, the first CSI-RS has one component, and for 2D antenna port configurations, the first CSI-RS has two components first CSI-RS 1 or first CSI-RS component 1, and first CSI-RS 2 or first CSI-RS component 2.

In some embodiments, the configured second CSI-RS has one component for each dimension. For 1D antenna port configurations, the second CSI-RS has one component, and for 2D antenna port configurations, the second CSI-RS has two components second CSI-RS 1 or second CSI-RS component 1, and second CSI-RS 2 or second CSI-RS component 2.

In some embodiments, a UE is configured to report at least one class of CSI reporting or eMIMO-Type from at least four classes of CSI reporting or eMIMO-Types, Class A eMIMO-Type, Class B eMIMO-Type, Class C eMIMO-Type, and Class C' eMIMO-Type. In Class A eMIMO-Type, the CSI content includes a single or a pair of 1st PMI, a single 2nd PMI, CQI, and RI. It is associated with the first or the second type of CSI-RS resource. In Class B eMIMO-Type, the CSI content includes a single PMI, CQI, and RI. In such class, it is associated with the first or the second type (BF) of CSI-RS resource with K resources and there are two sub-types: 1) K=1 (no CRI-RS resource indicator (CRI) feedback); and K>1 including two alternatives: Alt 1: CRI is fed back; and Alt 2: K independent CSI reports each including at least a PMI. In Class C eMIMO-Type, the CSI content includes a single or a pair of 1st PMI, which does not include co-phase. In such Class, it is associated with the first type (NP) of CSI-RS resource. In Class C' eMIMO-Type, the CSI content includes a single or a pair of 1st PMI, which includes co-phase. In such class, it is associated with the first type (NP) of CSI-RS resource.

In some embodiments, the codebooks for different values of the eMIMO-Type are different. In this case, when the UE is configured with Class X eMIMO-Type, where X={A, B, C, C', . . . }, the it uses the corresponding codebook to derive CSI report.

In some embodiments, the codebooks for some values of the eMIMO-Type are the same. In one example, the codebook for Class A and Class C eMIMO-Types are the same. In another example, the codebook for Class A, Class B, and Class C eMIMO-Types are the same. In this case, the UE derives the CSI report using the full or a part of the common codebook depending on the configured value of eMIMO-Types.

In some embodiments, the codebooks for all values of the eMIMO-Type are the same. For example, the codebook for eMIMO-Type=Class A, Class B, Class C, and Class C' are the same.

In some embodiments, the full-port first CSI-RS resource is also referred to as Class A CSI-RS, the partial-port first CSI-RS resource is also referred to as Class C (or C') CSI-RS or Class B (K>1) CSI-RS, and the second CSI-RS resource is also referred to as Class B CSI-RS.

In LTE specification, the following CSI reporting types or eMIMO-Type are supported: Class A eMIMO-Type in which "First CSI-RS resource" is full-port, NP and CSI is reported using Class A codebook; and Class B eMIMO-Type in which "Second CSI-RS resource" is BF and CSI is reported using Class B codebook. In such Class, K=1 (no CSI feedback) or K>1 (CRI feedback).

For transmission on two antenna ports, p∈{0,1}, and for the purpose of CSI reporting based on two antenna ports p ∈{0,1} or p ∈{15,16}, the precoding matrix w(i) shall be selected from Table 18 or a subset thereof. For the closed-loop spatial multiplexing transmission mode defined in LTE specification, the codebook index 0 is not used when the number of layers is v=2.

TABLE 18

Codebook for transmission on antenna ports {0,1} and for CSI reporting based on antenna ports {0,1} or {15,16}

| Codebook index | Number of layers v | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

For 8 antenna ports {15, 16, 17, 18, 19, 20, 21, 22}, 12 antenna ports {15, 16, 17, 18, 19, 20, 21, 22, 23, 24, 25, 26}, 16 antenna ports {15, 16, 17, 18, 19, 20, 21, 22, 23, 24, 25, 26, 27, 28, 29, 30}, and UE configured with higher layer parameter eMIMO-Type, and eMIMO-Type is set to 'CLASS A', each PMI value corresponds to three codebook, where the quantities $\varphi_n$, $u_m$ and $v_{l,m}$ are given by:

$$\varphi_n = e^{j\pi n/2}$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

where, the values of $N_1$, $N_2$, $O_1$, and $O_2$ are configured with the higher-layer parameters codebook-Config-N1, codebook-Config-N2, codebook-Over-Sampling-RateConfig-O1, and codebook-Over-Sampling-RateConfig-O2, respectively.

The supported configurations of $(O_1, O_2)$ and $(N_1, N_2)$ for a given number of CSI-RS ports are given in Table 19. The number of CSI-RS ports, P, is $2N_1 N_2$.

TABLE 19

Supported configurations of $(O_1, O_2)$ and $(N_1, N_2)$

| Number of CSI-RS antenna ports, P | $(N_1, N_2)$ | $(O_1, O_2)$ |
| --- | --- | --- |
| 8 | (2, 2) | (4, 4), (8, 8) |
| 12 | (2, 3) | (8, 4), (8, 8) |
| | (3, 2) | (8, 4), (4, 4) |
| 16 | (2, 4) | (8, 4), (8, 8) |
| | (4, 2) | (8, 4), (4, 4) |
| | (8, 1) | (4, —), (8, —) |

TABLE 20

| Codebook for 1-layer CSI reporting antenna ports 15 to 14+P |
|---|

Value of Codebook-Config. 1

| | | $i_2$ | | | |
|---|---|---|---|---|---|
| $i_{1,1}$ | $i_{1,2}$ | 0 | 1 | 2 | 3 |
| $0,1,\cdots,O_1N_1-1$ | $0,1,\cdots,O_2N_2-1$ | $W^{(1)}_{i_{1,1},i_{1,2},0}$ | $W^{(1)}_{i_{1,1},i_{1,2},1}$ | $W^{(1)}_{i_{1,1},i_{1,2},2}$ | $W^{(1)}_{i_{1,1},i_{1,2},3}$ | where $W^{(1)}_{l,m,n} = \frac{1}{\sqrt{P}} \begin{bmatrix} v_{l,m} \\ \varphi_n v_{l,m} \end{bmatrix}$

Value of Codebook-Config. 2

| | | $i_2$ | | | |
|---|---|---|---|---|---|
| $i_{1,1}$ | $i_{1,2}$ | 0 | 1 | 2 | 3 |
| $0,1,\ldots,\frac{N_1O_1}{2}-1$ | $0,1,\ldots,\frac{N_2O_2}{2}-1$ | $W^{(1)}_{2i_{1,1},2i_{1,2},0}$ | $W^{(1)}_{2i_{1,1},2i_{1,2},1}$ | $W^{(1)}_{2i_{1,1},2i_{1,2},2}$ | $W^{(1)}_{2i_{1,1},2i_{1,2},3}$ |

| | | $i_2$ | | | |
|---|---|---|---|---|---|
| $i_{1,1}$ | $i_{1,2}$ | 4 | 5 | 6 | 7 |
| $0,1,\ldots,\frac{N_1O_1}{2}-1$ | $0,1,\ldots,\frac{N_2O_2}{2}-1$ | $W^{(1)}_{2i_{1,1}+1,2i_{1,2},0}$ | $W^{(1)}_{2i_{1,1}+1,2i_{1,2},1}$ | $W^{(1)}_{2i_{1,1}+1,2i_{1,2},2}$ | $W^{(1)}_{2i_{1,1}+1,2i_{1,2},2}$ |

| | | $i_2$ | | | |
|---|---|---|---|---|---|
| $i_{1,1}$ | $i_{1,2}$ | 8 | 9 | 10 | 11 |
| $0,1,\ldots,\frac{N_1O_1}{2}-1$ | $0,1,\ldots,\frac{N_2O_2}{2}-1$ | $W^{(1)}_{2i_{1,1},2i_{1,2},+1,0}$ | $W^{(1)}_{2i_{1,1},2i_{1,2},+1,1}$ | $W^{(1)}_{2i_{1,1},2i_{1,2},+1,1}$ | $W^{(1)}_{2i_{1,1},2i_{1,2},+1,1}$ |

| | | $i_2$ | | | |
|---|---|---|---|---|---|
| $i_{1,1}$ | $i_{1,2}$ | 12 | 13 | 14 | 15 |
| $0,1,\ldots,\frac{N_1O_1}{2}-1$ | $0,1,\ldots,\frac{N_2O_2}{2}-1$ | $W^{(1)}_{2i_{1,1}+1,2i_{1,2}+}$ | $W^{(1)}_{2i_{1,1},+1,2i_{1,2}}$ | $W^{(1)}_{2i_{1,1},+1,2i_{1,2}}$ | $W^{(1)}_{2i_{1,1},+1,2i_{1,2}}$ | where $W^{(1)}_{l,m,n} = \frac{1}{\sqrt{P}} \begin{bmatrix} v_{l,m} \\ \varphi_n v_{l,m} \end{bmatrix}$

Value of Codebook-Config.3

| | | $i_2$ | | | |
|---|---|---|---|---|---|
| $i_{1,1}$ | $i_{1,2}$ | 0 | 1 | 2 | 3 |
| $0,1,\ldots,\frac{N_1O_1}{2}-1$ | $0,1,\ldots,\frac{N_2O_2}{2}-1$ | $W^{(1)}_{2x,2y,0}$ | $W^{(1)}_{2x,2y,1}$ | $W^{(1)}_{2x,2y,2}$ | $W^{(1)}_{2x,2y,3}$ |

| | | $i_2$ | | | |
|---|---|---|---|---|---|
| $i_{1,1}$ | $i_{1,2}$ | 4 | 5 | 6 | 7 |
| $0,1,\ldots,\frac{N_1O_1}{2}-1$ | $0,1,\ldots,\frac{N_2O_2}{2}-1$ | $W^{(1)}_{2x+2,2y,0}$ | $W^{(1)}_{2x+2,2y,1}$ | $W^{(1)}_{2x+2,2y,2}$ | $W^{(1)}_{2x+2,2y,3}$ |

| | | $i_2$ | | | |
|---|---|---|---|---|---|
| $i_{1,1}$ | $i_{1,2}$ | 8 | 9 | 10 | 11 |
| $0,1,\ldots,\frac{N_1O_1}{2}-1$ | $0,1,\ldots,\frac{N_2O_2}{2}-1$ | $W^{(1)}_{2x+1,2y+1,0}$ | $W^{(1)}_{2x+1,2y+1,1}$ | $W^{(1)}_{2x+1,2y+1,2}$ | $W^{(1)}_{2x+1,2y+1,3}$ |

TABLE 20-continued

Codebook for 1-layer CSI reporting antenna ports 15 to 14+P

| | | $i_2$ | | | |
|---|---|---|---|---|---|
| $i_{1,1}$ | $i_{1,2}$ | 12 | 13 | 14 | 15 |
| $0, 1, \ldots, \frac{N_1 O_1}{2} - 1$ | $0, 1, \ldots, \frac{N_2 O_2}{2} - 1$ | $W_{2x+3,2y+1,0}^{(1)}$ | $W_{2x+3,2y+1,1}^{(1)}$ | $W_{2x+3,2y+1,2}^{(1)}$ | $W_{2x+3,2y+1,3}^{(1)}$ | where $x = i_{1,1}, y = i_{1,2}, W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $x = i_{1,2}, y = i_{1,1}, W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ Value of Codebook-Config. 4

| $i_{1,1}$ | $i_{1,2}$ | 4 | 5 | 6 | 7 |
|---|---|---|---|---|---|
| $0, 1, \ldots, \frac{N_1 O_1}{2} - 1$ | $0, 1, \ldots, \frac{N_2 O_2}{2} - 1$ | $W_{2x+1,2y,0}^{(1)}$ | $W_{2x+1,2y,1}^{(1)}$ | $W_{2x+1,2y,2}^{(1)}$ | $W_{2x+1,2y,3}^{(1)}$ |

| | | $i_2$ | | | |
|---|---|---|---|---|---|
| $i_{1,1}$ | $i_{1,2}$ | 8 | 9 | 10 | 11 |
| $0, 1, \ldots, \frac{N_1 O_1}{2} - 1$ | $0, 1, \ldots, \frac{N_2 O_2}{2} - 1$ | $W_{2x+2,2y,0}^{(1)}$ | $W_{2x+2,2y,1}^{(1)}$ | $W_{2x+2,2y,2}^{(1)}$ | $W_{2x+2,2y,3}^{(1)}$ |

| | | $i_2$ | | | |
|---|---|---|---|---|---|
| $i_{1,1}$ | $i_{1,2}$ | 12 | 13 | 14 | 15 |
| $0, 1, \ldots, \frac{N_1 O_1}{2} - 1$ | $0, 1, \ldots, \frac{N_2 O_2}{2} - 1$ | $W_{2x+3,2y,0}^{(1)}$ | $W_{2x+3,2y,1}^{(1)}$ | $W_{2x+3,2y,2}^{(1)}$ | $W_{2x+3,2y,3}^{(1)}$ | where $x = i_{1,1}, y = i_{1,2}, W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $x = i_{1,2}, y = i_{1,1}, W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ An issue with the Class A CSI feedback scheme for the future generation of communication systems (LTE system and beyond, 5G), is the increase in CSI-RS overhead to support larger number of antenna ports. In particular, as the number of supported antenna ports increases beyond a certain number, i.e. 32, they can't be transmitted and measured in the same subframe. Hence, CSI-RS transmission and reception will require multiple subframes, which may not be desirable in practice.

Another issue with the Class A CSI feedback scheme is that the increase in overhead is unclear to bring justifiable performance benefits. In other words, to achieve certain performance, it may not be necessary to transmit CSI-RS from all $2N_1N_2$ ports in every CSI-RS transmission instance as is the case with Class A CSI feedback scheme. The same performance may perhaps be achieved by a so-called "hybrid CSI feedback scheme" in which there are two types of CSI-RS resources, the first CSI-RS resource is transmitted from all $2N_1N_2$ ports with a larger periodicity and the second CSI-RS resource is transmitted from fewer than $2N_1N_2$ ports, e.g. 2, with a smaller periodicity.

In some embodiments, a hybrid CSI feedback scheme is proposed in which the first (NP) CSI-RS resource is configured to obtain the long-term and WB channel directions or PMIs for both dimensions (azimuth and elevation).

In some embodiments, the second (BF) CSI-RS resource is beam-formed using these channel directions before being transmitted to the UE, which uses them to derive short-term and SB PMI together with CQI and RI.

Figure 18:
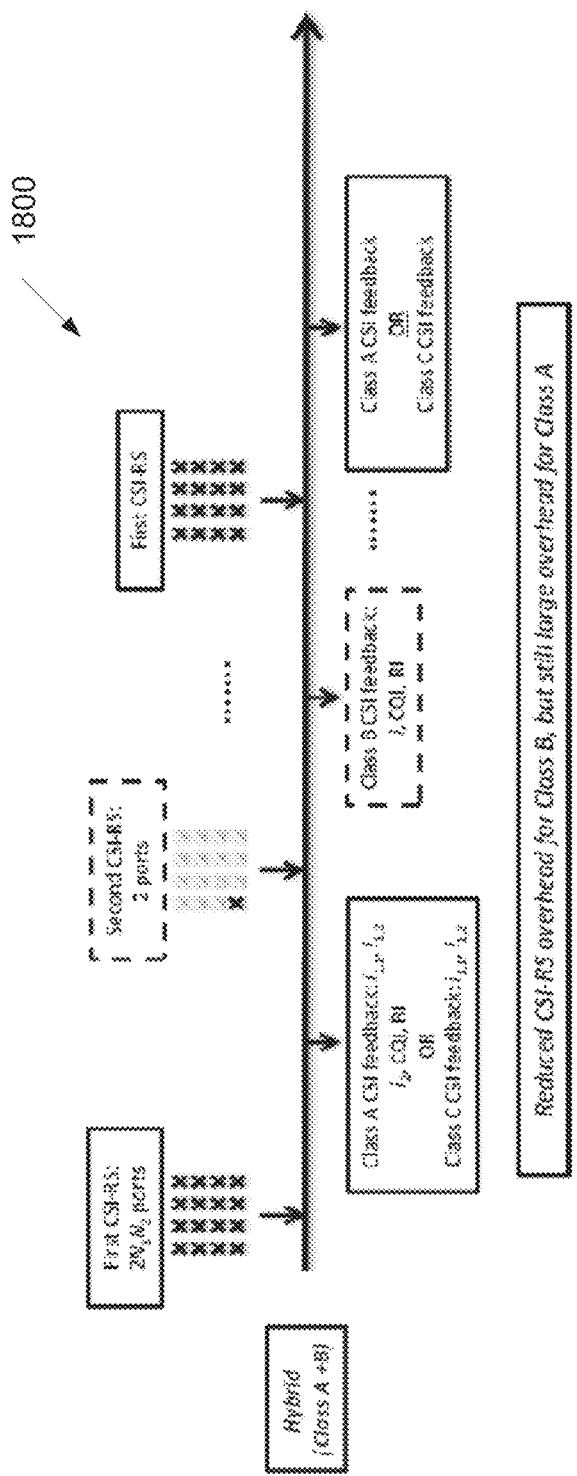
FIG. 18 illustrates an example full port hybrid CSI feedback scheme (Alt 0) according to embodiments of the present disclosure.

FIG. 18 illustrates an example full port hybrid CSI feedback scheme (Alt 0) 1800 according to embodiments of the present disclosure. An embodiment of the full port hybrid CSI feedback scheme (Alt 0) 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure. An illustration of Alt 0 of the hybrid CSI feedback scheme is shown in FIG. 18.

As shown in FIG. 18, the first CSI-RS corresponds to "Class A CSI reporting or eMIMO-Type" in which NP CSI-RS is transmitted from all $2N_1N_2$ ports (full-port), and the UE derives the CSI feedback comprising: the first PMI pair ($i_{1,1}$, $i_{1,2}$) comprising of the second PMI $i_2$, (and CQI and RI) or the first PMI pair ($i_{1,1}$, $i_{1,2}$) according to the configured codebook such as Table 3; and the second CSI-RS corresponds to "Class B CSI reporting or eMIMO-Type" in which BF CSI-RS is transmitted from 2 ports which are beam-formed using the beams associated with the first PMI of Class A CSI feedback, and the UE derives the single PMI i using Table 1 (or second PMI $i_2$ using Table 3). Additionally, UE also derives CQI and RI.

Although the overhead of the BF or Class B CSI-RS transmission is small, that of the NP or Class A CSI-RS is still the same as before, i.e., $2N_1N_2$. To reduce overhead associated with the first (NP) CSI-RS, the partial port NP CSI-RS is proposed in which CSI-RS is transmitted from a subset of $2N_1N_2$ ports. In particular, the subset corresponds to one row and one column of two-dimensional antenna port layout. Two alternatives (Alt 1 and Alt 2) of partial port NP CSI-RS are explained below.

Figure 19:
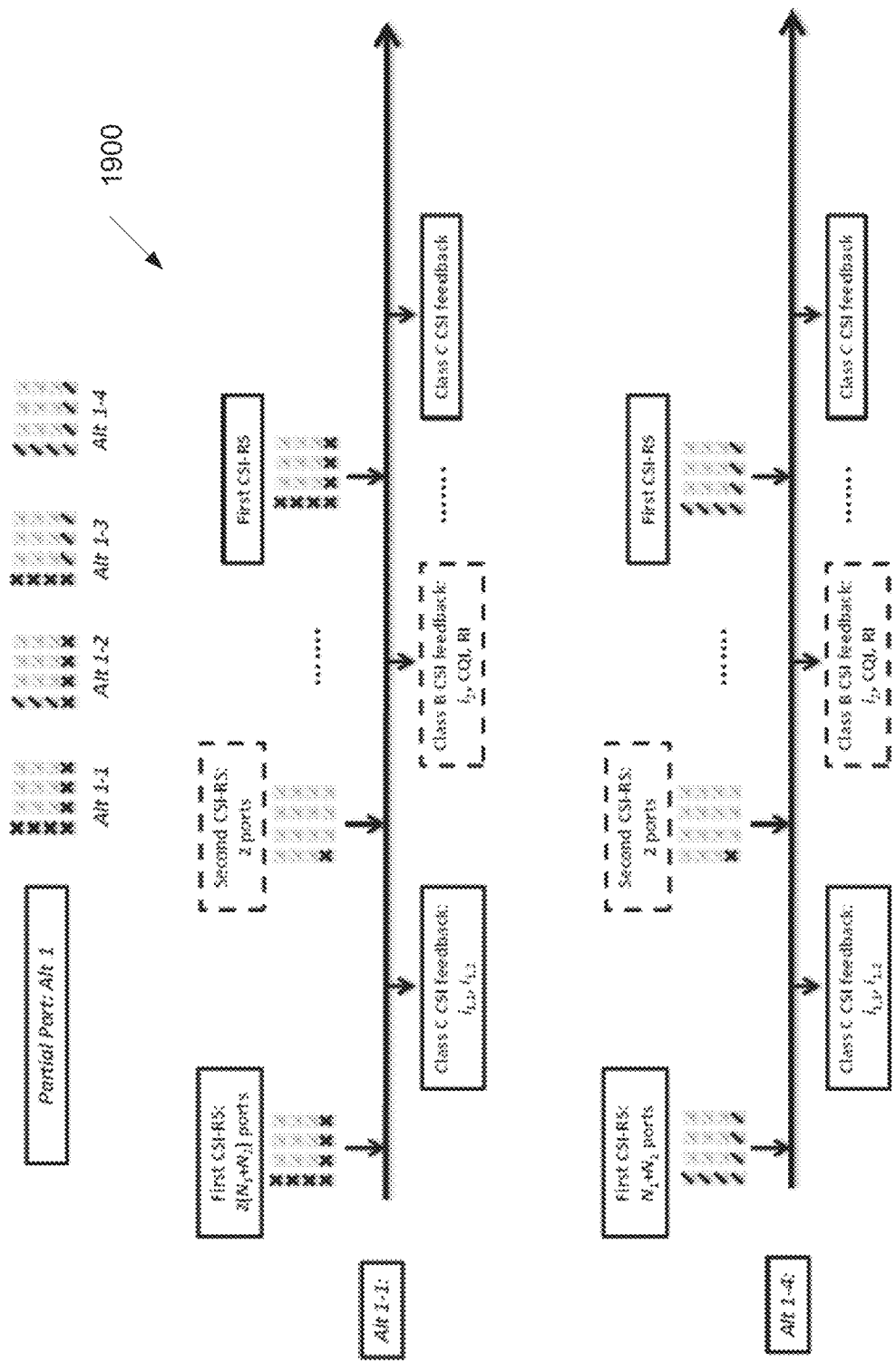
FIG. 19 illustrates an example partial port hybrid CSI feedback scheme (Alt 1) according to embodiments of the present disclosure.

FIG. 19 illustrates an example partial port hybrid CSI feedback scheme (Alt 1) 1900 according to embodiments of the present disclosure. An embodiment of the partial port hybrid CSI feedback scheme (Alt 1) 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure. An illustration of Alt 1 of the proposed "partial port hybrid CSI feedback scheme" is shown in FIG. 19.

In some embodiments, the first CSI-RS corresponds to "Class C CSI reporting or eMIMO-Type" in which NP CSI-RS is transmitted from a subset of one row of antenna ports, and a subset of one column of antenna ports. Four alternatives of such CSI-RS are also shown: Alt 1-1 requires $2(N_1+N_2)$ CSI-RS, which are associated with all antenna ports in one row (both polarizations) and all antenna ports in one column (both polarizations); Alt 1-2 requires $2N_1+N_2$ CSI-RS, which are associated with all antenna ports in one row (both polarizations, and all antenna ports in one column with the same polarization, for example +45 degree; Alt 1-3 requires $N_1+2N_2$ CSI-RS, which are associated with all antenna ports in one row with the same polarization, for example +45 degree and all antenna ports in one column (both polarizations); and Alt 1-4 requires $N_1+N_2$ CSI-RS, which are associated with all antenna ports in one row with the same polarization, for example +45 degree and all antenna ports in one column with the same polarization, for example +45 degree. In such embodiments, the UE is configured to derive $i_{1,1}$ of the first PMI pair $(i_{1,1}, i_{1,2})$ using the CSI-RS corresponding to the row and $i_{1,2}$ of the first PMI pair $(i_{1,1}, i_{1,2})$ using the CSI-RS corresponding to the column. The UE may be configured with an appropriate DFT codebook to derive $(i_{1,1}, i_{1,2})$. In this alternative, the UE reports $i_{1,1}$ and $i_{1,2}$ jointly in the same reporting instance.

In some embodiments, the second CSI-RS corresponds to BF CSI-RS in which CSI-RS is transmitted from 2 ports which are beam-formed using the beams associated with the first PMI, and the UE derives the single PMI i using Table 18 (or second PMI $i_2$ using Table 20). Additionally, UE also derives CQI and RI. Two examples of this alternative (Alt 1-1 and Alt 1-4) are also shown in FIG. 19.

Figure 20:
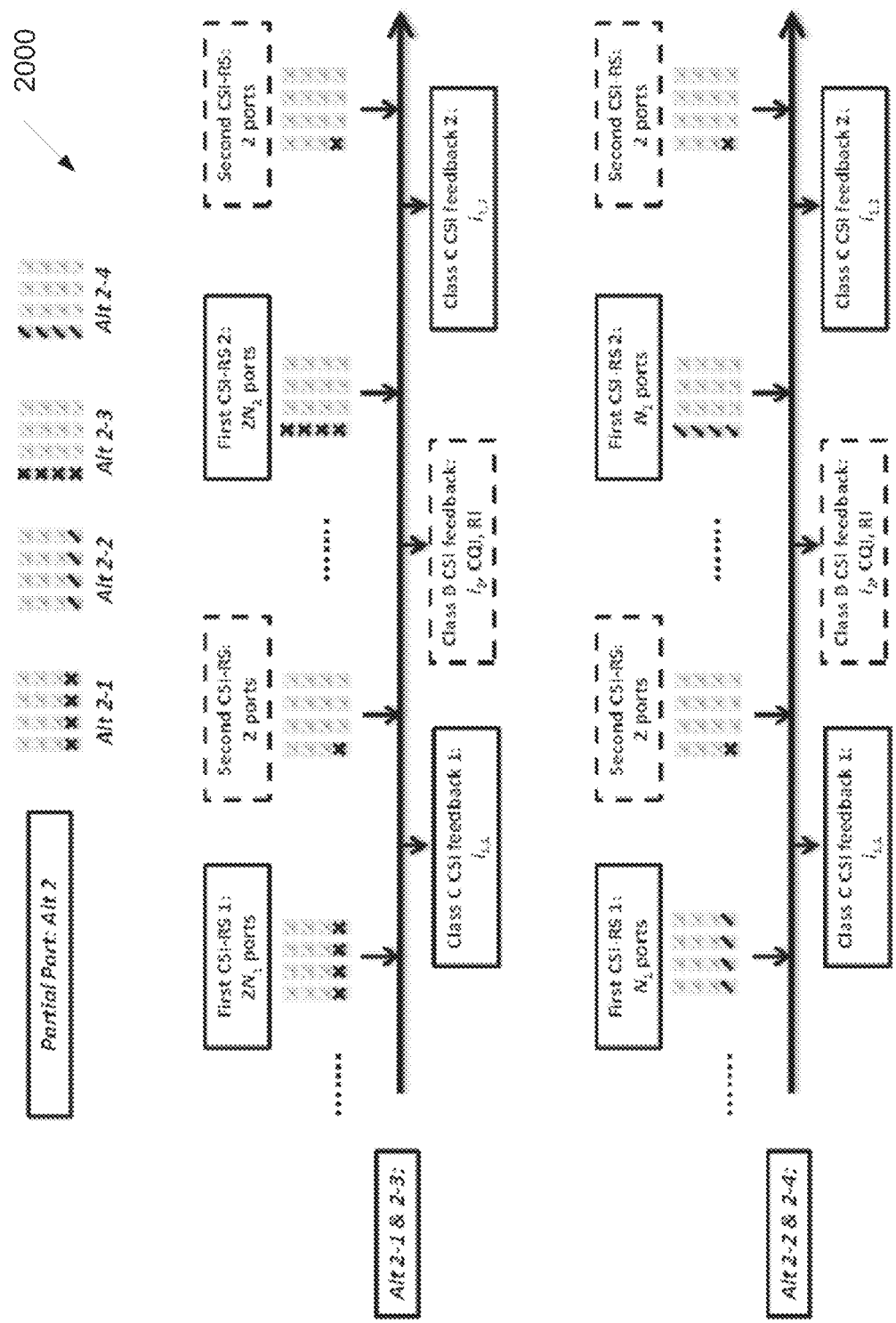
FIG. 20 illustrates another example partial port hybrid CSI feedback scheme (Alt 2) according to embodiments of the present disclosure.

FIG. 20 illustrates another example partial port hybrid CSI feedback scheme (Alt 2) 2000 according to embodiments of the present disclosure. An embodiment of the partial port hybrid CSI feedback scheme (Alt 2) 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

An illustration of Alt 2 of the proposed "partial port hybrid CSI feedback scheme" is shown in FIG. 20. In some embodiments, the first CSI-RS corresponds to "Class C CSI reporting or eMIMO-Type" in which NP CSI-RS is transmitted from a subset of one row of antenna ports. In some embodiments, the second CSI-RS corresponds to "Class C CSI reporting or eMIMO-Type" in which NP CSI-RS is transmitted from a subset of one column of antenna ports. In such embodiments, four alternatives of such CSI-RS are also shown: Alt 2-1 requires $2N_1$ CSI-RS which are associated with all antenna ports in one row (both polarizations); Alt 2-2 requires $N_1$ CSI-RS, which are associated with all antenna ports in one row with the same polarization, for example +45 degree; Alt 2-3 requires $2N_2$ CSI-RS, which are associated with all antenna ports in one column (both polarizations); and Alt 2-4 requires $N_2$ CSI-RS, which are associated with all antenna ports in one column with the same polarization, for example +45 degree.

In such embodiments, the UE is configured to derive $i_{1,1}$ of the first PMI pair $(i_{1,1}, i_{1,2})$ using the CSI-RS corresponding to the row and $i_{1,2}$ of the first PMI pair $(i_{1,1}, i_{1,2})$ using the CSI-RS corresponding to the column. The UE may be configured with an appropriate DFT codebook to derive $(i_{1,1}, i_{1,2})$. In this alternative, the UE reports $i_{1,1}$ and $i_{1,2}$ jointly in the same reporting instance or separately in two different reporting instances.

In some embodiments, the third CSI-RS corresponds to BF CSI-RS in which CSI-RS is transmitted from 2 ports which are beam-formed using the beams associated with the first PMI, and the UE derives the second PMI $i_2$ using Table 3. Additionally, UE also derives CQI and RI. Two examples of this alternative (Alt 2-1 & Alt 2-3 and Alt 2-2 & Alt 2-4) are also shown in FIG. 20.

Analyzing the first (NP) CSI-RS of the three alternatives, i.e., Alt 0, Alt 1, and Alt 2, we can observe: Alt 0 corresponds to a "2D full array" CSI-RS transmission since CSI-RS is transmitted from all $2N_1N_2$ ports, and $(i_{1,1}, i_{1,2})$ are derived jointly; Alt 1 and Alt 2 correspond to a "1D partial array" CSI-RS transmission since CSI-RS is transmitted from a row and a column (with both polarizations or +45 degree polarization) of antenna ports, and $i_{1,1}$ and $i_{1,2}$ are derived separately; and For 1D antenna port layouts, Alt 0 is the same as Alt 1 or Alt 2 in which both polarizations are configured for CSI-RS transmission. This also means that there is no CSI-RS overhead reduction in this case.

In some embodiments, the UE is configured with a "hybrid PMI codebook," denoted as $C_H$, which can be decomposed as a product of two PMI codebooks, $C_{NP}$ (associated with NP CSI-RS and Class C or A eMIMO-Type) and $C_{BF}$ (associated with BF CSI-RS and Class B or A eMIMO-Type with K=1) depending on the eMIMO-Type configuration (see Table 21).

There are at least two alternatives to represent the hybrid PMI pre-coder. In one embodiment of Alt 1, a hybrid PMI pre-coders p in $C_H$ is represented as a product of: a first PMI pre-coder is $P_{BD}$, which is a block diagonal matrix whose each diagonal block is $p_{NP}$ in $C_{NP}$ and a second PMI pre-coder is $p_{BF}$ in $C_{BF}$. That is, $p=P_{BD} \cdot p_{BF}$. In one embodiment of Alt 2, a hybrid PMI pre-coders p in $C_H$ is represented as a Kronecker product of $p_{BF}$ in $C_{BF}$ and $p_{NP}$ in $C_{NP}$, i.e. $p=p_{BF} \otimes p_{NP}$ In one embodiment of sub-alternatives of Alt 1, the diagonal blocks of the PMI pre-coder $P_{BD}$ are the same (Alt 1-1). In one embodiments=of sub-alternatives of Alt 1, the diagonal blocks of the PMI pre-coder $P_{BD}$ can be different. In such embodiment, note that the hybrid PMI pre-coders in Alt 1-1 and in Alt 2 result in the same hybrid pre-coder.

Figure 21:
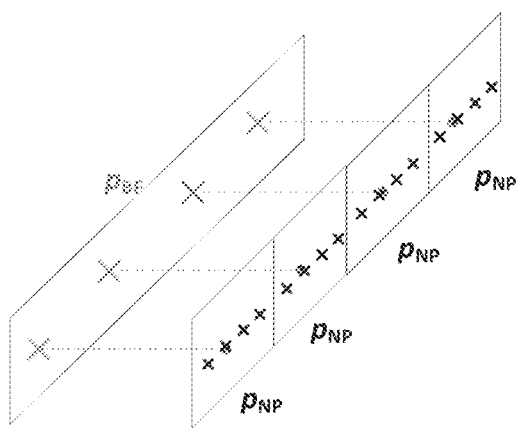
FIG. 21 illustrates an example hybrid PMI pre-coder (Alt 1-1 and Alt 2) according to embodiments of the present disclosure.
Figure 21:
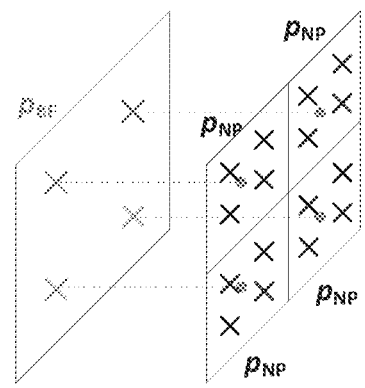

FIG. 21 illustrates an example hybrid PMI pre-coder (Alt 1-1 and Alt 2) 2100 according to embodiments of the present disclosure. An embodiment of the hybrid PMI pre-coder (Alt 1-1 and Alt 2) 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

An illustration of the hybrid PMI pre-coder is shown in FIG. 21. For 1D antenna ports, pre-coders $p_{NP}$ and $p_{BF}$ are vectors (hence 1D), and for 2D antenna ports, they are either vectors (1D) or matrices (2D). As shown, there are four identical "subarray" partitions of the entire antenna array, the same first PMI pre-coder $p_{NP}$ is applied to both polarizations of the antenna ports within each subarray, which results in 2 beam-formed ports in each subarray. The same second PMI pre-coder $p_{BF}$ is then applied to the two polarizations of the four subarrays.

In some embodiments, the configured codebooks $C_{NP}$ and $C_{BF}$ correspond to dual-polarized codebooks, i.e., the co-phase between two polarizations is included in $C_{NP}$ and $C_{BF}$. In one example, the pre-coders $p_{NP}$ and $p_{BF}$ are expressed as:

$$p_{NP} = \begin{bmatrix} p'_{NP} \\ \phi_{NP} p'_{NP} \end{bmatrix} \in C_{NP} \text{ and } p_{BF} = \begin{bmatrix} p'_{BF} \\ \phi_{BF} p'_{BF} \end{bmatrix} \in C_{BF},$$

where $p_{NP}'$ and $p_{BF}'$ are DFT vectors of appropriate dimensions, and $\phi_{NP}$ and $\phi_{BF}$ are corresponding co-phase values.

In this case, the partial port NP first CSI-RS is transmitted from antenna ports in the subarray with both polarizations, and BF second CSI-RS is transmitted from the two beam-formed ports corresponding to the two polarizations.

The pre-coders $p_{NP}'$, and $p_{BF}'$ are reported as two PMI pre-coders in Class C (or A) and Class B (or A) CSI reporting instances, respectively.

The two co-phase values are chosen from the respective co-phase codebooks, $C_{Co\text{-}ph,NP}$, and $C_{Co\text{-}ph,BF}$, respectively. In one example, $C_{Co\text{-}ph,NP} = C_{Co\text{-}ph,BF} = \{1, j, -1, -j\}$. So, 2-bits are needed to report $\phi_{NP}$ and $\phi_{BF}$ in Class C (or A) and Class B (or A) CSI reporting instances, respectively. In another example, $C_{Co\text{-}ph,NP} = \{e^{j\pi/4}, e^{j3\pi/4}, e^{j5\pi/4}, e^{j7\pi/4}\}$ and $C_{Co\text{-}ph,BF} = \{e^{-j\pi/4}, e^{j\pi/4}\}$. Note that in this case, for any $\phi_{NP}$ in $C_{Co\text{-}ph,NP}$ and $\phi_{BF}$ in $C_{Co\text{-}ph,BF}$, we have $\phi_{NP}\phi_{BF} \in \{1, j, -1, -j\}$. So, 2-bits and 1-bit respectively are needed to report $\phi_{NP}$ and $\phi_{BF}$ in Class C (or A) and Class B (or A) CSI reporting instances.

The UE may or may not be configured to report the co-phase $\phi_{NP}$. In some embodiments, if the UE reports $\phi_{NP}$, then eNB applies beam-forming weights $$p_{NP} = \begin{bmatrix} p'_{NP} \\ \phi_{NP} p'_{NP} \end{bmatrix}$$

to antenna ports in each subarray (i.e., $p_{NP}$ to +45 polarization and $\phi_{NP} p_{NP}'$ to −45 polarization) and obtains two ports. The hybrid pre-coder is then represented as $$p = \begin{bmatrix} p'_{BF} \otimes p'_{NP} \\ \phi_{BF} \phi_{NP} p'_{BF} \otimes p'_{NP} \end{bmatrix} \in C_H.$$

In some embodiments, if the UE does not report $\phi_{NP}$, then eNB applies beam-forming weights $$p_{NP} = \begin{bmatrix} p'_{NP} \\ p'_{NP} \end{bmatrix}$$

to antenna ports in each subarray (i.e., $p_{NP}'$ to both +45 and −45 polarization) and obtains two ports. The hybrid pre-coder is then represented as $$p = \begin{bmatrix} p'_{BF} \otimes p'_{NP} \\ \phi_{BF} p'_{BF} \otimes p'_{NP} \end{bmatrix} \in C_H.$$

In some embodiments, the configured $C_{NP}$ corresponds to a co-polarized codebook (such as a DFT codebook), and $C_{BF}$ corresponds to dual-polarized codebooks. That is, the co-phase between two polarizations is included in $C_{BF}$, but not in $C_{NP}$. In this case, eNB applies beam-forming weights $$p_{NP} = \begin{bmatrix} p'_{NP} \\ p'_{NP} \end{bmatrix}$$

to antenna ports in each subarray (i.e., $p_{NP}'$ to both +45 and −45 polarization) and obtains two ports, and hence the hybrid pre-coder is represented as $$p = \begin{bmatrix} p'_{BF} \otimes p'_{NP} \\ \phi_{BF} p'_{BF} \otimes p'_{NP} \end{bmatrix} \in C_H.$$

In one example, partial port NP CSI-RS is transmitted from antenna ports in the subarray with one polarization only, for example +45 degree. In another method, it is transmitted from antenna ports in the subarray with both polarizations. When CSI-RS is transmitted from both polarizations, the UE may optimize over the co-phase or use a default co-phase while deriving $p_{NP}$.

In some embodiments, the configured $C_{NP}$ corresponds to a dual-polarized codebook, and $C_{BF}$ corresponds to co-polarized codebooks (such as a DFT codebook). In this case, the co-phase $\phi_{NP}$ is reported in Class C (or A) CSI reporting instance according to some embodiments of the present disclosure, and no co-phase is reported in Class B (or A) CSI reporting instance. The hybrid pre-coder is then represented as $$p = p_{BP} \otimes \begin{bmatrix} p'_{NP} \\ \phi_{NP} p'_{NP} \end{bmatrix} \in C_H.$$

The eNB applies beam-forming weights $$p_{NP} = \begin{bmatrix} p'_{NP} \\ \phi_{NP} p'_{NP} \end{bmatrix}$$

to antenna ports in each subarray (i.e., $p_{NP}'$ to +45 polarization and $\phi_{NP} p_{NP}'$ to −45 polarization) and in Option 1 obtains a single port and in Option 2 obtains two ports. Note that the dimension of the $p_{BF}$ vector is doubled in Option 2 when compared with Option 1.

In some embodiments, the UE is configured with the codebook $C_{NP}$, which is an oversampled DFT codebook of appropriate dimension and oversampling factor. For instance, the codebook $C_{NP}$ corresponds to the Codebook-Config=1 in Table 20.

In some embodiments, $C_{NP}$ and $C_{BF}$ are configured to a UE implicitly as one codebook $C_H$. In some embodiments, $C_{NP}$ and $C_{BF}$ are configured to a UE explicitly as two codebooks. In some embodiments, $C_{NP}$ and $C_{BF}$ are legacy (up to LTE specification) PMI codebooks. In another alternative, one or both of them is non-legacy (up to LTE specification) codebooks.

In some embodiments, one or both of $C_{NP}$ and $C_{BF}$ are double codebooks similar to Rel 13 FD-MIMO codebooks: $C_{NP}=C_{NP1}C_{NP2}$ and $C_{BF}=C_{BF1}C_{BF2}$, where $C_{NP1}$ and $C_{BF1}$ are WB and long-term first PMI codebooks, which may represent a beam (similar to Codebook-Config=1 in Rel 13 FD-MIMO codebooks) or a group of beams (similar to Codebook-Config=2, 3, 4 in LTE FD-MIMO codebooks); and $C_{NP2}$ and $C_{BF2}$: SB and short-term second PMI codebooks, which may represent beam selection and co-phase.

It may be assumed that eMIMO-Type (CSI reporting type) is Class C for first NP CSI-RS resource, and it is Class B for second BF CSI-RS resource, unless otherwise stated. For brevity of notation, we will use the subscripts "C" and "B" in place of "NP" and "BF" in codebook, pre-coder and co-phase notations, i.e., we will use $C_C$ and $C_B$ in place of $C_{NP}$ and $C_{BF}$, $p_C$ and $p_B$ in place of $p_{NP}$ and $p_{BF}$, and $\phi_C$ and $\phi_B$ in place of $\phi_{NP}$ and $\phi_{BF}$. In general, the below embodiments are applicable to the case in which eMIMO-Type is Class C or A for first NP CSI-RS resource, and eMIMO-Type is Class B or A for second BF CSI-RS resource.

In some embodiments, the UE is configured with a "subarray based hybrid CSI feedback scheme" in which the entire antenna array is partitioned into identical subarrays of antenna ports, where a subarray is defined as a subset of antenna ports that are uniformly spaced. In such embodiment, the antenna ports in a subarray are closely spaced. For example, the spacing between two nearest antenna ports in a subarray is equal to one. In such embodiment, they are widely spaced, for example the spacing between two nearest antenna ports in a subarray is more than one. In such embodiments, the UE is configured with a "subarray based hybrid CSI feedback scheme" in which the number of ports in the 1st dimension, denoted as $M_1$, of a subarray is at least one and at most $N_1$, and the number of ports in the 2nd dimension, denoted as $M_2$, is at least one and at most $N_2$. In such embodiments, the UE is configured with a "subarray based hybrid CSI feedback scheme" in which a subarray is 1D for 1D antenna port layouts and is 1D or 2D for 2D antenna port layouts.

In some embodiments, the UE is configured with a "subarray based hybrid CSI feedback scheme" in which there are two types of CSI-RS that are configured to a UE by the eNB. In such embodiments, the first (NP) CSI-RS corresponds to a subarray based "Class C eMIMO-Type" in which CSI-RS is transmitted from one subarray of antenna ports, and the second (BF) CSI-RS corresponds to "Class B eMIMO-Type" in which CSI-RS is transmitted from 2 ports in each subarray which are beam-formed using the beam-forming weights obtained using the NP CSI-RS.

In some embodiments, the UE is configured with a "subarray based hybrid CSI feedback scheme" in which the UE derives the Class C CSI report which includes a first PMI it for 1D and $(i_{1,1}, i_{1,2})$ for 2D using the Class C CSI-RS from one subarray, where the first PMI represents the PMI pre-coder $p_C$ in Class C codebook $C_C$, and the Class B CSI report which includes a second PMI $i_2$ corresponding to the PMI pre-coder $p_B$ in the Class B codebook $C_B$.

In some embodiments, the UE also reports CQI and RI. In one example, the UE reports CQI and RI in the Class B CSI reporting instance only. In another example, it reports CQI and RI in both Class C and Class B CSI reporting instances, where RI reported in Class C CSI report may be used to configure a maximum value of RI reported in Class B CSI report. In yet another method, it reports CQI in Class C and CQI and RI in Class B reporting instances, respectively.

In some embodiments, the UE reports the two PMIs, a first PMI and a second PMI, in one or both of Class C and Class B reporting instances, where the first PMI is WB and long-term and the second PMI is SB and short-term. For example, the UE may be configured to report the second PMI in addition to the first PMI in Class C CSI reporting instance using the PMI codebook $C_C$. The second PMI may correspond to the co-phase value for the two polarizations. The indicated co-phase value is used together with the first PMI pre-coder $p_C$ to beam-form Class B CSI-RS transmitted from multiple subarrays. Similarly, the UE may be configured to report the first PMI in addition to the second PMI in Class B CSI reporting instance using the PMI codebook $C_B$. The first PMI may correspond to the WB beam or beam group.

An example of eMIMO-Type or PMI reporting type configuration is shown in Table 21, where subscripts C and B are used to distinguish Class C and Class B reporting PMIs, respectively, and $(i_{1C,1}, i_{1C,2})$, and $(i_{1B,1}, i_{1B,2})$ correspond to a pair of 1st PMI for the two dimensions in case of 2D antenna ports, for Class C and Class B CSI reporting, respectively.

TABLE 21 eMIMO-Type or PMI reporting type configuration table

| | CSI derived with the first (NP) CSI-RS resource | | | CSI derived with the second (BF) CSI-RS resource | | |
|---|---|---|---|---|---|---|
| Configuration | CSI reporting class or eMIMO-Type | 1st PMI | 2nd PMI | CSI reporting class or eMIMO-Type | 1st PMI | 2nd PMI |
| 0 | C | $i_{1C}$ or $(i_{1C,1}, i_{1C,2})$ | — | B | — | $i_{2B}$ |
| 1 | A | $i_{1A}$ or $(i_{1A,1}, i_{1A,2})$ | $i_{2A}$ | B | — | $i_{2B}$ |
| 2 | C | $i_{1C}$ or $(i_{1C,1}, i_{1C,2})$ | — | A | $i_{1A}$ or $(i_{1A,1}, i_{1A,2})$ | $i_{2A}$ |
| 3 | A | $i_{1A}$ or $(i_{1A,1}, i_{1A,2})$ | $i_{2A}$ | A | $i_{1A}$ or $(i_{1A,1}, i_{1A,2})$ | $i_{2A}$ |

In some embodiments, the UE is configured whether or not the co-phase $\phi_C$ is reported in the Class C CSI reporting instance. In some embodiments, if the UE is configured to report the co-phase $\phi_C$, it is reported with the first PMI, $i_{1C}$ (for 1D) or $i_{1C,1}$ or $i_{1C,2}$, or $(i_{1C,1}, i_{1C,2})$ (for 2D). In this case, the first PMI corresponds to $p_C'$ and $\phi_C$. In one example, the reported $\phi_C$ is WB. In some embodiments, if the UE is configured to report the co-phase $\phi_C$, it is reported as a second PMI, $i_{2C}$, in Class C CSI reporting instance. In this case, the first PMI corresponds to $p_C'$ and the second PMI corresponds to $\phi_C$. Here, the reported $\phi_C$ is either WB or SB.

Figure 22:
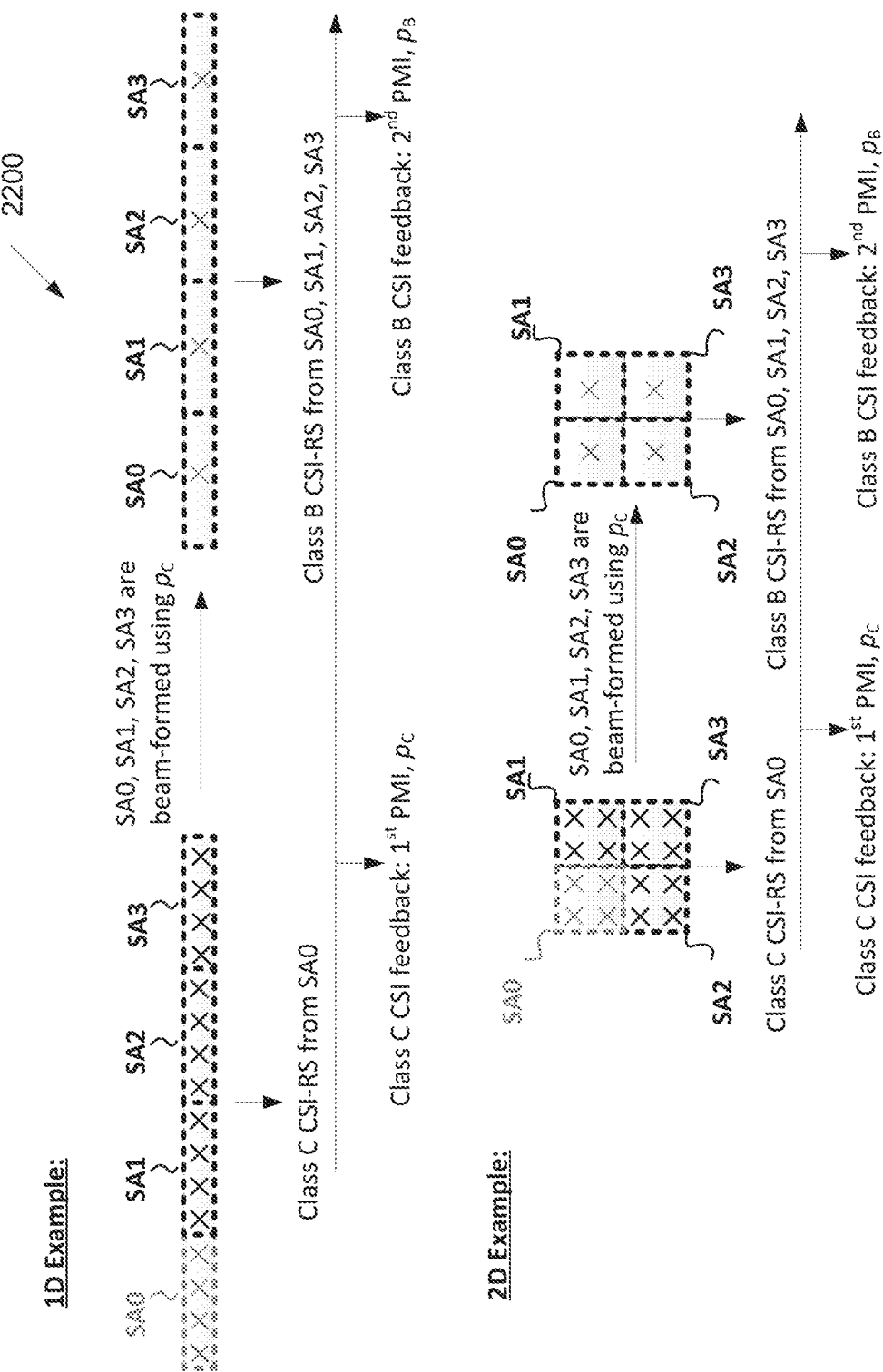
FIG. 22 illustrates an example subarray based hybrid CSI feedback scheme according to embodiments of the present disclosure.

FIG. 22 illustrates an example subarray based hybrid CSI feedback scheme 2200 according to embodiments of the present disclosure. An embodiment of the subarray based hybrid CSI feedback scheme 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

An illustration of the proposed subarray based hybrid CSI feedback scheme is shown in FIG. 22. The entire antenna array is partitioned into four subarrays, SA0, SA1, SA2,and SA3, each of which has a dimension of $(M_1, M_2)=(4,1)$ in 1D example and (2,2) in 2D example. As shown (in red), the eNB transmits Class C CSI-RS from the subarray SA0. The UE derives the Class C CSI feedback including the 1st PMI pre-coder $p_C$, and reports it to the eNB. eNB uses the 1st PMI pre-coder $p_C$ to beam-form both polarizations of the four subarrays and transmits 2-port Class B CSI-RS from each subarray or an aggregate of 8-port Class B CSI-RS from entire antenna array. The UE then derives the Class B CSI feedback including the 2nd PMI pre-coder $p_B$ and feeds it back to eNB. The eNB derives the hybrid PMI pre-coder p using both $p_B$ and $p_C$, for example, $p=p_B \otimes p_C$.

Figure 23:
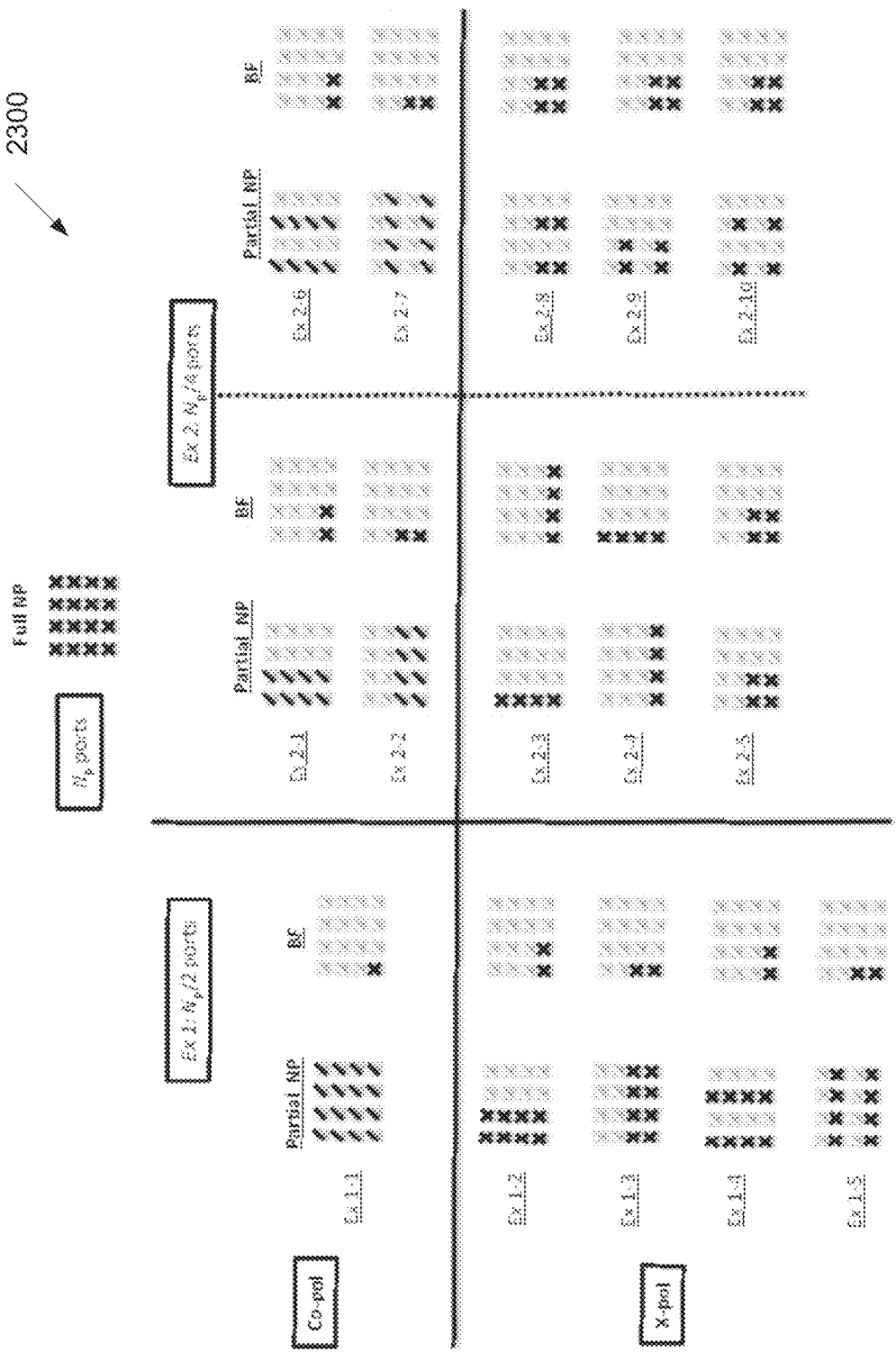
FIG. 23 illustrates an example subarray types according to embodiments of the present disclosure.

FIG. 23 illustrates an example subarray types 2300 according to embodiments of the present disclosure. An embodiment of the subarray types 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

Examples of several subarray partitions are shown in FIG. 23. As shown at the top of the figure, there are $N_p=2N_1N_2$ antenna ports in total and several types of subarray constructions are shown. For instance, in Ex 1 (left column), $N_p/2$ antenna ports form a subarray, and in Ex 2 (right column), $N_p/4$ antenna ports form a subarray. In Co-pol (top row), the Class C (or partial NP) antenna ports that form a subarray have +45 degree polarization, and in X-pol (bottom row), the Class C (or partial NP) antenna ports that form a subarray have both polarizations. Ex 1-1 to Ex 1-3 and Ex 2-1-Ex 2-5 correspond to the subarrays in which the spacing between two nearest ports in the subarray is 1, and Ex 1-4 to Ex 1-5 and Ex 2-6 to Ex 2-10 correspond to the subarrays in which the spacing between two nearest ports in the subarray is 2 (more than 1).

Depending on the Class C PMI pre-coder $p_C$, the Class B PMI pre-coder may have the following components: co-phase for the two polarizations (the x-pol co-phase is an essential component of the Class B PMI pre-coder); and pre-coder component in dimension d (If $M_d<N_d$, then the pre-coder component in dimension d is a vector of length $$\left\lceil \frac{N_d}{M_d} \right\rceil).$$

Table 24 shows the components of Class B PMI pre-coder for the examples as shown in FIG. 23.

TABLE 24

Class B PMI pre-coder components

| | Class B pre-coder ($p_B$) components | | |
|---|---|---|---|
| Ex | Co-phase | Pre-coder in 1st dim | Pre-coder in 2nd dim |
| 1.1 | Yes | No | No |
| 1.2, 1.4, 2.1, 2.3, 2.6 | Yes | Yes | No |
| 1.3, 1.5, 2.2, 2.4, 2.7 | Yes | No | Yes |
| 2.5, 2.8, 2.9, 2.10 | Yes | Yes | Yes |

In some embodiments, a UE is configured with one CSI process with two types of NZP CSI-RS resources: 1st CSI-RS resource is either NP CSI-RS or BF CSI-RS with $K_1>1$ resource; and 2nd CSI-RS resource is either BF CSI-RS with $K_2=1$ resource or BF CSI-RS with $K_2=1$ resources. The two NZP CSI-RS resources are associated with two eMIMO-Types according to the configuration where supported eMIMO-Type combinations are according to Table 25.

TABLE 25

Supported eMIMO-Type combinations for hybrid CSI reporting

| | CSI derived with the first (NP) CSI-RS resource | | CSI derived with the second (BF) CSI-RS resource | |
|---|---|---|---|---|
| Configuration | eMIMO-Type | CSI reporting content | eMIMO-Type | CSI reporting content |
| 0 | Class A | $i_1$ or $(i_{1,1}, i_{1,2})$, RI | Class B $K_2 = 1$ | RI, CQI, PMI $i_2$ |
| 1 | Class A | $i_1$ or $(i_{1,1}, i_{1,2})$, RI | Class B $K_2 = 1$ | CQI, PMI $i_2$ |
| 2 | Class A | $i_1$ or $(i_{1,1}, i_{1,2})$ | Class B $K_2 = 1$ | RI, CQI, PMI $i_2$ |
| 3 | Class B $K_1 > 1$ | CRI | Class B $K_2 = 1$ | RI, CQI, PMI $i_2$ |
| 4 | Class B $K_1 > 1$ | $K_1$ independent CSI reports each includes at least a PMI | Class B $K_2 = 1$ | RI, CQI, PMI $i_2$ |
| 5 | Class A | $i_1$ or $(i_{1,1}, i_{1,2})$, RI | Class B $K_2 > 1$ | CRI, and {RI, CQI, PMI $i_2$} conditioned on CRI |

Figure 24:
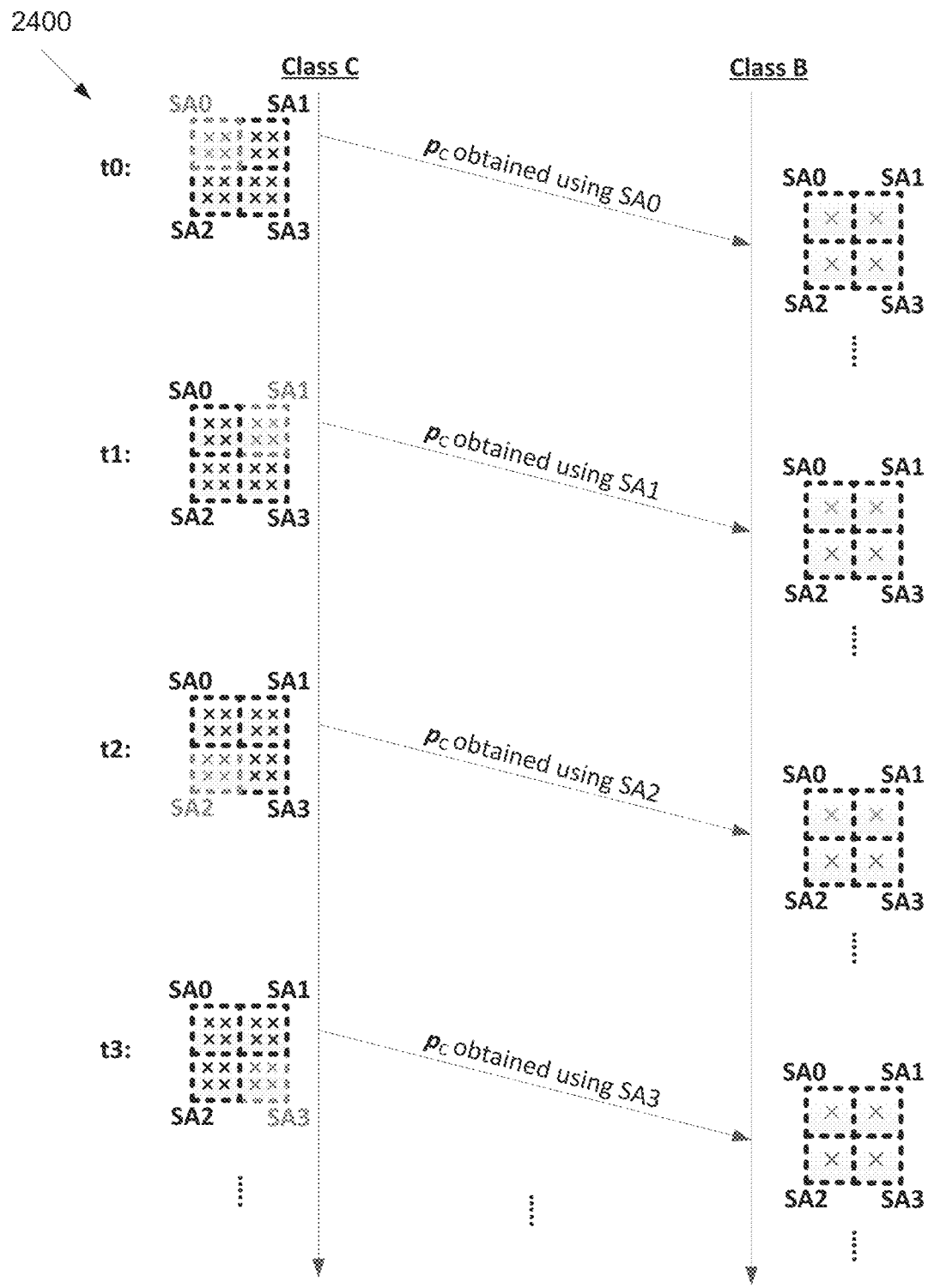
FIG. 24 illustrates an example subarray cycling at an eNB according to embodiments of the present disclosure.

FIG. 24 illustrates an example subarray cycling at an eNB 2400 according to embodiments of the present disclosure. An embodiment of the subarray cycling at an eNB 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

In some embodiments, eNB cycles through all subarrays to transmit Class C CSI-RS. An example of subarray cycling is shown in FIG. 24. At t0, eNB transmits Class C CSI-RS using subarray SA0 and UE feeds back the pre-coder $p_C$, and eNB uses it to beam-form Class C CSI-RS. At t1, eNB transmits Class C CSI-RS using subarray SA1 and UE feeds back $p_C$, and the same is repeated for subarrays SA2 and SA3. After that, the subarray cycling process continues in the sequence SA0, SA1, SA2, and SA3.

In one embodiment, the reported pre-coder $p_C$ is used to beam-form Class B CSI-RS transmitted through all subarrays. In this method, the pre-coder $p_C$ is the same for all subarrays, hence the hybrid pre-coder has the structure:

$$p = \begin{bmatrix} p_C & 0 & \cdots & 0 \\ 0 & p_C & \cdots & 0 \\ \vdots & \vdots & \ddots & \vdots \\ 0 & 0 & \cdots & p_C \end{bmatrix} p_B.$$

In one embodiment, the reported pre-coder $p_C$ is used to beam-form Class B CSI-RS transmitted through the corresponding subarray. The Class B CSI-RS transmitted through the rest of the subarrays are beam-formed using their respective pre-coders $p_C$ that are most recently reported. In this method, the pre-coder $p_C$ may be different for all subarrays, hence the hybrid pre-coder has the structure:

$$p = \begin{bmatrix} p_{C,0} & 0 & \cdots & 0 \\ 0 & p_{C,1} & \cdots & 0 \\ \vdots & \vdots & \ddots & \vdots \\ 0 & 0 & \cdots & p_{C,Q-1} \end{bmatrix} p_B,$$

where $p_{C,q}$ denotes the pre-coder at subarray $q \in \{0, 1, \ldots, Q-1\}$, where Q is the number of subarrays. Note $Q=Q_1 Q_2$ for 2D antenna ports.

To initialize, all subarrays may be initialized with the same pre-coder $p_C$ which may be obtained in the first Class C CSI reporting instance, or using UL SRS measurement (assuming UL-DL channel reciprocity).

In some embodiments, eNB partitions the entire subarray into K subarrays and transmits NZP CSI-RS from each of K subarrays where CSI-RS can either be NP or BF. Also, K CSI-RS resources may belong to a single CSI process of K independent processes. Using these K resources in the 1st stage, the UE derives the 1st stage pre-coder for each subarray which are in turn used to beam-form 2nd stage BF CSI-RS according to some embodiments of the present disclosure.

In some embodiments, the UE is configured with a subarray type from a plurality of subarray types such that they correspond to the supported antenna port configurations (up to LTE specification) in terms of ($N_1$, $N_2$) values. In some embodiments, the UE is configured with a subarray type from a plurality of subarray types such that at least one of them do not correspond to the supported antenna port configurations (up to LTE specification) in terms of ($N_1$, $N_2$) values. In some embodiments, the UE is configured with a subarray type configuration in terms of ($N_1$, $N_2$) for the full antenna port layout and ($M_1$, $M_2$) for the Class C subarray port layout.

In some embodiments, the UE is configured with a subarray type configuration in terms of ($N_1$, $N_2$) for the full antenna port layout and ($Q_1$, $Q_2$) for the Class B port layout after they beam-formed using the Class C PMI pre-coder. In some embodiments, the UE is configured with a subarray type configuration in terms of ($M_1$, $M_2$) for the Class C subarray port layout and ($Q_1$, $Q_2$) for the Class B port layout after they beam-formed using the Class C PMI pre-coder. In some embodiments, $N_1 = M_1 Q_1$ and $N_2 = M_2 Q_2$. In some embodiments, the subarray type configuration is cell-specific, and hence remains the same for all UEs. In some embodiments, the subarray type configuration is UE-specific, and hence a UE is configured with a subarray type from a plurality of subarray types. In some embodiments, the UE suggests a preferred subarray type to the eNB. In some embodiments, the subarray type is pre-determined, hence does not need configuration. In some embodiments, the subarray type configuration is semi-static via RRC or is more dynamic via CSI configuration.

In some embodiments, the codebook type configuration includes some of the following parameters: subarray type configuration to configure the subarray type according to some embodiments of the present disclosure; ($s_1$, $s_2$) the spacing between two nearest antenna ports in the subarray. The set of values for $s_1$ and $s_2$ includes 1; ($O_{1C}$, $O_{2C}$), the oversampling factors for Class C codebook $C_C$; ($O_{1B}$, $O_{2B}$), the oversampling factors for Class B codebook $C_B$; and codebook-configuration, the set of values include 1, 2, 3, 4 which may or may not correspond to LTE specification FD-MIMO codebook.

In some embodiments, if the UE is configured with Class A eMIMO-Type in 1st or 2nd CSI report, then the Codebook-Config parameter can be according to the following alternatives: Alt 0 (it is pre-determined), Ex 0 (Codebook-Config=1); and Alt 1 (codebook-Config value is configured) with codebook-Config=1, 2 for 1D port layouts, and codebook-Config=1, 2, 3, 4 for 2D port layouts.

In some embodiments, if the UE is configured with Class A eMIMO-Type in both CSI reports, then the Codebook-Config parameter can be according to the following alternatives: Alt 0 (it is pre-determined), Ex 0: Codebook-Config=1 for both CSI reports and Ex 1: Codebook-Config=1 for 1st CSI report, and Codebook-Config=2 if the 2nd CSI report is associated with 2D beam-formed ports and Codebook-Config=4 the 2nd CSI report is associated with 1D beam-formed ports; Alt 1 (one Codebook-Config value is configured for both CSI reports), codebook-Config=1, 2 for 1D port layouts, and codebook-Config=1, 2, 3, 4 for 2D port layouts; and Alt 2: Codebook-Config1 and Codebook-Config2 are configured for both CSI reports, codebook-Config1, Codebook-Config2=1, 2 for 1D port layouts, and codebook-Config1, Codebook-Config2=1, 2, 3, 4 for 2D port layouts.

In some embodiments, the Class C and Class B CSI-RS configuration and reporting can any of the following types: both are periodic with the same periodicity; both are periodic with different periodicity, for example Class C has longer periodicity; both are aperiodic; Class C is periodic and Class B is aperiodic; and Class C is aperiodic and Class B is periodic.

In some embodiments, eNB uses the hybrid PMI codebook and the associated subarray based hybrid CSI feedback framework to configure one of the following: partial port hybrid (Class C+Class B) CSI feedback, for example, $M_1 < N_1$ or/and $M_2 < N_2$, and both Class A and Class B CSI-RS are configured; full port hybrid (Class A+Class B) CSI feedback, for example, $M_1 = N_1$ and $M_2 = N_2$, and both Class C and Class B CSI-RS are configured; Class A CSI feedback, for example: $M_1 = N_1$ and $M_2 = N_2$, $p_B = 1$, and only Class A CSI-RS is configured; and Class B CSI feedback, for example, only Class B CSI-RS is configured and $p_C$ is replaced with an appropriate beam-forming vector, which for example is estimated using UL SRS assuming UL-DL (long-term) channel reciprocity. An example of feedback type configuration table is shown in Table 26.

TABLE 26

Feedback type configuration table

|  | NP CSI-RS | | BF CSI-RS | |
|---|---|---|---|---|
|  | Dimension | Pre-coder | Dimension | Pre-coder |
| Full port hybrid | $(N_1, N_2)$ | $p_A$ | $(<N_1, <N_2)$ | $p_B$ |
| Partial port hybrid | $(M_1, M_2)$ | $p_C$ | $(N_1/M_1, N_2/M_2)$ | $p_B$ |
| Class A | $(N_1, N_2)$ | $p_A$ | — | 1 |
| Class B | — | — | $(<N_1, <N_2)$ | $p_B$ |

Figure 25:
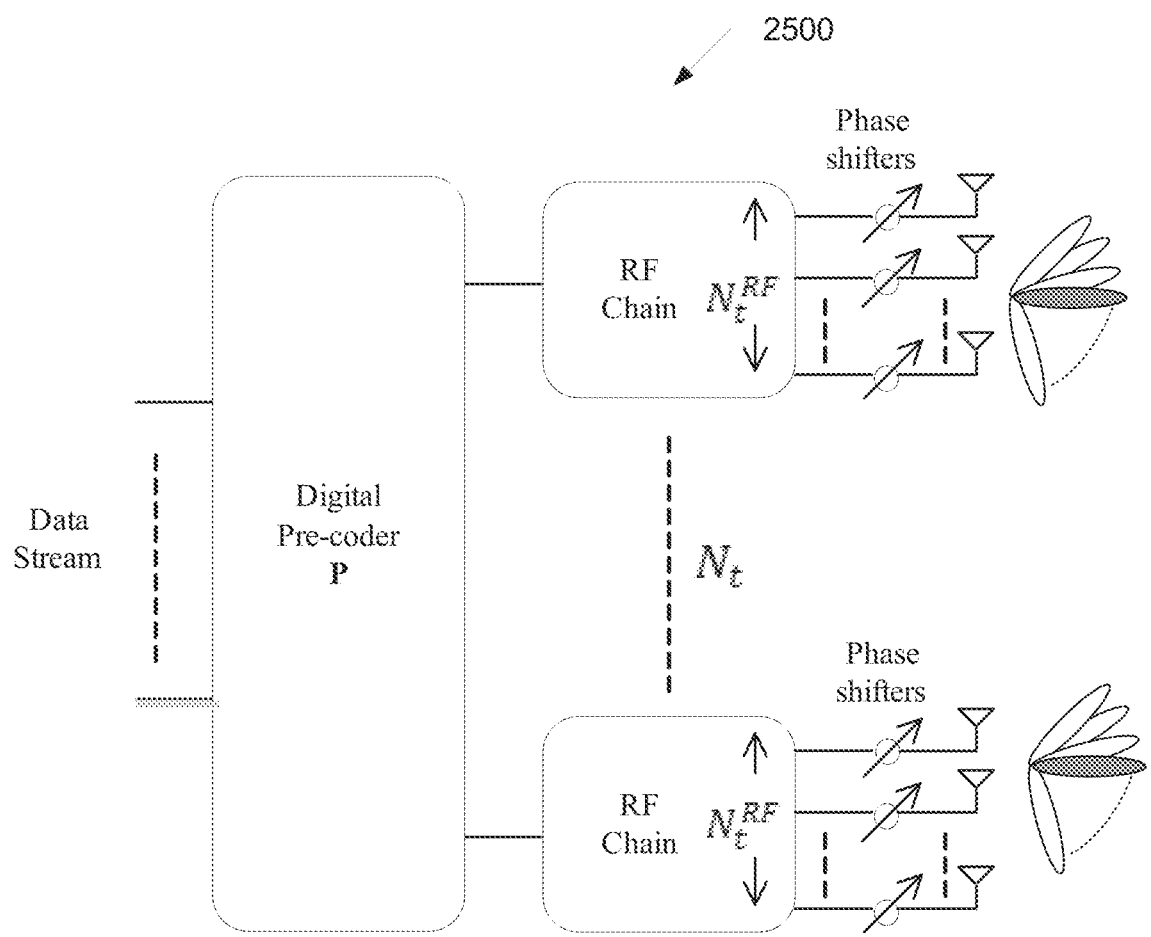
FIG. 25 illustrates an example millimeter wave communication system with hybrid beam forming (HBF) according to embodiments of the present disclosure.

FIG. 25 illustrates an example millimeter wave communication system with hybrid beam forming (HBF) 2500 according to embodiments of the present disclosure. An embodiment of the millimeter wave communication system with HBF 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

In some embodiments, eNB uses the proposed hybrid CSI feedback framework for a millimeter wave communication system with hybrid beam-forming architecture as shown in FIG. 25. In this architecture, there are $N_t$ RF chains. Each RF chain consists of $N_t^{RF}$ antennae, where each antenna is connected to one RF phase shifter. The phase values of the phase shifters of the $i^{th}$ RF chain form a $N_t^{RF} \times 1$ beam-forming vector $w_i$. All RF chains together form a $N_t \times N_t$ block diagonal beam-forming matrix W whose each diagonal block is a $N_t^{RF} \times 1$ beam-forming vector. Each RF chain receives an input from a $N_t \times N_s$ digital pre-coder matrix P, which maps $N_s$ data streams to $N_t$ RF chains.

Figure 26:
FIG. 26 illustrates an example hybrid CSI feedback framework for millimeter wave communication system according to embodiments of the present disclosure.

FIG. 26 illustrates an example hybrid CSI feedback framework for millimeter wave communication system 2600 according to embodiments of the present disclosure. An embodiment of the hybrid CSI feedback framework for millimeter wave communication system 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

Assuming RF beam-forming matrix W has the identical diagonal blocks, which are selected from a RF beam codebook $C_{RF}$ consisting of R RF beams, eNB transmits Class C CSI-RS as BRS (beam RS) from one RF chain through all R RF beams in $C_{RF}$ one-by-one, and UE derives the best RF beam based on a metric. This beam scanning is performed at the granularity of one OFDM symbol. In one OFDM symbol, WB measurement of one RF beam is obtained. So, to obtain measurements through all RF beams in $C_{RF}$, R OFDM symbols are used. The best RF beam thus obtained is used as an RF beam-forming weight at all RF chains, and then Class B CSI-RS is transmitted through all $N_t$ RF chains. An illustration of the hybrid CSI feedback for millimeter wave communication system is shown FIG. 26.

The Class C CSI feedback includes the first PMI indicating the selected RF beam from $C_{RF}$. In one example, $C_{RF}$ is a DFT codebook where the length of each DFT vector is $N_t^{RF}$. The Class B CSI feedback includes the second PMI indicating the digital pre-coder, CQI, and RI according to some embodiments of the present disclosure.

In some embodiments, eNB, instead of using the same RF beam at all RF chains, performs subarray cycling for Class C CSI-RS transmission according to some embodiments of the present disclosure, and updates RF beams at all subarrays one-by-one.

Figure 27:
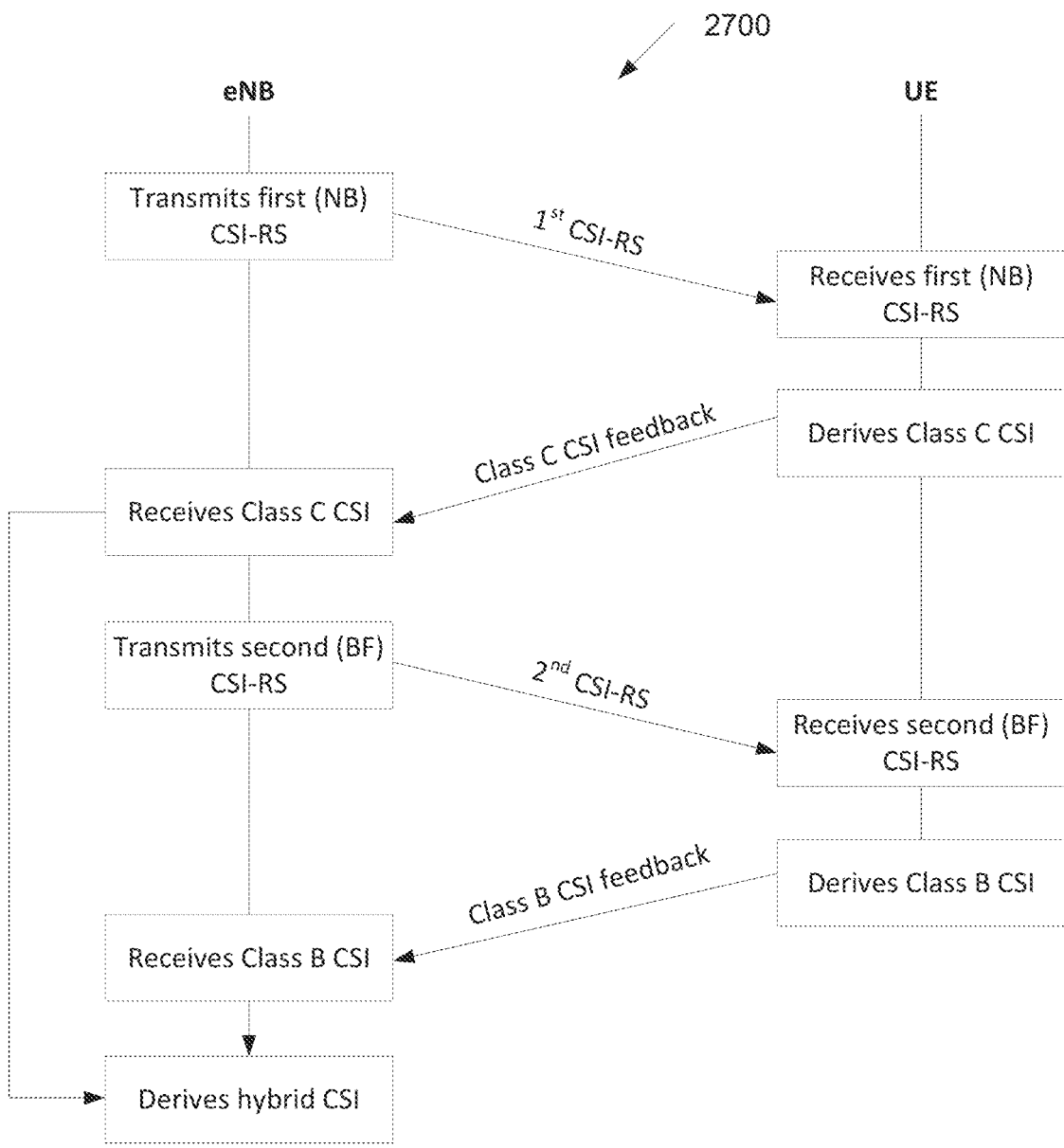
FIG. 27 illustrates an example UE-transparent eNB and UE procedures according to embodiments of the present disclosure.

FIG. 27 illustrates an example UE-transparent eNB and UE procedures 2700 according to embodiments of the present disclosure. An embodiment of the UE-transparent eNB and UE procedures 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

In some embodiments, as shown in FIG. 27, a UE is configured to: measure two CSI-RSs associated with Class C and Class B eMIMO-Types; derive two PMIs using respective PMI codebooks ($C_C$ and $C_B$); and report them in the two respective PMI reporting instances. The UE also derives and reports CQI and RI in one or both CSI reporting types according to the configuration.

eNB aggregates the reported Class C and Class B CSIs and derives the hybrid CSI comprising of: the hybrid pre-coder $p_H$ using the two reported PMIs $p_C$ and $p_B$ according to some embodiments of the present disclosure; the overall CQI if CQI is reported in CQI reporting instances of both Class C and Class B CSIs; and the overall RI if RI is reported in RI reporting instances of both Class C and Class B CSIs. In this case, the UE is unaware of the hybrid PMI codebook that eNB uses to derive hybrid CSI.

Figure 28:
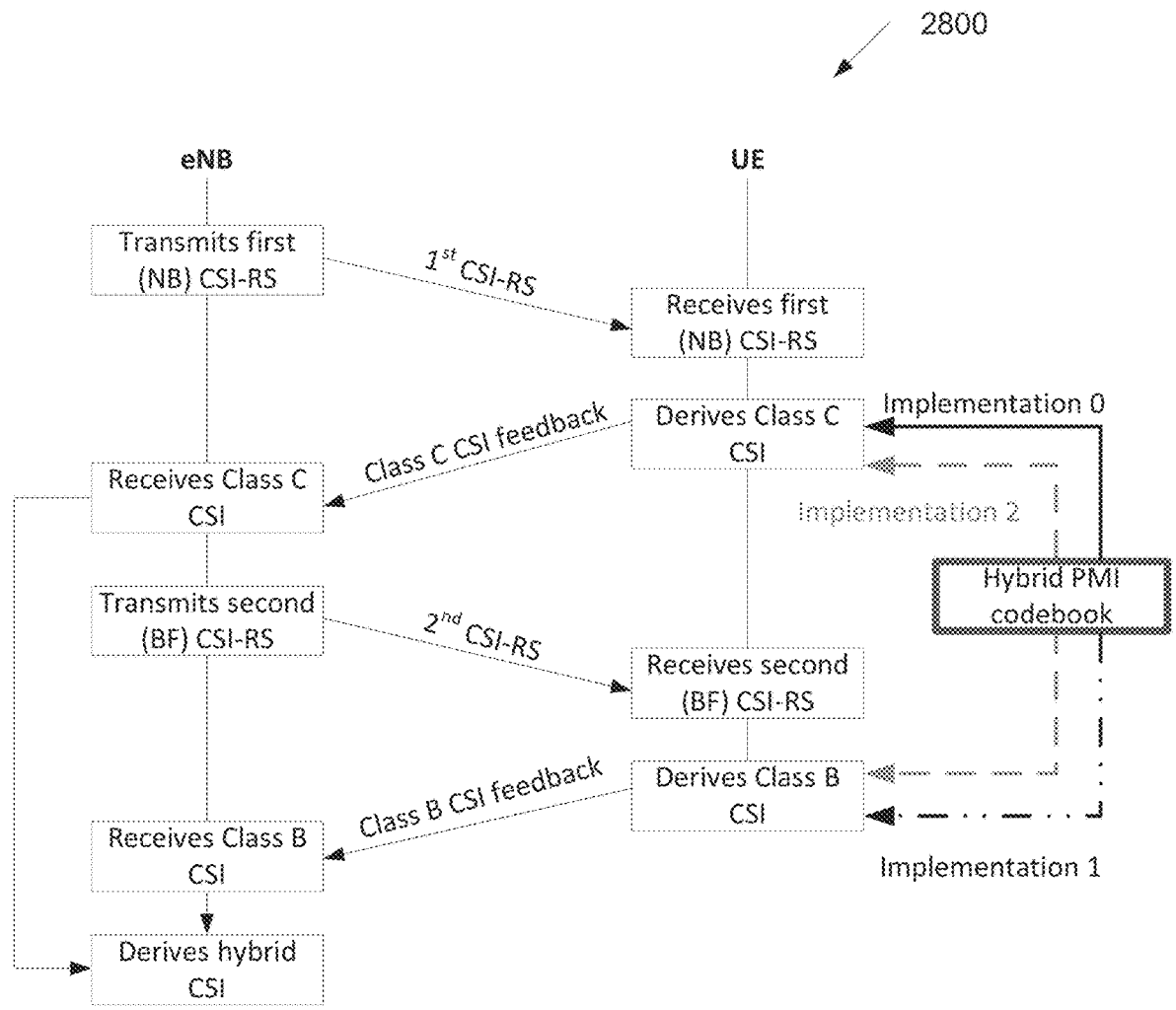
FIG. 28 illustrates an example UE-non-transparent eNB and UE procedures (Alt 0) according to embodiments of the present disclosure.

FIG. 28 illustrates an example UE-non-transparent eNB and UE procedures (Alt 0) 2800 according to embodiments of the present disclosure. An embodiment of the UE-non-transparent eNB and UE procedures (Alt 0) 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

In some embodiments, as shown in FIG. 28, a UE is configured to: measure two CSI-RSs associated with Class C and Class B eMIMO-Types; derive two PMIs using respective PMI codebooks ($C_C$ and $C_B$) with the knowledge about the hybrid PMI codebook which eNB will use to derive the hybrid CSI, and report them in the two respective PMI reporting instances. The UE also derives and reports CQI and RI in one or both CSI reporting types according to the configuration. The eNB aggregates the reported Class C and Class B CSIs and derives the hybrid CSI comprising of: the hybrid pre-coder $p_H$ using the two reported PMIs $p_C$ and $p_B$ according to some embodiments of the present disclosure; the overall CQI if CQI is reported in CQI reporting instances of both Class C and Class B CSIs; and the overall RI if RI is reported in RI reporting instances of both Class C and Class B CSIs.

The UE uses one of the following exemplary implementations to use the hybrid PMI codebook information: implementation 0 (information about the hybrid pre-coder is used only in Class C CSI derivation as shown in FIG. 28); implementation 1 (information about the hybrid pre-coder is used only in Class B CSI derivation as shown in FIG. 28;

and implementation 2 (information about the hybrid precoder is used in both Class C and Class B CSI derivations as shown in FIG. 28.

For each implementation, the UE uses one of the following exemplary methods: method 0 (the UE uses the last reported Class B CSI to derive Class C CSI and vice versa); method 1 (the UE performs exhaustive search over all pre-coders $p_B$ in $C_B$ to derive Class C CSI and vice versa); method 2 (the UE performs partial search over a subset of pre-coders $p_B$ in $C_B$ to derive Class C CSI and vice versa); and method 4 (the UE obtains an "optimal" $p_B$ in $C_B$ analytically (without codebook search) and use it to derive Class C CSI and vice versa).

Figure 29:
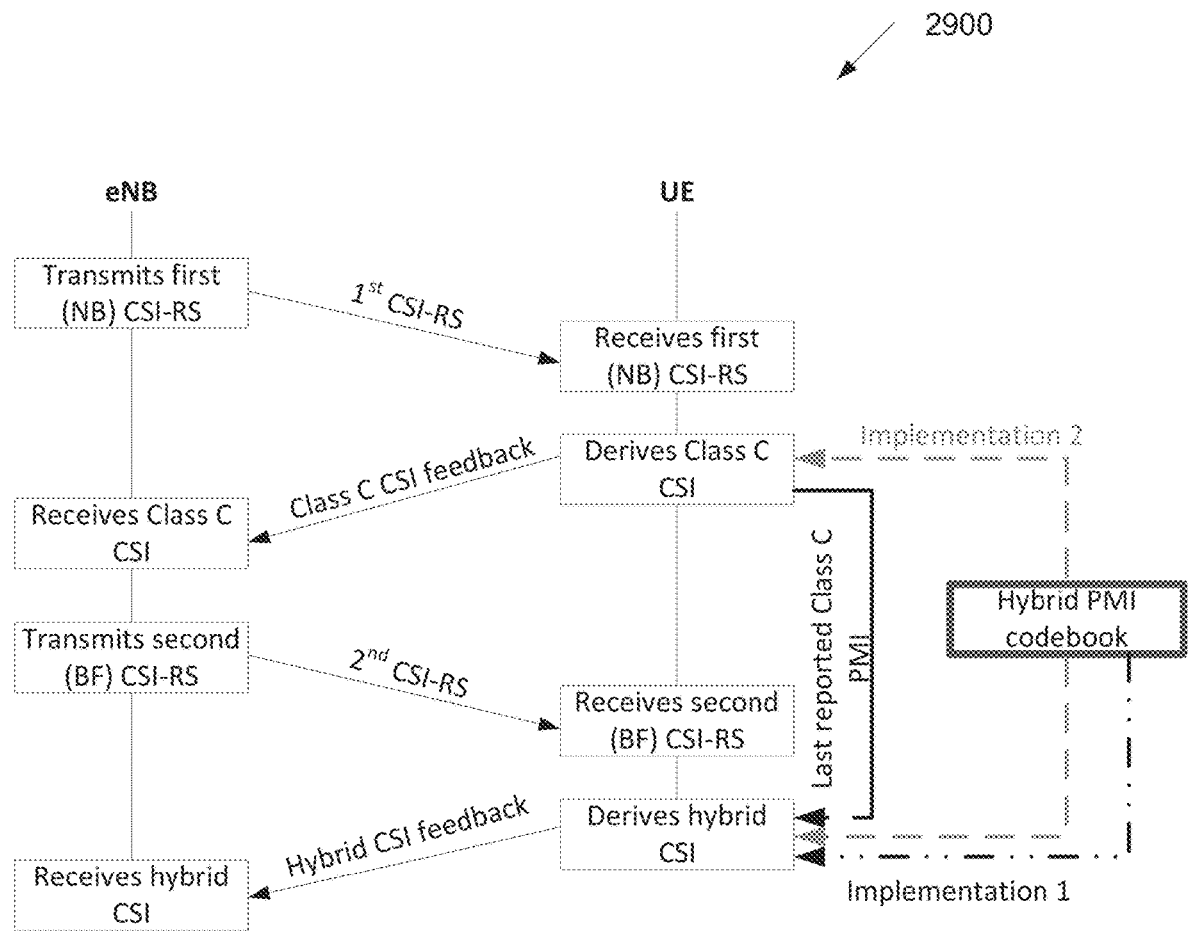
FIG. 29 illustrates another example UE-non-transparent eNB and UE procedures (Alt 1) according to embodiments of the present disclosure.

FIG. 29 illustrates another example UE-non-transparent eNB and UE procedures (Alt 1) 2900 according to embodiments of the present disclosure. An embodiment of the UE-non-transparent eNB and UE procedures (Alt 1) 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

In some embodiments, as shown in FIG. 29, a UE is configured to: measure two CSI-RSs associated with Class C and Class B eMIMO-Types; derive Class C PMI using the PMI codebook $C_C$ (with Implementation 1 or 2); derive hybrid PMI (or Class B PMI) using the hybrid PMI codebook $C_H$ (or $C_B$) and the last reported Class C PMI, and report the two PMIs in the two respective PMI reporting instances. The UE also derives and reports Class C CQI and RI and hybrid CQI and RI according to the configuration. Note that in this case, eNB does not need to aggregate Class C and Class B CSIs to obtain hybrid CSI as in the previous embodiment (Alt 0).

Figure 30:
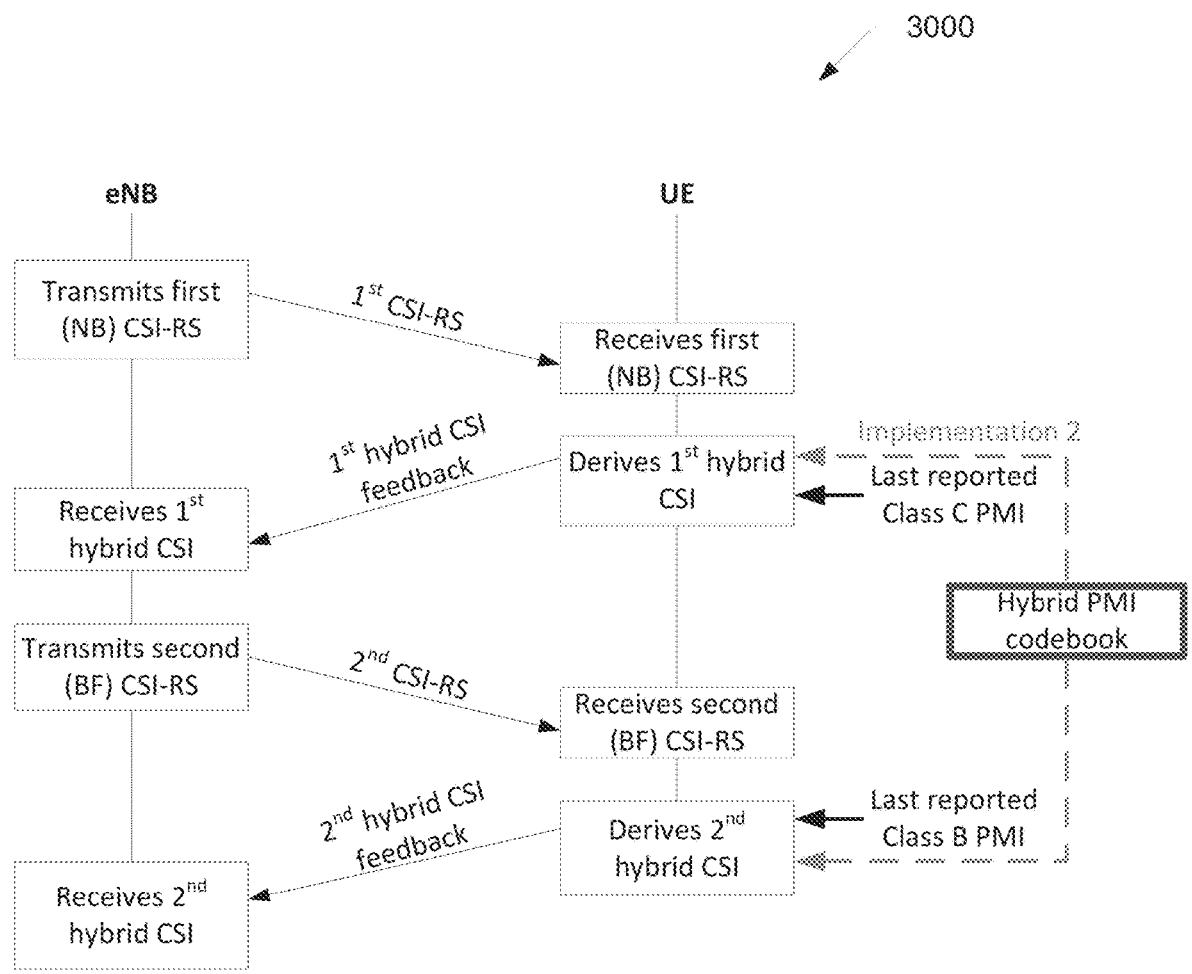
FIG. 30 illustrates yet another example UE-non-transparent eNB and UE procedures (Alt 2) according to embodiments of the present disclosure.

FIG. 30 illustrates yet another example UE-non-transparent eNB and UE procedures (Alt 2) 3000 according to embodiments of the present disclosure. An embodiment of the UE-non-transparent eNB and UE procedures (Alt 2) 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

In some embodiments, as shown in FIG. 30, a UE is configured to: measure two CSI-RSs associated with Class C and Class B eMIMO-Types; derive 1st hybrid PMI (or Class C PMI) using the hybrid PMI codebook $C_H$ (or $C_C$) and the last reported Class B PMI; derive 2nd hybrid PMI (or Class B PMI) using the hybrid PMI codebook $C_H$ (or $C_B$) and the last reported Class C PMI; and report the two hybrid PMIs in the two respective PMI reporting instances. The UE also derives and reports hybrid CQI and RI in one or both CSI reporting according to the configuration.

In some embodiments, a UE is configured with a CSI process with three NZP CSI-RS resources and three eMIMO-Types where: 1st CSI-RS (NP or BF) with $K_1$ resources is transmitted from $K_1$ subarrays according to some embodiments of the present disclosure; 2nd CSI-RS (BF) with $K_2$ resources is transmitted in the 2nd stage where CSI-RS is beam-formed using the PMI reported in 1st stage, here either $K_2=1$ or $K_2>1$; and 3rd CSI-RS (BF) with a single NZP resources associated with 2 ports (for the two polarizations).

The three eMIMO-Types are configured as follows: 1st eMIMO-Type is associated with 1st CSI-RS and is used to report beamforming (1st PMI) for the 2nd and 3rd CSI-RS; 2nd eMIMO-Type is associated with 2nd CSI-RS and is used to report beamforming (2nd PMI) for the 3rd stage (together with 1st PMI); 3rd eMIMO-Type is associated with 3rd CSI-RS and is used to report a co-phase (3rd PMI) and CQI. The periodicity of 1st eMIMO-Type is the longest (i.e. 100 ms), that of the 2nd eMIMO-Type is intermediate (i.e. 50 ms), and that of the 3rd eMIMO-Type is every PMI/CQI reporting instances, i.e. 5 ms.

In one alternative, RI is reported only in the 3rd stage. In another alternative, RI is reported in all three stages where 1st stage RI1 may suggest preferred RIs for 2nd and 3rd stages.

In some embodiments, a UE is configured the 1st stage eMIMO-Type of Class A or Class C to report the number of beams (L) in addition to ii, RI, or CRI. The reported number of beams can be used to suggest a preferred RI value (or range of RI values) to eNB. In one method, L can be reported based on Codebook-Config parameter as follows: if Codebook-Config=1, then (a) L=1 beam indicates rank 1-2. So, RI in stage 2 is 1-2, (b) L=2 beams (orthogonal) indicate rank 3-4. So, RI in stage 2 is 3-4 or 1-4, (c) L=3 beams (orthogonal) indicate rank 5-6. So, RI in stage 2 is 5-6 or 1-6 m, and (d) L=4 beams (orthogonal) indicate rank 7-8. So, RI in stage 2 is 7-8 or 1-8; and if Codebook-Config=2, 3, 4, then (a) L=4 beams indicates rank 1-2. So, RI in stage 2 is 1-2, (b) L=8 beams (4 orthogonal pairs) indicate rank 3-4. So, RI in stage 2 is 3-4 or 1-4, (c) L=3 beams (orthogonal) indicate rank 5-6. So, RI in stage 2 is 5-6 or 1-6, and (d) L=4 beams (orthogonal) indicate rank 7-8. So, RI in stage 2 is 7-8 or 1-8.

In some embodiments (Set 1), when a UE is configured with $1^{st}$ eMIMO-Type of Class A and $2^{nd}$ eMIMO-Type of Class B with K=1 resource, where the CSI reporting content for the $1^{st}$ eMIMO-Type (Class A) is $i_1^{(1)}$) or ($i_{1,1}^{(1)}$, $i_{1,2}^{(1)}$) and x-bit $RI^{(1)}$ (i.e., $CQI^{(1)}$ and $i2^{(1)}$ are not reported), where if UE supports up to 2 layers, x=0, and if UE supports up to 8 layer, x=1, where $RI^{(1)}=\{1, 3\}$; and the $2^{nd}$ eMIMO-Type (Class B K=1) is $CQI^{(2)}$, $PMI^{(2)}$, $RI^{(2)}$, where superscript (y) represents the y-th eMIMO-Type, where y=1, 2, the UE is configured with periodic CSI reporting of $1^{st}$ and $2^{nd}$ eMIMO-Types according to one of the following alternatives.

Using the PUCCH formats, any of the following combinations of UCI transmission rule on PUCCH can be supported, whether by itself or in addition to other combinations. Such a combination can also include only one of the rules (set 1) below: Format 2 for a first CSI report (associated with a 1st eMIMO-Type of Class A) when not multiplexed with HARQ-ACK and Format 2 for a second CSI report (associated with a 2nd eMIMO-Type of Class B with one CSI-RS resource) when not multiplexed with HARQ-ACK; Format 2 for a first CSI report (associated with a 1st eMIMO-Type of Class A) when not multiplexed with HARQ-ACK and Format 3 for a second CSI report (associated with a 2nd eMIMO-Type of Class B with one CSI-RS resource) when not multiplexed with HARQ-ACK; Format 3 for a first CSI report (associated with a 1st eMIMO-Type of Class A) when not multiplexed with HARQ-ACK and Format 2 for a second CSI report (associated with a 2nd eMIMO-Type of Class B with one CSI-RS resource) when not multiplexed with HARQ-ACK; Format 3 for a first CSI report (associated with a 1st eMIMO-Type of Class A) when not multiplexed with HARQ-ACK and Format 3 for a second CSI report (associated with a 2nd eMIMO-Type of Class B with one CSI-RS resource) when not multiplexed with HARQ-ACK; Format 2a for a first CSI report (associated with a 1st eMIMO-Type of Class A) multiplexed with 1-bit HARQ-ACK for normal cyclic prefix and Format 2a for a second CSI report (associated with a 2nd eMIMO-Type of Class B with one CSI-RS resource) multiplexed with 1-bit HARQ-ACK for normal cyclic prefix; Format 2a for a first CSI report (associated with a 1st eMIMO-Type of Class A) multiplexed with 1-bit HARQ-ACK for normal cyclic prefix and Format 3 for a second CSI report (associated with a 2nd eMIMO-Type of Class B with one CSI-RS resource) when not multiplexed with HARQ-ACK; Format 2a for a first CSI report (associated with a 1st eMIMO-Type of Class A) multiplexed with 1-bit HARQ-ACK for normal cyclic prefix and Format 3a for a second CSI report (associated with a 2nd eMIMO-Type of Class B with one CSI-RS resource) multiplexed with 1-bit HARQ-ACK for normal cyclic prefix; Format 2a for a first CSI report (associated with a 1st eMIMO-Type of Class A) multiplexed with 1-bit HARQ-ACK for normal cyclic prefix and Format 3 for a second CSI report (associated with a 2nd eMIMO-Type of Class B with one CSI-RS resource) multiplexed with 1-bit HARQ-ACK for normal cyclic prefix; Format 3 for a first CSI report (associated with a 1st eMIMO-Type of Class A) when not multiplexed with HARQ-ACK and Format 2a for a second CSI report (associated with a 2nd eMIMO-Type of Class B with one CSI-RS resource) multiplexed with 1-bit HARQ-ACK for normal cyclic prefix; Format 3a for a first CSI report (associated with a 1st eMIMO-Type of Class A) multiplexed with 1-bit HARQ-ACK for normal cyclic prefix and Format 2a for a second CSI report (associated with a 2nd eMIMO-Type of Class B with one CSI-RS resource) multiplexed with 1-bit HARQ-ACK for normal cyclic prefix; Format 3 for a first CSI report (associated with a 1st eMIMO-Type of Class A) multiplexed with 1-bit HARQ-ACK for normal cyclic prefix and Format 2a for a second CSI report (associated with a 2nd eMIMO-Type of Class B with one CSI-RS resource) multiplexed with 1-bit HARQ-ACK for normal cyclic prefix; Format 3a for a first CSI report (associated with a 1st eMIMO-Type of Class A) multiplexed with 1-bit HARQ-ACK for normal cyclic prefix and Format 3a for a second CSI report (associated with a 2nd eMIMO-Type of Class B with one CSI-RS resource) multiplexed with 1-bit HARQ-ACK for normal cyclic prefix; Format 3 for a first CSI report (associated with a 1st eMIMO-Type of Class A) multiplexed with 1-bit HARQ-ACK for normal cyclic prefix and Format 3 for a second CSI report (associated with a 2nd eMIMO-Type of Class B with one CSI-RS resource) multiplexed with 1-bit HARQ-ACK for normal cyclic prefix; Format 2b for a first CSI report (associated with a 1st eMIMO-Type of Class A) multiplexed with 2-bit HARQ-ACK for normal cyclic prefix and Format 2b for a second CSI report (associated with a 2nd eMIMO-Type of Class B with one CSI-RS resource) multiplexed with 2-bit HARQ-ACK for normal cyclic prefix; Format 2b for a first CSI report (associated with a 1st eMIMO-Type of Class A) multiplexed with 2-bit HARQ-ACK for normal cyclic prefix and Format 3 for a second CSI report (associated with a 2nd eMIMO-Type of Class B with one CSI-RS resource) when not multiplexed with HARQ-ACK; Format 2b for a first CSI report (associated with a 1st eMIMO-Type of Class A) multiplexed with 2-bit HARQ-ACK for normal cyclic prefix and Format 3b for a second CSI report (associated with a 2nd eMIMO-Type of Class B with one CSI-RS resource) multiplexed with 2-bit HARQ-ACK for normal cyclic prefix; Format 2b for a first CSI report (associated with a 1st eMIMO-Type of Class A) multiplexed with 2-bit HARQ-ACK for normal cyclic prefix and Format 3 for a second CSI report (associated with a 2nd eMIMO-Type of Class B with one CSI-RS resource) multiplexed with 2-bit HARQ-ACK for normal cyclic prefix; Format 3 for a first CSI report (associated with a 1st eMIMO-Type of Class A) when not multiplexed with HARQ-ACK and Format 2b for a second CSI report (associated with a 2nd eMIMO-Type of Class B with one CSI-RS resource) multiplexed with 2-bit HARQ-ACK for normal cyclic prefix; Format 3b for a first CSI report (associated with a 1st eMIMO-Type of Class A) multiplexed with 2-bit HARQ-ACK for normal cyclic prefix and Format 2b for a second CSI report (associated with a 2nd eMIMO-Type of Class B with one CSI-RS resource) multiplexed with 2-bit HARQ-ACK for normal cyclic prefix; Format 3 for a first CSI report (associated with a 1st eMIMO-Type of Class A) multiplexed with 2-bit HARQ-ACK for normal cyclic prefix and Format 2b for a second CSI report (associated with a 2nd eMIMO-Type of Class B with one CSI-RS resource) multiplexed with 2-bit HARQ-ACK for normal cyclic prefix; Format 3b for a first CSI report (associated with a 1st eMIMO-Type of Class A) multiplexed with 2-bit HARQ-ACK for normal cyclic prefix and Format 3b for a second CSI report (associated with a 2nd eMIMO-Type of Class B with one CSI-RS resource) multiplexed with 2-bit HARQ-ACK for normal cyclic prefix; Format 3 for a first CSI report (associated with a 1st eMIMO-Type of Class A) multiplexed with 2-bit HARQ-ACK for normal cyclic prefix and Format 3 for a second CSI report (associated with a 2nd eMIMO-Type of Class B with one CSI-RS resource) multiplexed with 2-bit HARQ-ACK for normal cyclic prefix; Format 2 for a first CSI report (associated with a 1st eMIMO-Type of Class A) with HARQ-ACK for extended cyclic prefix and Format 2 for a second CSI report (associated with a 2nd eMIMO-Type of Class B with one CSI-RS resource) with HARQ-ACK for extended cyclic prefix; Format 2 for a first CSI report (associated with a 1st eMIMO-Type of Class A) with HARQ-ACK for extended cyclic prefix and Format 3 for a second CSI report (associated with a 2nd eMIMO-Type of Class B with one CSI-RS resource) with HARQ-ACK for extended cyclic prefix; Format 3 for a first CSI report (associated with a 1st eMIMO-Type of Class A) with HARQ-ACK for extended cyclic prefix and Format 2 for a second CSI report (associated with a 2nd eMIMO-Type of Class B with one CSI-RS resource) with HARQ-ACK for extended cyclic prefix; Format 3 for a first CSI report (associated with a 1st eMIMO-Type of Class A) with HARQ-ACK for extended cyclic prefix and Format 3 for a second CSI report (associated with a 2nd eMIMO-Type of Class B with one CSI-RS resource) with HARQ-ACK for extended cyclic prefix.

Figure 31:
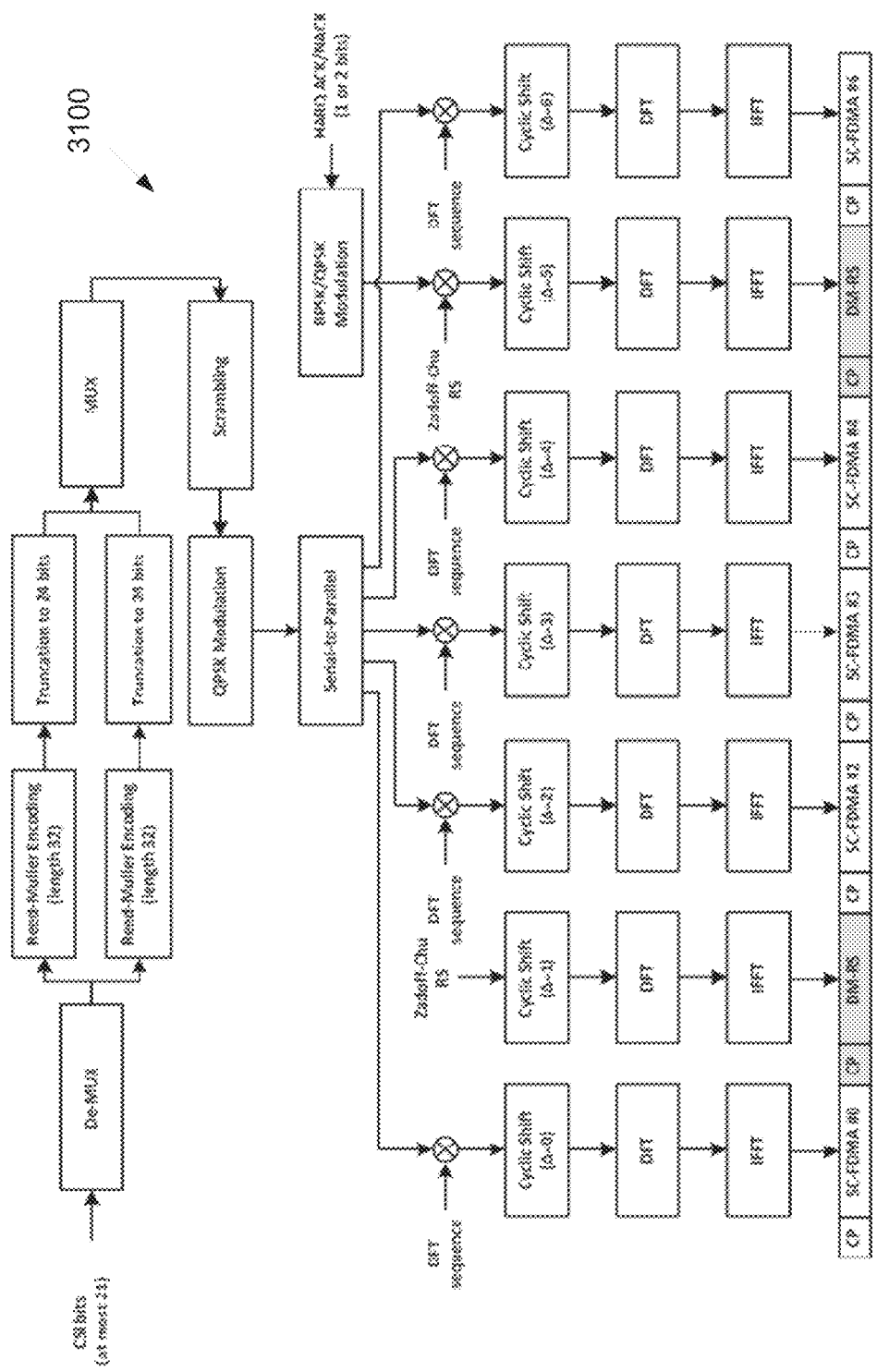
FIG. 31 illustrates an example physical uplink control channel (PUCCH) Format 3a/3b for simultaneous CSI and hybrid automatic repeat request (HARQ) acknowledgement/negative acknowledgement (ACK/NACK) transmission according to embodiments of the present disclosure.

The aforementioned transmission rules, the a new PUCCH Format 3a/3b for simultaneous transmission of CSI and HARQ ACK/NACK can be defined as shown in FIG. 31.

FIG. 31 illustrates an example physical uplink control channel (PUCCH) Format 3a/3b for simultaneous CSI and hybrid automatic repeat request (HARQ) acknowledgement/negative acknowledgement (ACK/NACK) transmission according to embodiments of the present disclosure. An embodiment of the PUCCH Format 3a/3b for simultaneous CSI and HARQ ACK/NACK transmission 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions. Other embodiments are used without departing from the scope of the present disclosure.

In some embodiments (Set 2), any of the following combinations of UCI transmission rule on PUCCH can also be supported, whether by itself or in addition to other combinations. Such a combination can also include only one of the rules below. This combination can also be supported in conjunction with any combination from the preceding set of embodiments (Set 1): Format 3 for a first and a second CSI reports (associated respectively with a 1st eMIMO-Type of Class A and a 2nd eMIMO-Type of Class B with one CSI-RS resource) when not multiplexed with HARQ-ACK; Format 3 for a first and a second CSI reports (associated respectively with a 1st eMIMO-Type of Class A and a 2nd eMIMO-Type of Class B with one CSI-RS resource) multiplexed with 1-bit HARQ-ACK for normal cyclic prefix; Format 3 for a first and a second CSI reports (associated respectively with a 1st eMIMO-Type of Class A and a 2nd eMIMO-Type of Class B with one CSI-RS resource) multiplexed with 2-bit HARQ-ACK for normal cyclic prefix; Format 3a for a first and a second CSI reports (associated respectively with a 1st eMIMO-Type of Class A and a 2nd eMIMO-Type of Class B with one CSI-RS resource) multiplexed with 1-bit HARQ-ACK for normal cyclic prefix; Format 3b for a first and a second CSI reports (associated respectively with a 1st eMIMO-Type of Class A and a 2nd eMIMO-Type of Class B with one CSI-RS resource) multiplexed with 2-bit HARQ-ACK for normal cyclic prefix; and Format 3 for a first and a second CSI reports (associated respectively with a 1st eMIMO-Type of Class A and a 2nd eMIMO-Type of Class B with one CSI-RS resource) multiplexed with HARQ-ACK for extended cyclic prefix.

In some embodiments (Set 3), if the UE is configured with aperiodic CSI reporting of $1^{st}$ and $2^{nd}$ eMIMO-Types, then it reports the two CSIs according to one of the following alternatives: Alt 0: UE reports both CSI of $1^{st}$ eMIMO-type and CSI of $2^{nd}$ eMIMO-type together using PUSCH Mode 3-2 (Table27); and Alt 1: UE reports two CSIs separately, wherein, the first CSI of $1^{st}$ eMIMO-type using PUSCH Mode 0-1 (Table 8) and the second CSI of $2^{nd}$ eMIMO-type using PUSCH Mode 3-1 (Table 27).

TABLE 27

CQI and PMI Feedback Types for PUSCH CSI reporting Modes

| | | PMI Feedback Type | | |
|---|---|---|---|---|
| | | No PMI | Single PMI | Multiple PMI |
| PUSCH CQI Feedback Type | No CQI | | Mode 0-1 | |
| | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

In some embodiments, if the UE is configured with aperiodic CSI reporting of $1^{st}$ eMIMO-Type and periodic CSI reporting of $2^{nd}$ eMIMO-Type, then it reports the two CSIs as follows: a UE reports the CSI of $1^{st}$ eMIMO-type using PUSCH Mode 3-2 (Table 27); and a UE reports the CSI of $2^{nd}$ eMIMO-type using PUCCH Format 2 or 2a or 2b or 3 or 3a or 3b.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed:

1. A user equipment (UE) for communicating in a multi-input multi-output (MIMO) wireless communication system, the UE comprising:
   a transceiver configured to receive, from a base station (BS), configuration information including an index $I_{PMI/RI}$ associated with a precoding matrix indicator (PMI) and rank indicator (RI); and
   at least one processor configured to:
      generate a first channel state information (CSI) report including a first PMI and a first RI; and
      determine reporting instances for transmitting the first CSI report based on both:
         i) a periodicity value $M_{PMI/RI}$ and an offset value $N_{OFFSET,PMI/RI}$ corresponding to the first CSI report that are identified according to a table including:

| $I_{PMI/RI}$ | Value of $M_{PMI/RI}$ | Value of $N_{OFFSET, PMI/RI}$ |
|---|---|---|
| $0 \le I_{PMI/RI} \le 160$ | 1 | $-I_{PMI/RI}$ |
| $161 \le I_{PMI/RI} \le 312$ | 2 | $-(I_{PMI/RI} - 161)$ |
| $322 \le I_{PMI/RI} \le 482$ | 4 | $-(I_{PMI/RI} - 322)$ |
| $483 \le I_{PMI/RI} \le 643$ | 8 | $-(I_{PMI/RI} - 483)$ |
| $644 \le I_{PMI/RI} \le 804$ | 16 | $-(I_{PMI/RI} - 644)$ |
| $805 \le I_{PMI/RI} \le 965$ | 32 | $-(I_{PMI/RI} - 805)$ |
| $966 \le I_{PMI/RI} \le 1023$ | | Reserved, | and
      ii) a periodicity value and an offset value corresponding to a second CSI report, and
   wherein the transceiver is further configured to transmit, to the BS, the first CSI report based on the determined reporting instances.

2. The UE of claim 1, wherein:
   the first CSI report generated based on measurement of a first CSI-reference signal (CSI-RS) and using a codebook for a first enhanced MIMO type (eMIMO-Type), and
   the processor is further configured to generate the second CSI report based on measurement of a second CSI-RS and using a codebook for a second eMIMO-Type.

3. The UE of claim 2, wherein the at least one processor is further configured to:
   measure the first CSI-RS that is a non-precoded (NP) CSI-RS and the second CSI-RS that is a beamformed (BF) CSI-RS with K=1 resource, wherein K is a positive integer;
   generate the first PMI and the first RI that are included in the first CSI report associated with the first eMIMO-Type, wherein the first PMI comprises at least one of a single PMI or a pair of two PMIs and the first eMIMO-Type is Class A; and
   generate at least one of a second PMI, a second RI, or a channel quality indicator (CQI) that is included in the second CSI report associated with the second eMIMO-Type, wherein and the second eMIMO-Type is Class B with K=1 resource, wherein Class B is a positive integer.

4. The UE of claim 2, wherein:
the transceiver is further configured to report the second CSI report based on determined periodic reporting instances using a PUCCH format,
the periodic reporting instances of the second CSI report are determined based on at least one of the periodicity value $M_{PMI/RI}$ or the offset value $N_{OFFSET,PMI/RI}$ corresponding to the second CSI report,
the periodicity value $M_{PMI/RI}$ is determined based on at least one of periodicity values $M_{RI}$ and $N_{pd}$ for a second RI, or CQI, respectively,
the offset value $N_{OFFSET,PMI/RI}$ is determined based on at least one of offset values $N_{OFFSET,CQI}$ and $N_{OFFSET,RI}$ for the CQI or the second RI, respectively, and
$M_{PMI/RI}$, $N_{OFFSET,PMI/RI}$, $M_{RI}$, $N_{pd}$, $N_{OFFSET,CQI}$, and $N_{OFFSET,RI}$ are positive integers.

5. The UE of claim 2, wherein the transceiver is further configured to:
separately report a second PMI and a second RI that are included in the second CSI report; and
report the second CSI report based on determined periodic reporting instances using a PUCCH format,
wherein the periodic reporting instances for the second PMI and the second RI, respectively, are determined based on the at least one of the periodicity value or the offset value corresponding to the second CSI report.

6. The UE of claim 2, wherein the transceiver is further configured to at least one of:
report at least one of the first or second CSI report using at least one of a physical uplink shared channel (PUSCH) Mode 0-1 or a PUSCH Mode 3-1 based on aperiodic CSI feedback configuration information; or
report both of the first and second CSI reports using a PUCCH Mode 3-2 based on the aperiodic CSI feedback configuration information,
wherein, the aperiodic CSI feedback configuration information for an aperiodic CSI reporting is received from the BS.

7. The UE of claim 2, wherein the at least one processor is further configured to measure the first CSI-RS for the first CSI report based on the first eMIMO-Type generated using a subset of antenna ports, and wherein the first CSI-RS comprises a non-precoded CSI-RS (NP CSI-RS).

8. A base station (BS) for communicating in a multi-input multi-output (MIMO) wireless communication system, the BS comprising:
a transceiver configured to transmit, to a user equipment (UE), configuration information including an index $I_{PMI/RI}$ associated with a precoding matrix indicator (PMI) and rank indicator (RI); and
at least one processor configured to determine reporting instances for a first CSI report including a first PMI and a first RI based on:
i) a periodicity value $M_{PMI/RI}$ and an offset value $N_{OFFSET,PMI/RI}$ corresponding to the first CSI report that are identified according to a table including:

| $I_{PMI/RI}$ | Value of $M_{PMI/RI}$ | Value of $N_{OFFSET, PMI/RI}$ |
|---|---|---|
| $0 \leq I_{PMI/RI} \leq 160$ | 1 | $-I_{PMI/RI}$ |
| $161 \leq I_{PMI/RI} \leq 312$ | 2 | $-(I_{PMI/RI} - 161)$ |
| $322 \leq I_{PMI/RI} \leq 482$ | 4 | $-(I_{PMI/RI} - 322)$ |
| $483 \leq I_{PMI/RI} \leq 643$ | 8 | $-(I_{PMI/RI} - 483)$ |
| $644 \leq I_{PMI/RI} \leq 804$ | 16 | $-(I_{PMI/RI} - 644)$ |
| $805 \leq I_{PMI/RI} \leq 965$ | 32 | $-(I_{PMI/RI} - 805)$ |
| $966 \leq I_{PMI/RI} \leq 1023$ | | Reserved, | and
ii) a periodicity value and an offset value corresponding to a second CSI report, and
wherein the transceiver is configured to receive, from the UE, the first CSI report based on the determined reporting instances.

9. The BS of claim 8, wherein:
the first CSI report generated based on measurement of a first CSI-reference signal (CSI-RS) and using a codebook for a first enhanced MIMO type (eMIMO-Type), and
the transceiver is further configured to receive the second CSI report generated based on measurement of a second CSI-RS and using a codebook for a second eMIMO-Type.

10. The BS of claim 9, wherein:
the at least one processor is further configured to:
determine the first CSI-RS that is a non-precoded (NP) CSI-RS and the second CSI-RS that is a beamformed (BF) CSI-RS with K=1 resource, wherein K is a positive integer; and
the transceiver is further configured to:
receive the first PMI and the first RI that are included in the first CSI report associated with the first eMIMO-Type, wherein the first PMI comprises at least one of a single PMI or a pair of two PMIs and the first eMIMO-Type is Class A; and
receive the second CSI report associated with the second eMIMO-Type, wherein the second CSI report includes at least one of a second PMI, a second RI, or a channel quality indicator (CQI), and wherein and the second eMIMO-Type is Class B with K=1 resource, wherein Class B is a positive integer.

11. The BS of claim 9, wherein the transceiver is further configured to:
receive the second CSI report based on determined periodic reporting instances using a PUCCH format,
wherein the periodic reporting instances of the second CSI report are determined based on at least one of the periodicity value $M_{PMI/RI}$ or the offset value $N_{OFFSET,PMI/RI}$ corresponding to the second CSI report,
wherein the periodicity value $M_{PMI/RI}$ is determined based on at least one of periodicity values $M_{RI}$ and $N_{pd}$ for a second RI, or CQI, respectively,
wherein the offset value $N_{OFFSET,PMI/RI}$ is determined based on at least one of offset values $N_{OFFSET,CQI}$ and $N_{OFFSET,RI}$ for the CQI or the second RI, respectively, and
wherein $M_{PMI/RI}$, $N_{OFFSET,PMI/RI}$, $M_{RI}$, $N_{pd}$, $N_{OFFSET,CQI}$, and $N_{OFFSET,RI}$ are positive integers.

12. The BS of claim 9, wherein the transceiver is further configured to:
separately receive a second PMI and a second RI that are included in the second CSI report; and
receive the first and second CSI reports based on determined periodic reporting instances using a PUCCH format, wherein the periodic reporting instances for the second PMI and the second RI, respectively, are determined based on the at least one of the periodicity value or the offset value corresponding to the second CSI report.

13. The BS of claim 9, wherein the transceiver is further configured to at least one of:

receive at least one of the first or second CSI report using at least one of a physical uplink shared channel (PUSCH) Mode 0-1 or a PUSCH Mode 3-1 based on aperiodic CSI feedback configuration information; or receive both of the first and second CSI reports using a PUCCH Mode 3-2 based on the aperiodic CSI feedback configuration information, wherein, the aperiodic CSI feedback configuration information for an aperiodic CSI reporting is received from the BS.

14. A method for communicating in a multi-input multi-output (MIMO) wireless communication system, the method comprising:

receiving, from a base station (BS), configuration information including an index $I_{PMI/RI}$ associated with a precoding matrix indicator (PMI) and rank indicator (RI);

generating a first channel state information (CSI) report including a first PMI and a first RI;

determining reporting instances for transmitting the first CSI report based on:

i) a periodicity value $M_{PMI/RI}$ and an offset value $N_{OFFSET,PMI/RI}$ corresponding to the first CSI report that are identified according to a table including:

| $I_{PMI/RI}$ | Value of $M_{PMI/RI}$ | Value of $N_{OFFSET, PMI/RI}$ |
|---|---|---|
| $0 \leq I_{PMI/RI} \leq 160$ | 1 | $-I_{PMI/RI}$ |
| $161 \leq I_{PMI/RI} \leq 312$ | 2 | $-(I_{PMI/RI} - 161)$ |
| $322 \leq I_{PMI/RI} \leq 482$ | 4 | $-(I_{PMI/RI} - 322)$ |
| $483 \leq I_{PMI/RI} \leq 643$ | 8 | $-(I_{PMI/RI} - 483)$ |
| $644 \leq I_{PMI/RI} \leq 804$ | 16 | $-(I_{PMI/RI} - 644)$ |
| $805 \leq I_{PMI/RI} \leq 965$ | 32 | $-(I_{PMI/RI} - 805)$ |
| $966 \leq I_{PMI/RI} \leq 1023$ | | Reserved, | and ii) a periodicity value and an offset value corresponding to a second CSI report, and transmitting, to the BS, the first CSI report based on the determined reporting instances.

15. The method of claim 14, further comprising:

generating the second CSI report based on measurement of a second CSI-reference signal (CSI-RS) and using a codebook for a second enhanced eMIMO-Type (eMIMO-Type), wherein the first CSI report is generated based on measurement of a first CSI-RS and using a codebook for a first MIMO type.

16. The method of claim 15, further comprising:

measuring the first CSI-RS that is a non-precoded (NP) CSI-RS and the second CSI-RS that is a beamformed (BF) CSI-RS with K=1 resource, wherein K is a positive integer;

generating the first PMI and the first RI that are included in the first CSI report associated with the first eMIMO-Type, wherein the first PMI comprises at least one of a single PMI or a pair of two PMIs and the first eMIMO-Type is Class A; and generating at least one of a second PMI, a second RI, or a channel quality indicator (CQI) that is included in the second CSI report associated with the second eMIMO-Type, wherein and the second eMIMO-Type is Class B with K=1 resource, wherein Class B is a positive integer.

17. The method of claim 15, further comprising:

reporting the second CSI report based on determined periodic reporting instances using a PUCCH format, wherein:

the periodic reporting instances of the second CSI report are determined based on at least one of the periodicity value $M_{PMI/RI}$ or the offset value $N_{OFFSET,PMI/RI}$ corresponding to the second CSI report, the periodicity value $M_{PMI/RI}$ is determined based on at least one of periodicity values $M_{RI}$ and $N_{pd}$ for a second RI, or CQI, respectively, the offset value $N_{OFFSET,PMI/RI}$ is determined based on at least one of offset values $N_{OFFSET,CQI}$ and $N_{OFFSET,RI}$ for the CQI or the second RI, respectively, and $M_{PMI/RI}$, $N_{OFFSET,PMI/RI}$, $M_{RI}$, $N_{pd}$, $N_{OFFSET,CQI}$, and $N_{OFFSET,RI}$ are positive integers.

18. The method of claim 15, further comprising:

separately reporting a second PMI and a second RI that are included in the second CSI report; and reporting the first and second CSI reports based on determined periodic reporting instances using a PUCCH format, wherein the periodic reporting instances for the second PMI and the second RI, respectively, are determined based on the at least one of the periodicity value or the offset value corresponding to the second CSI report.

19. The method of claim 15, further comprising:

reporting at least one of the first or second CSI report using at least one of a physical uplink shared channel (PUSCH) Mode 0-1 or a PUSCH Mode 3-1 based on aperiodic CSI feedback configuration information; or reporting both of the first and second CSI reports using a PUCCH Mode 3-2 based on the aperiodic CSI feedback configuration information, wherein, the aperiodic CSI feedback configuration information for an aperiodic CSI reporting is received from the BS.

20. The method of claim 15, further comprising measuring the first CSI-RS for the first CSI report based on the first eMIMO-Type generated using a subset of antenna ports, and wherein the first CSI-RS comprises a non-precoded CSI-RS (NP CSI-RS).

* * * * *